(12) United States Patent
Schierling et al.

(10) Patent No.: US 9,133,905 B2
(45) Date of Patent: Sep. 15, 2015

(54) TORSION VIBRATION DAMPER ASSEMBLY AND VIBRATION DAMPER DEVICE, IN PARTICULAR IN A TORSION VIBRATION DAMPER ASSEMBLY

(75) Inventors: Bernhard Schierling, Kumach (DE); Michael Traut, Ilmenau (DE); Horst Zinssmeister, Kaiserslautem (DE); Reinhard Feldhaus, Euerbach (DE); Mathias Kopp, Bamberg (DE); Andreas Orlamünder, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 150 days.

(21) Appl. No.: 13/699,782

(22) PCT Filed: Apr. 11, 2011

(86) PCT No.: PCT/EP2011/055596
§ 371 (c)(1),
(2), (4) Date: Nov. 26, 2012

(87) PCT Pub. No.: WO2011/147632
PCT Pub. Date: Dec. 1, 2011

(65) Prior Publication Data
US 2013/0139641 A1 Jun. 6, 2013

(30) Foreign Application Priority Data
May 28, 2010 (DE) .......... 10 2010 029 464

(51) Int. Cl.
*F16F 15/14* (2006.01)
(52) U.S. Cl.
CPC ........... *F16F 15/1414* (2013.01); *F16F 15/145* (2013.01); *Y10T 74/2131* (2015.01)
(58) Field of Classification Search
CPC . F16F 15/1414; F16F 15/145; Y10T 74/2131

USPC ........ 74/570.2, 572.2, 574.2–574.4; 188/378, 188/379; 192/30 V, 70.17; 464/51, 89, 90
IPC .............................................. F16F 15/24,15/26
See application file for complete search history.

(56) References Cited

U.S. PATENT DOCUMENTS

| 4,904,226 | A | * | 2/1990 | Chasseguet et al. | ....... 464/68.41 |
| 4,996,892 | A | * | 3/1991 | Yamamoto | ................ 464/68.41 |
| 5,697,845 | A | * | 12/1997 | Curtis | ............... 464/3 |
| 2014/0083242 | A1 | * | 3/2014 | Oh | ............... 74/574.2 |

FOREIGN PATENT DOCUMENTS

| DE | 19654894 A1 * | 12/1997 | ............ F16F 15/133 |
| DE | 19654915 A1 * | 2/1998 | ............ F16F 15/14 |

(Continued)

OTHER PUBLICATIONS

Machine translation of DE 10224874 A1 obtained on Nov. 25, 2014.*

*Primary Examiner* — Thomas R. Hannon
*Assistant Examiner* — Adam D Rogers
(74) *Attorney, Agent, or Firm* — Cozen O'Connor

(57) ABSTRACT

A torsional vibration damper arrangement includes a vibration damper device (10) having a deflection mass carrier (12) and at least one deflection mass (14) which is supported at the deflection mass carrier (12) such that it can be deflected out of a basic position at a maximum distance from the axis of rotation (A) into a deflection position at a shorter distance from the axis of rotation (A), wherein the secondary side (96) has at least one circumferential supporting element (102, 104; 102') having at least one circumferential supporting region (106, 108) and a secondary-side mass element (98) which is preferably shaped like an annular disk. First connection elements (118) connect the secondary-side mass element (98) to the at least one circumferential supporting element (98) and to the deflection mass carrier (12).

9 Claims, 45 Drawing Sheets

(56) References Cited

FOREIGN PATENT DOCUMENTS

| DE | 10005545 | A1 | * | 8/2001 | | F16F 15/14 |
| DE | 10013652 | A1 | * | 9/2001 | | F16F 15/14 |
| DE | 10224874 | A1 | * | 12/2002 | | F16F 15/134 |
| DE | 102004011830 | A1 | * | 9/2004 | | F16F 15/131 |
| DE | 102008005138 | A1 | * | 8/2008 | | |
| DE | 102008059297 | A1 | * | 6/2009 | | |
| DE | 102009042825 | A1 | * | 5/2010 | | |
| DE | 102009051724 | A1 | * | 5/2010 | | |
| EP | 1744074 | A2 | * | 1/2007 | | |

* cited by examiner

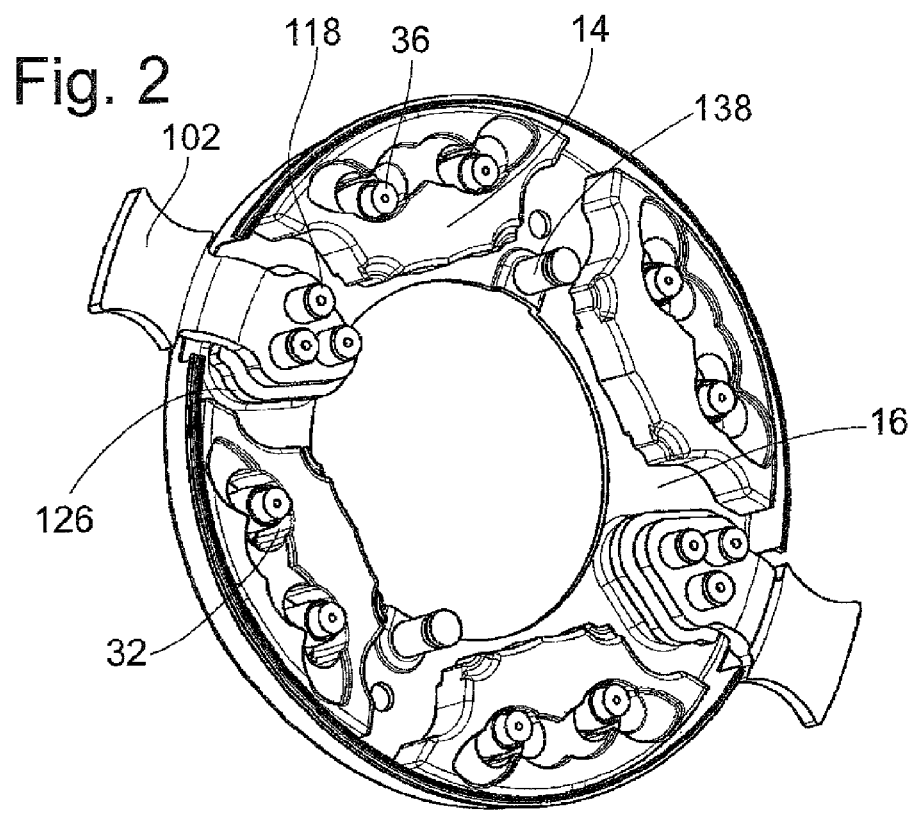
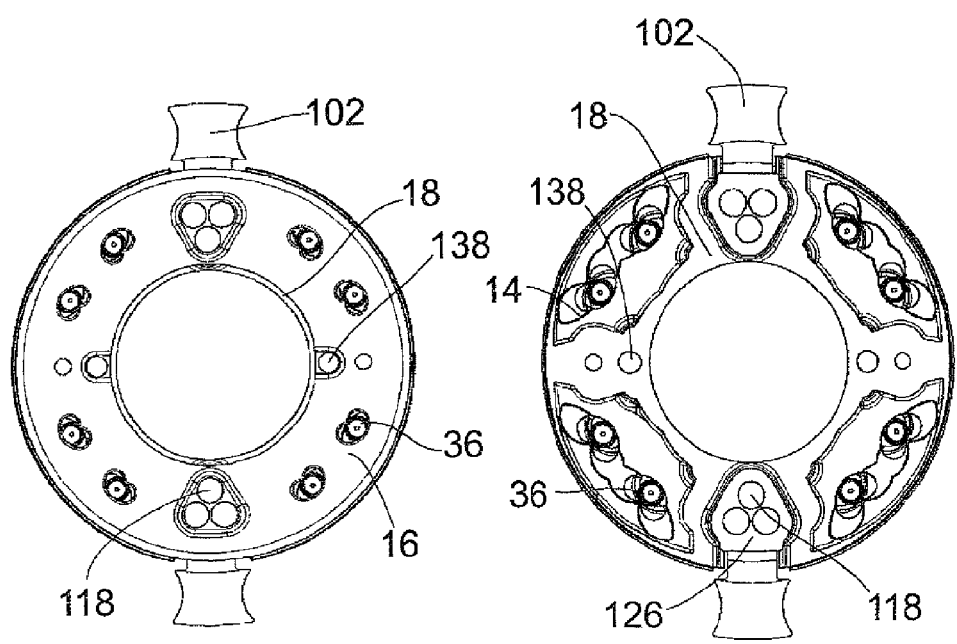

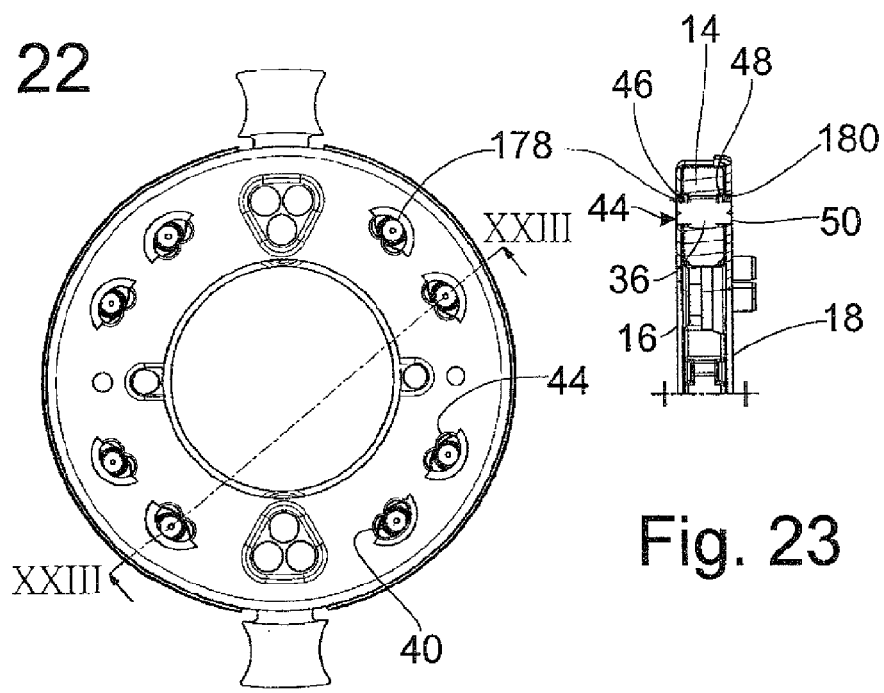
Fig. 22
Fig. 23
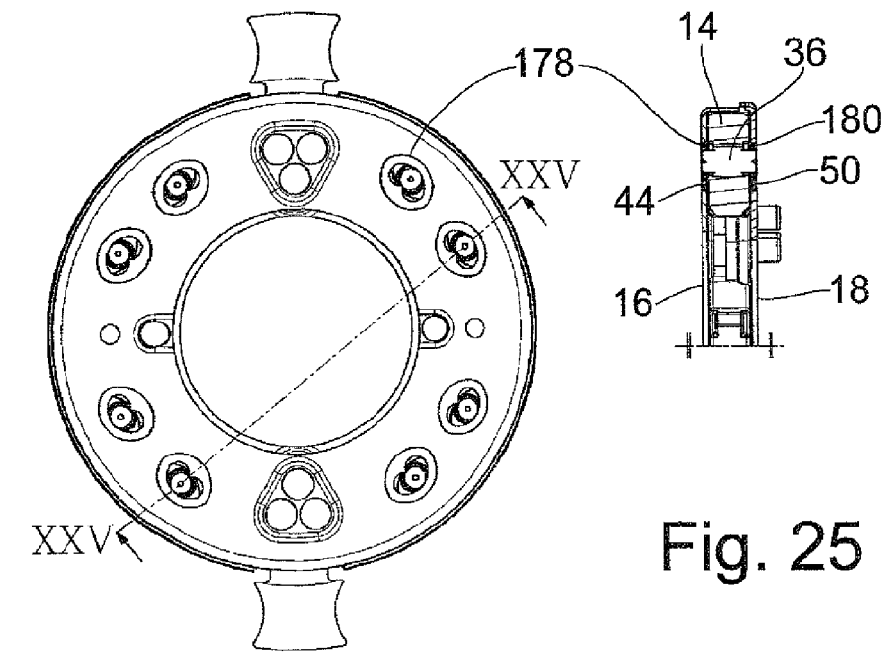
Fig. 24
Fig. 25

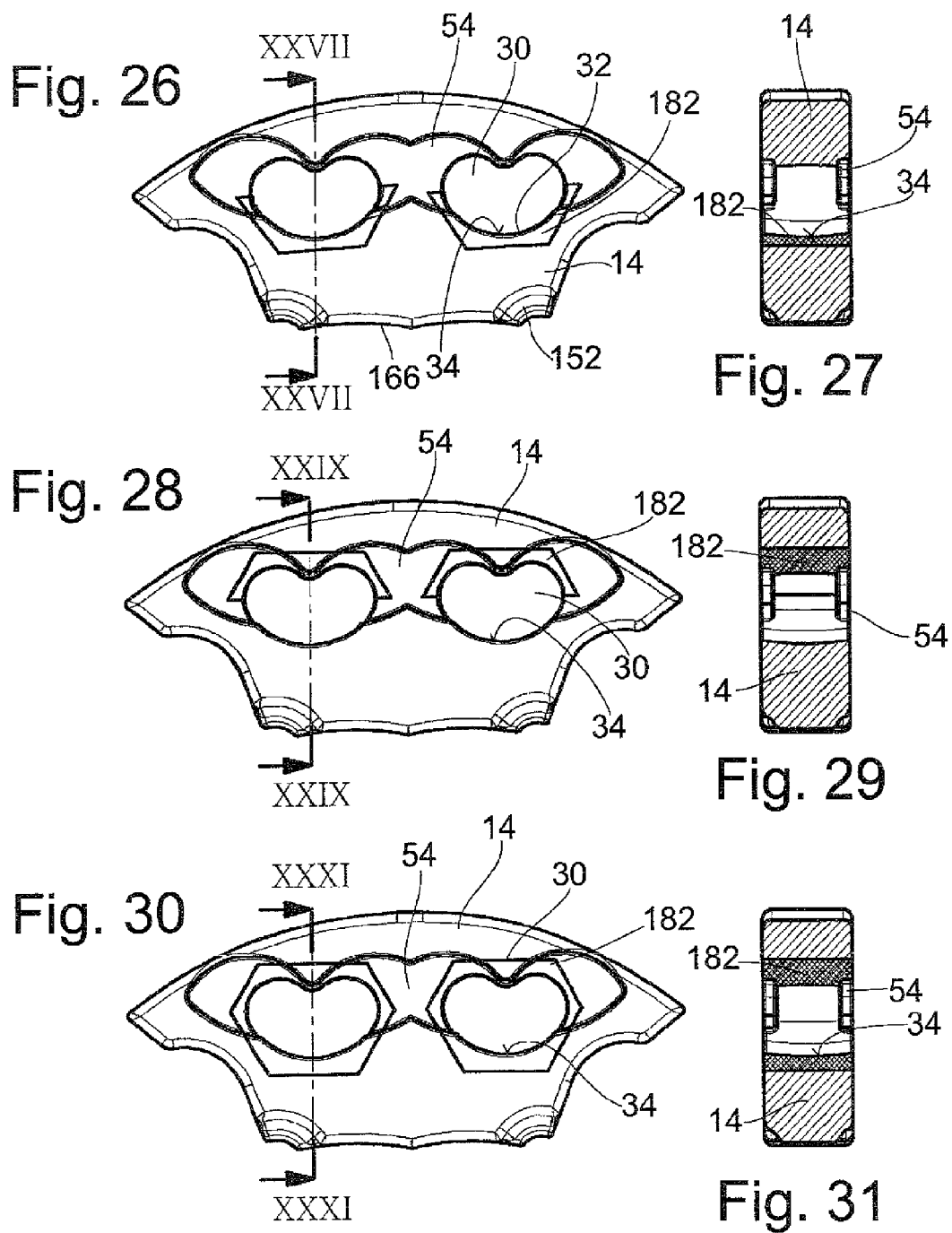

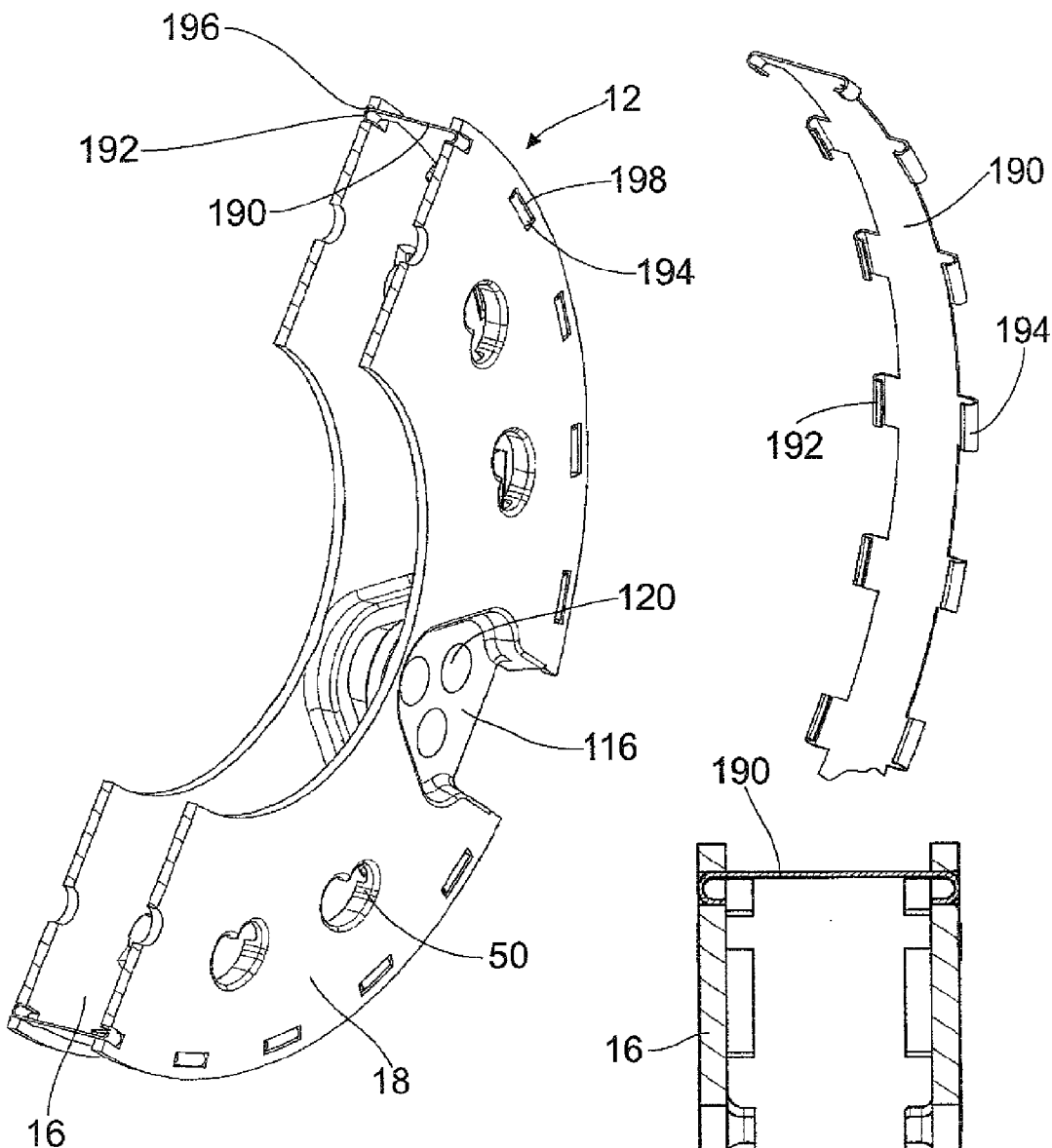
Fig. 37
Fig. 36
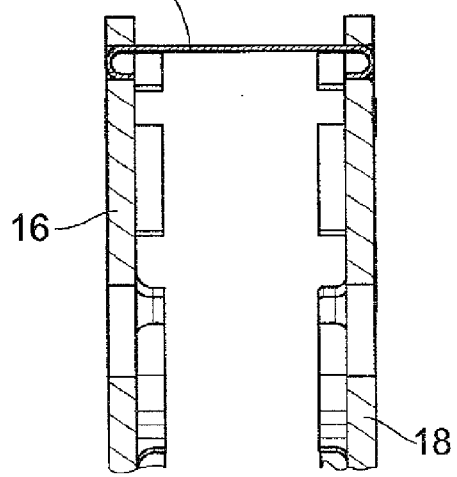
Fig. 38

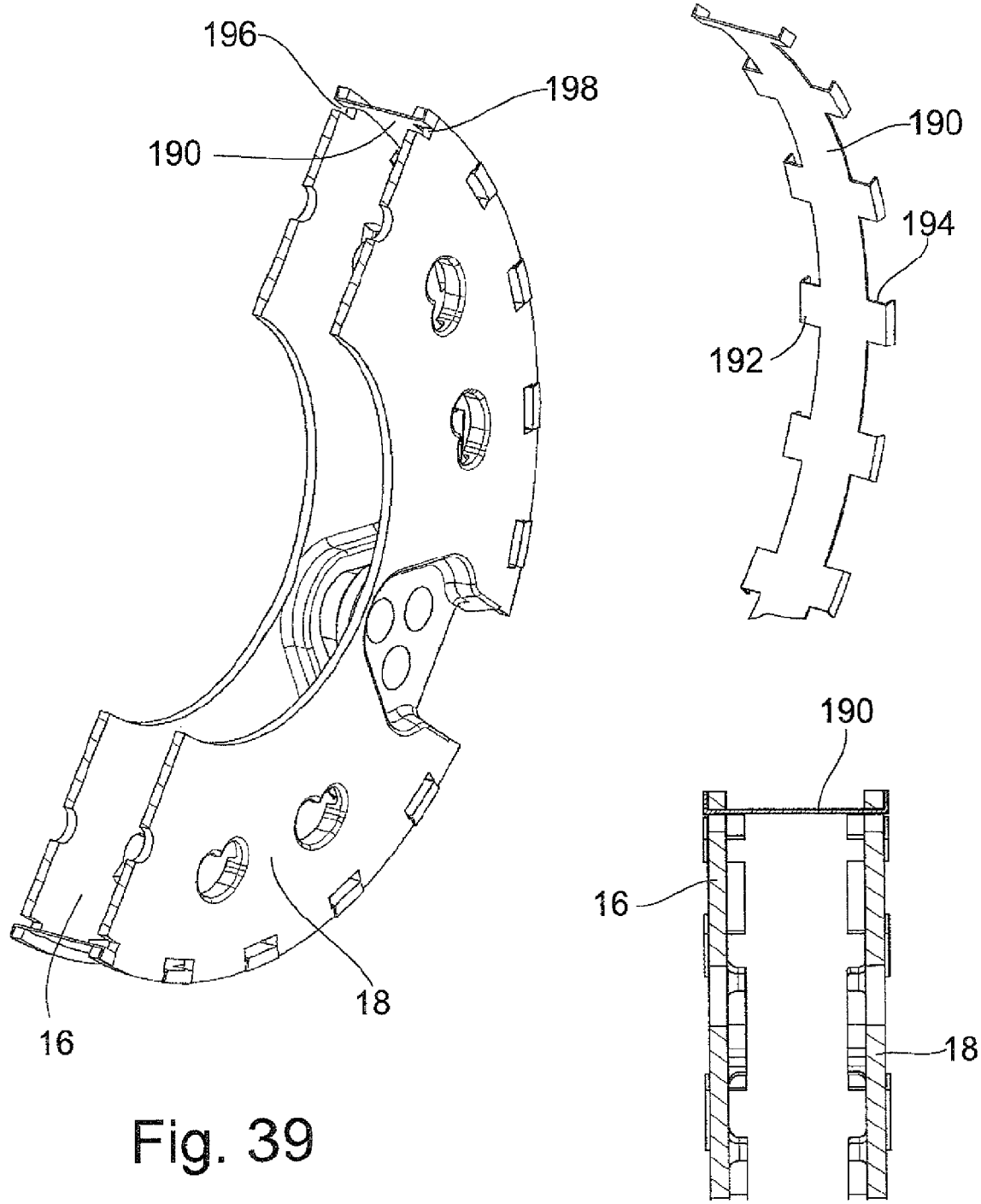

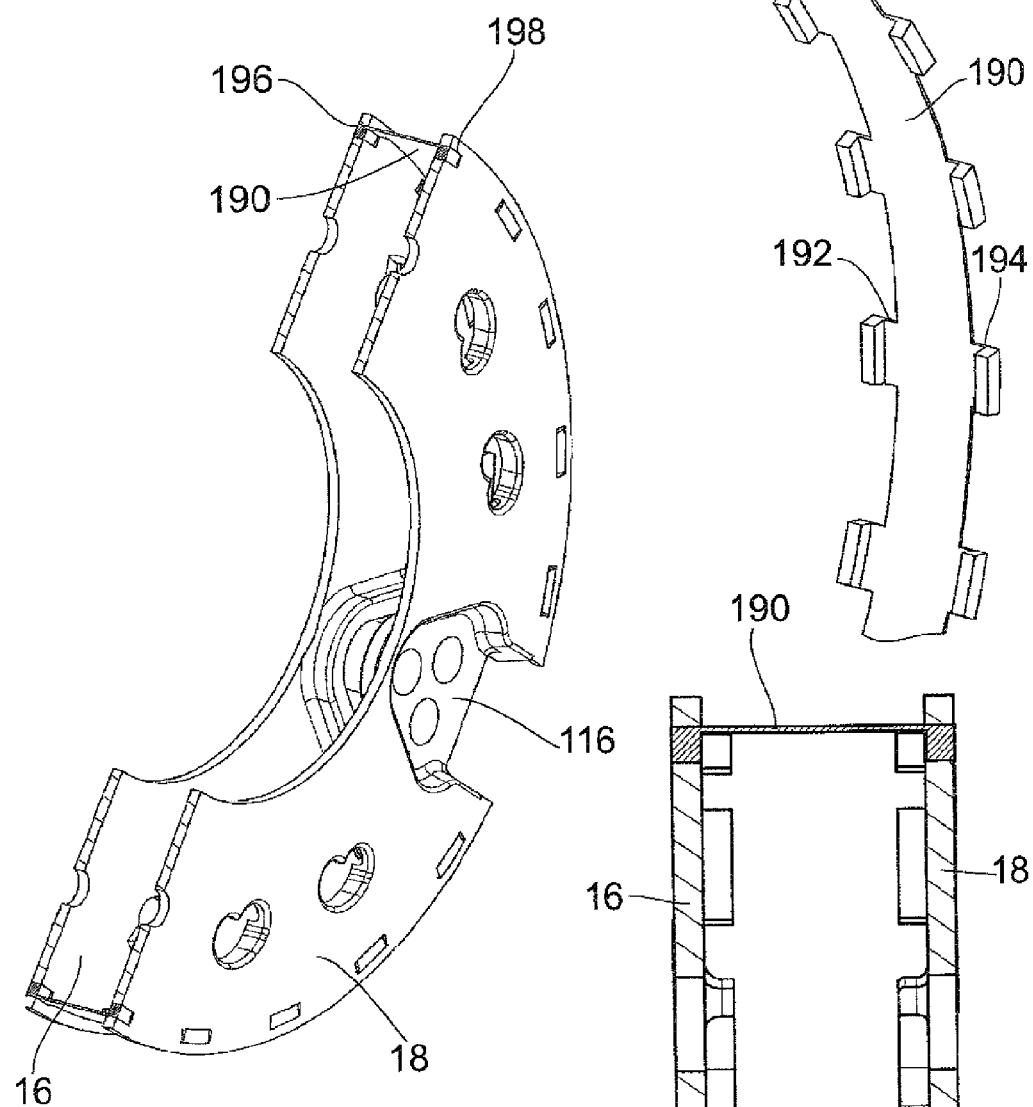
Fig. 46
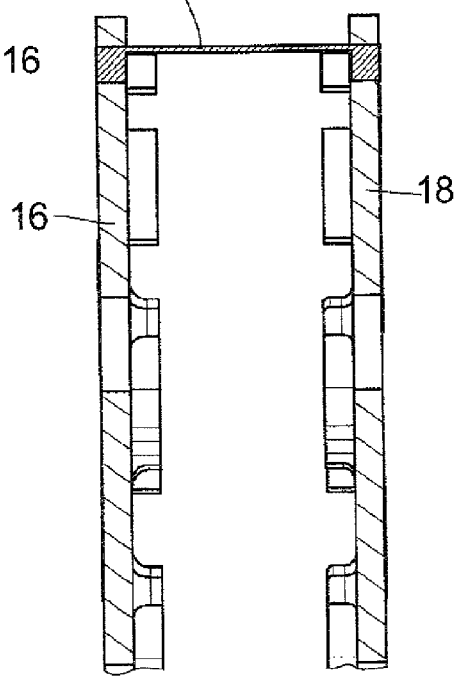
Fig. 45
Fig. 47

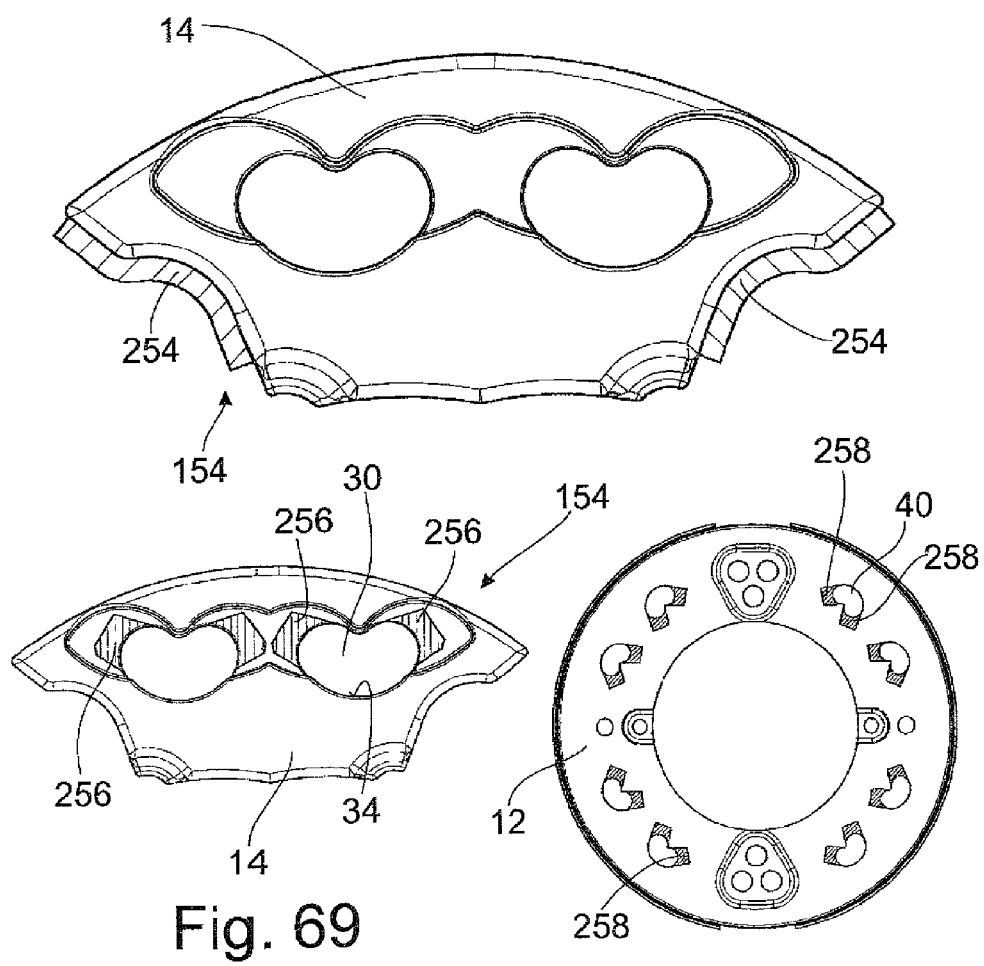

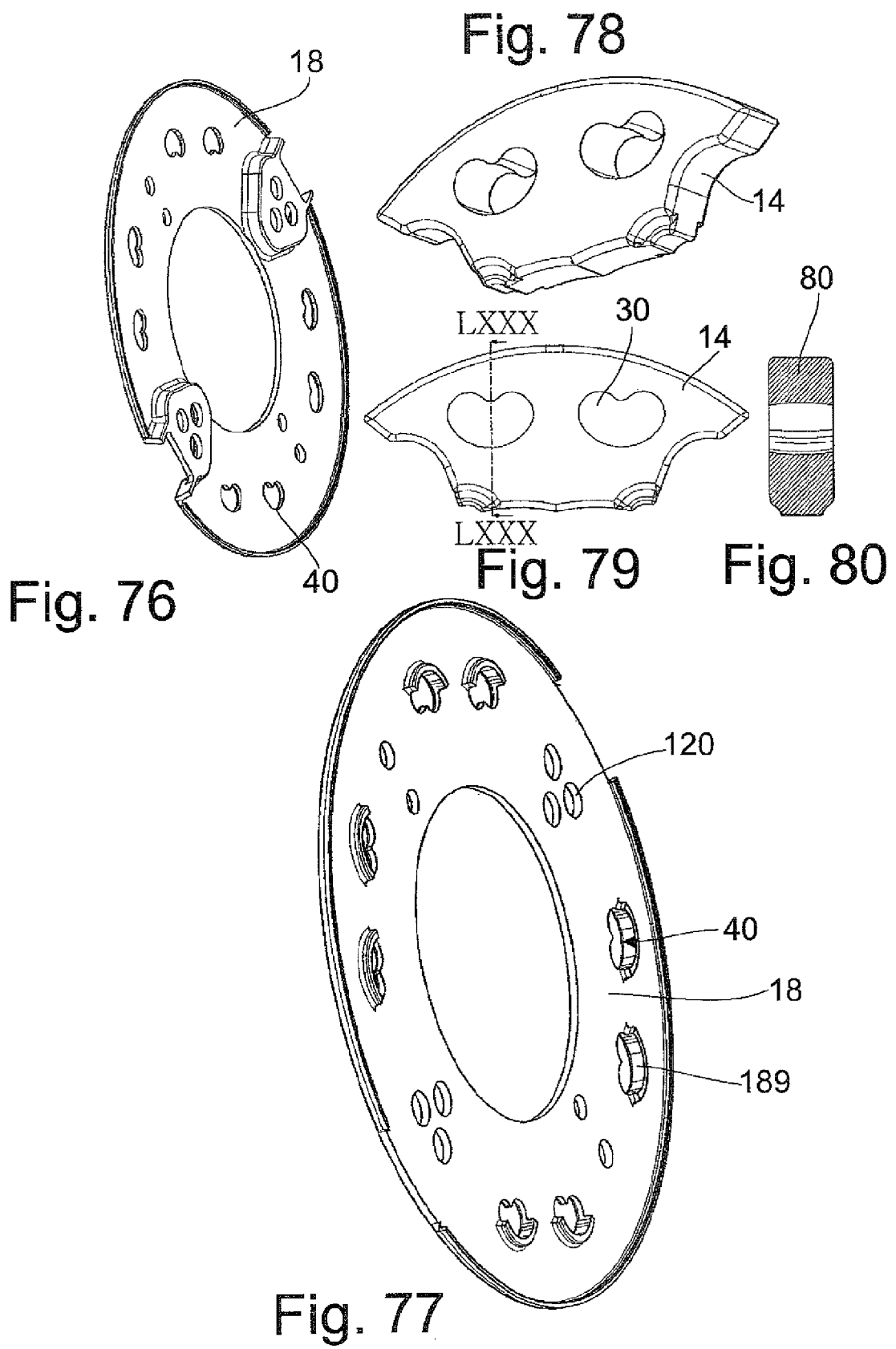

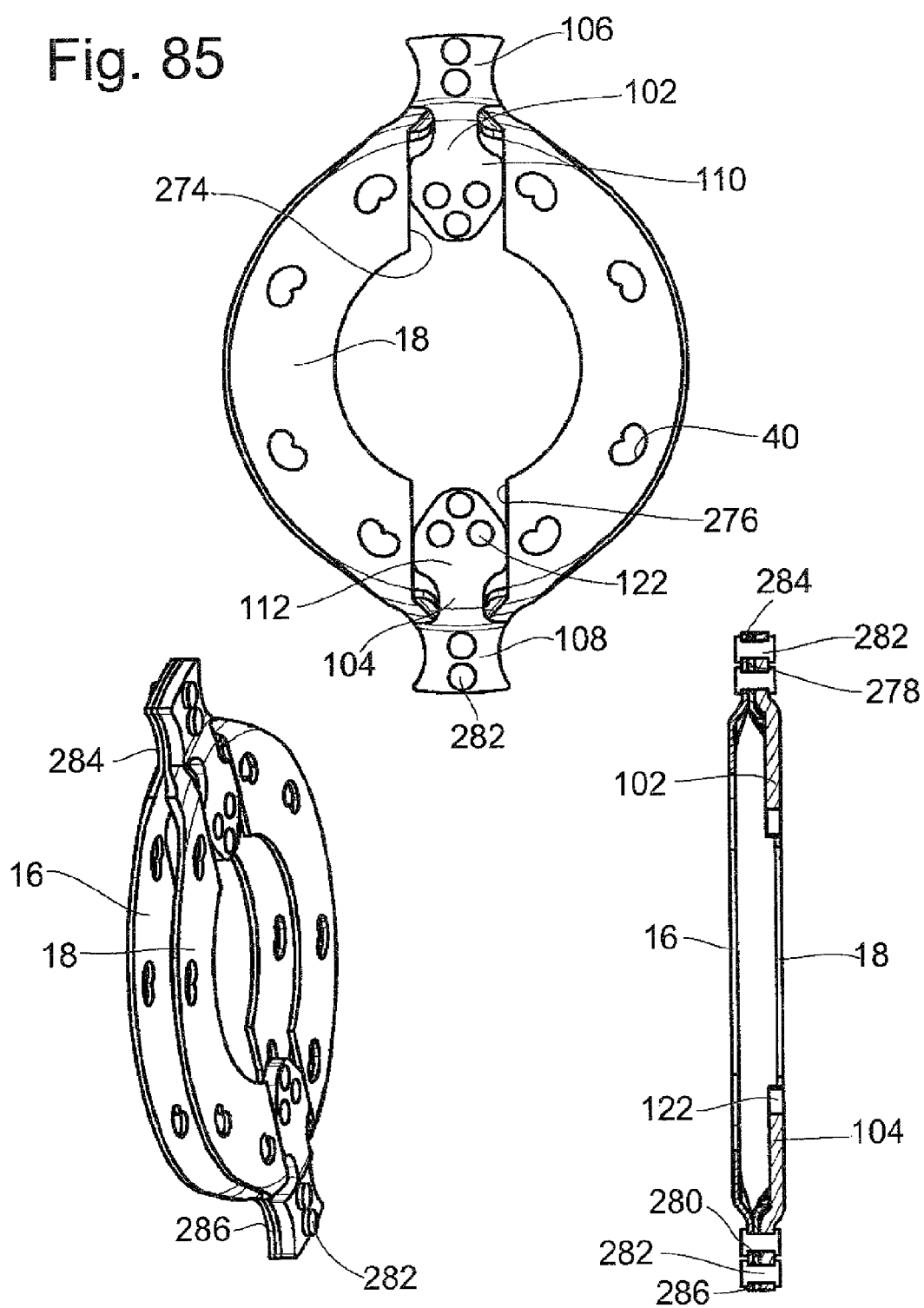

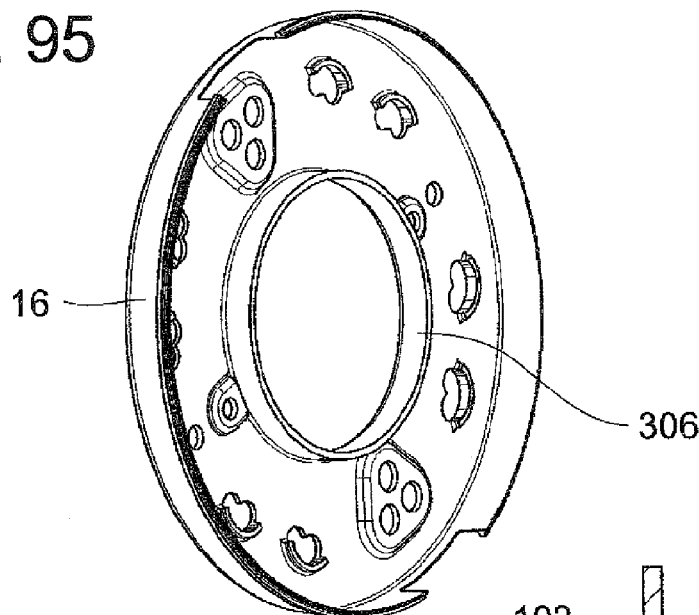
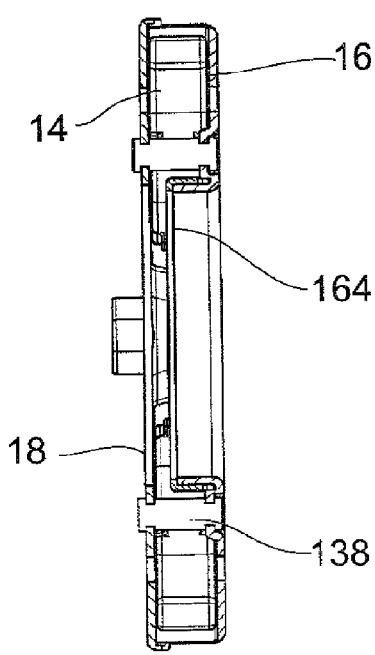
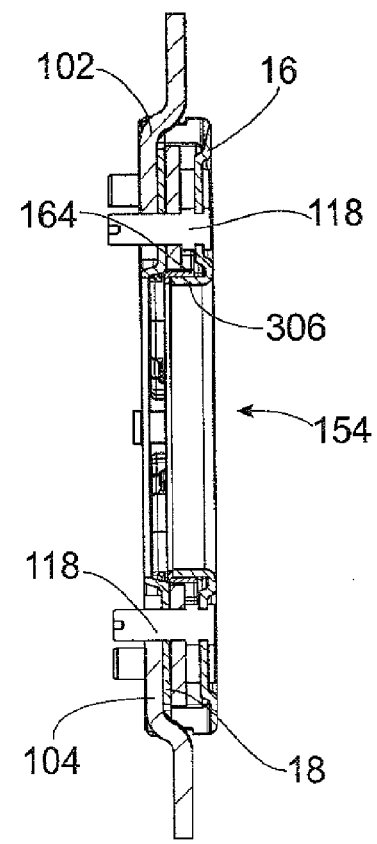
Fig. 95
Fig. 96
Fig. 97

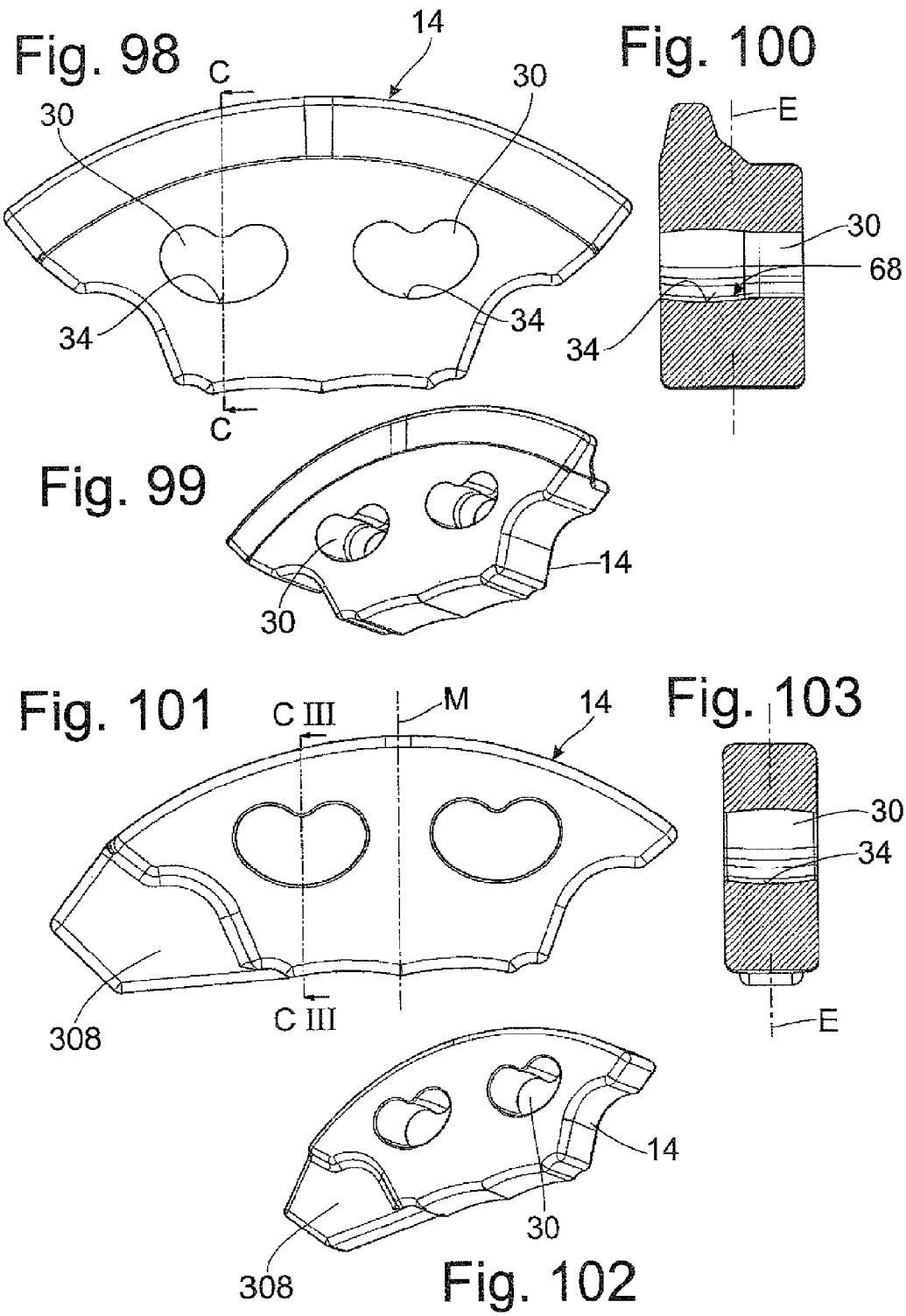

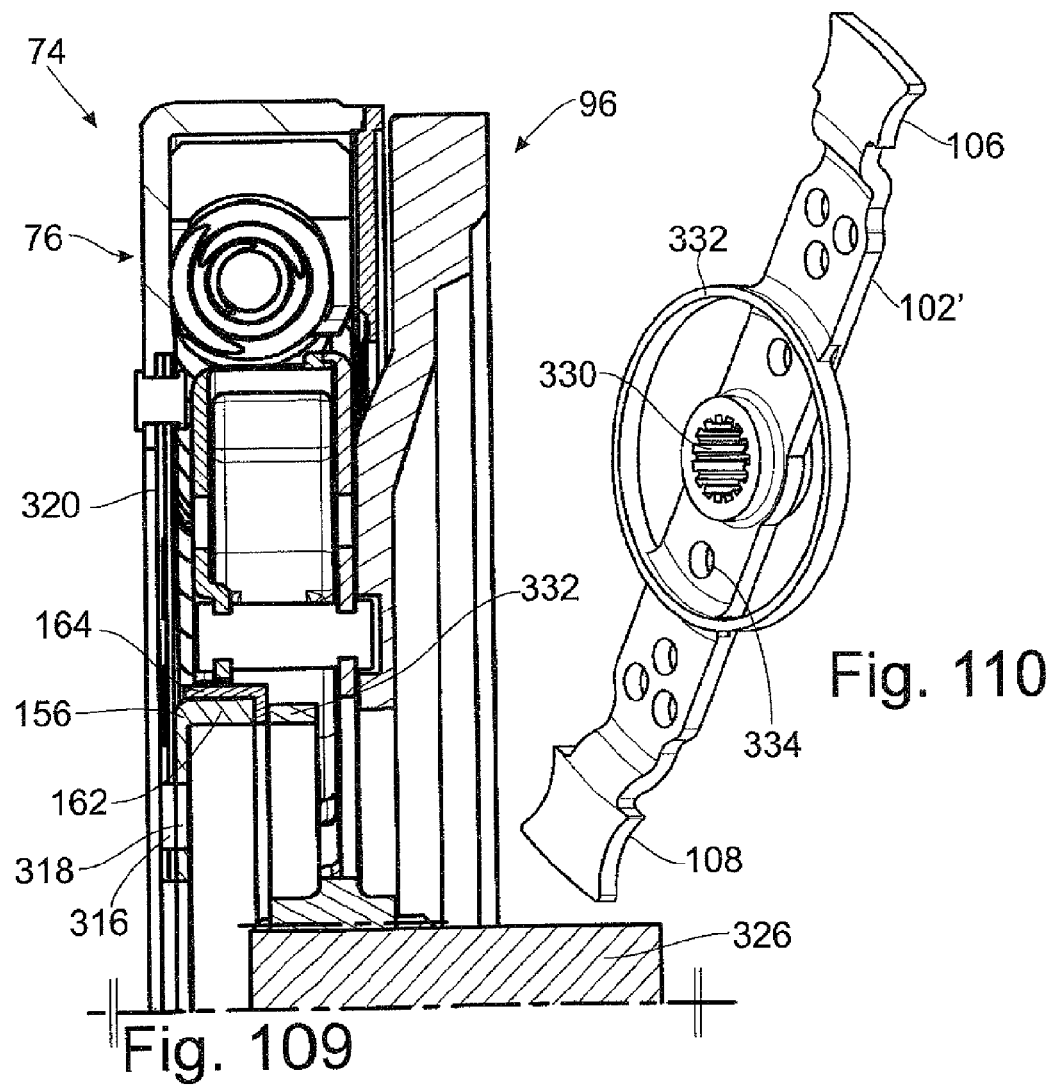
Fig. 109
Fig. 110
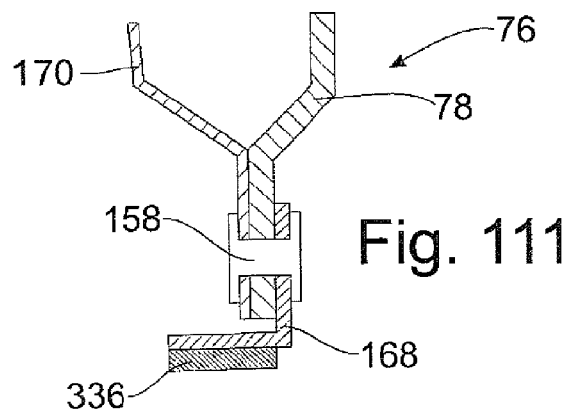
Fig. 111

TORSION VIBRATION DAMPER ASSEMBLY AND VIBRATION DAMPER DEVICE, IN PARTICULAR IN A TORSION VIBRATION DAMPER ASSEMBLY

PRIORITY CLAIM

This is a U.S. national stage of application No. PCT/EP2011/055596, filed on Apr. 11, 2011. Priority is claimed on the following application(s): Country: Germany, Application No.: 10 2010 029 464.0, Filed: May 28, 2010, the content of which is incorporated herein by reference in its entirety.

FIELD OF THE INVENTION

The present invention is directed to a torsional vibration damper arrangement, particularly for the drivetrain of a vehicle, comprising a primary side to be coupled to a driving member and a secondary side which is rotatable with respect to the primary side around an axis of rotation against the action of a damper element arrangement, wherein the primary side and the secondary side have circumferential supporting regions for damper elements of the damper element arrangement, wherein there is provided at the secondary side a vibration damper device having a deflection mass carrier and at least one deflection mass which is supported at the deflection mass carrier such that it can be deflected out of a basic position at a maximum distance from the axis of rotation into a deflection position at a shorter distance from the axis of rotation, and wherein the secondary side has at least one circumferential supporting element having at least one circumferential supporting region and a secondary-side mass element which is preferably shaped like an annular disk.

BACKGROUND OF THE INVENTION

DE 196 54 915 A1 discloses a vibration damper device in which vibration damping is achieved in that one or more deflection masses is or are deflected radially inwardly proceeding from a basic position in centrifugal potential, i.e., counter to the centrifugal force loading the deflection mass radially outwardly, when rotational irregularities occur. In order to realize this deflection, there are formed in each deflection mass two first guide tracks which are disposed adjacently in circumferential direction and which are directed substantially radially outwardly and which also have a radially outwardly curved guide surface. A guide track vertex is located in circumferential direction in a central region of every first guide track and provides the farthest radially inwardly situated region of every first guide track. A second guide track associated with every first guide track in a deflection mass is provided at the deflection mass carrier. This second guide track has a radially inwardly directed and also radially inwardly curved guide surface. A guide track vertex of every second guide track accordingly provides the farthest radially outwardly situated region of every second guide track. A roller-like guide body is associated with every pair comprising first guide track and second guide track. This guide body contacts the first guide track by an outer circumferential surface region and contacts the associated second guide track by another outer circumferential surface region. Owing to the fact that the curvature of the two guide tracks of every guide track pair runs in opposite directions, the guide body is able to position itself in the respective region of the two guide track vertices under centrifugal force so that every deflection mass occupies its radially outermost position when there is no deflection from the basic position. When rotational irregularities occur, the deflection masses move in circumferential direction with respect to the deflection mass carrier owing to the rotational acceleration acting in circumferential direction. The guide bodies move at the pair of guide tracks cooperating with them with the result that, during their circumferential movement, the deflection mass also moves radially inwardly and, thus absorbs potential energy in centrifugal potential.

A vibration damper device of the type mentioned above is also generally referred to as a speed-adaptive mass damper. It has no fixed resonance point but can be tuned to an excitation order which shifts, for example, with varying rotational speed also in the rotational speed range of a drivetrain or drive unit.

DE 196 54 894 A1 discloses a torsional vibration damper arrangement of the type mentioned in the beginning which can be constructed, for example, as a two-mass flywheel or in a clutch disk. Provided at a secondary side of the torsional vibration damper arrangement is a vibration damper device of the type described above, i.e., a vibration damper device constructed with deflection masses which can be excited to oscillation by rotational irregularities. By combining a torsional vibration damper arrangement working with damper elements, generally springs, on the one hand and a vibration damper device which is formed as a speed-adaptive mass damper and which is provided particularly at the secondary side of the torsional vibration damper arrangement on the other hand, an appreciably improved reduction in rotational irregularities occurring and propagating in a drivetrain is achieved through the combination of two vibration damping mechanisms.

It is an object of the present invention to provide a torsional vibration damper arrangement, particularly for the drivetrain of a vehicle, which is constructed in a compact manner and has a very high-quality decoupling between the primary side and secondary side.

SUMMARY OF THE INVENTION

According to the invention, this object is met through a torsional vibration damper arrangement, particularly for the drivetrain of a vehicle, comprising a primary side to be coupled to a driving member and a secondary side which is rotatable with respect to the primary side around an axis of rotation against the action of a damper element arrangement, wherein the primary side and the secondary side have circumferential supporting regions for damper elements of the damper element arrangement, wherein there is provided at the secondary side a vibration damper device having a deflection mass carrier and at least one deflection mass which is supported at the deflection mass carrier such that it can be deflected out of a basic position at a maximum distance from the axis of rotation into a deflection position at a shorter distance from the axis of rotation, wherein the secondary side has at least one circumferential supporting element having at least one circumferential supporting region and a secondary-side mass element which is preferably shaped like an annular disk.

Additional first connection elements are provided by which the secondary-side mass element is connected to the at least one circumferential supporting element on one hand and to the deflection mass carrier on the other hand.

On one hand, the fixed connection of three subassemblies by means of the first connection elements promotes a compact construction; on the other hand, the deflection mass carrier itself need not be constructed so as to transmit the torque occurring in a drivetrain. This results in a greater design freedom for constructing the deflection mass carrier, particularly with respect to its dimensioning and stability.

In an embodiment which allows great design freedom particularly in the radially inner area, at least two circumferential supporting elements are arranged at a circumferential distance from one another.

A very stable arrangement can be provided in that a circumferential supporting element having two circumferential supporting regions is provided.

The stability of connection particularly also between the circumferential supporting regions and the secondary-side mass part can be further increased in that a plurality of first connection elements are provided in association with each circumferential supporting region.

The first connection elements are preferably constructed as rivet bolts.

According to another aspect, it is suggested particularly for the construction of the vibration damper device that the deflection mass carrier comprises two carrier disks which are arranged at a distance from one another in direction of the axis of rotation. The carrier disks are fixedly connected to one another and receive between themselves the at least one deflection mass, wherein at least one first guide track with a substantially radially outwardly directed guide surface and a second guide track which is associated with the at least one first guide track in the at least one deflection mass in the deflection mass carrier and has a substantially radially inwardly directed guide surface are provided at the at least one deflection mass, wherein a guide body which is preferably formed as a rolling element is movable along the first guide track and second guide track during deflection of the at least one deflection mass from the basic position. A good encapsulation of the at least one deflection mass is achieved with this construction so that the deflection mass is protected from external influences, particularly also impurities.

The connection of the deflection mass carrier to the connection regions and secondary-side mass part, respectively, can be carried out, for example, in that at least one of the carrier disks is fixedly connected to at least one circumferential supporting element and the secondary-side mass part by first connection elements.

Particularly when the first connection elements are formed as rivet bolts, it can be provided that the primary side has cutouts associated with the first connection elements in order to obtain access to these connection elements for producing the connection.

The structural cohesion of the deflection mass carrier can be realized, for example, in that the carrier disks are fixedly connected to one another by second connection elements, preferably rivet bolts, preferably at positions located at a distance in circumferential direction with respect to the first connection elements. This means that the first connection elements need not necessarily also be used to connect the two carrier disks to one another.

At least one circumferential supporting element can be arranged at an outer side of a carrier disk remote of the other carrier disk so that the volume area between the two carrier disks is essentially available for the movement and positioning of the deflection masses.

To achieve an axially compact design at the same time, it is provided that one carrier disk has a depression that is directed to the other carrier disk for receiving at least one circumferential supporting element.

An improved integration of the vibration damper device in the torsional vibration damper arrangement for achieving a construction which is compact above all in axial direction can be accomplished in that the circumferential supporting region of the at least one circumferential supporting element arranged at the outer side of the one carrier disk is offset in direction of the axis of rotation toward the other carrier disk with respect to a connection region which is connected by first connection elements to the one carrier disk and which is situated at the outer side of thereof.

In an alternative embodiment, it is provided that at least one circumferential supporting element has a connection region which projects axially between the carrier disks and which is connected at least to one carrier disk by first connection elements. In this case, the carrier disks can be fixed to one another and the deflection mass carrier can also be fixed to the secondary-side mass part and circumferential supporting regions in an advantageous manner by the first connection elements.

In order that axial offsets or axial tilting occurring in the drivetrain can be compensated, it is further suggested that the primary side is constructed so as to allow wobbling movements with respect to the axis of rotation and/or is connected to a coupling element for connecting to a driving member, which coupling element allows wobbling movements.

According to another aspect of the invention which can be realized with the individual or combined groups of features mentioned above, but also by itself in principle, the present invention provides a vibration damper device comprising a deflection mass carrier and at least one deflection mass which is supported at the deflection mass carrier such that it can be deflected out of a basic position at a maximum distance from the axis of rotation into a deflection position at a shorter distance from the axis of rotation, wherein the deflection mass carrier comprises two carrier disks which are arranged at a distance from one another in direction of the axis of rotation, are fixedly connected to one another and receive between themselves the at least one deflection mass, wherein at least one first guide track with a substantially radially outwardly directed guide surface and a second guide track which is associated with the at least one first guide track in the at least one deflection mass in the deflection mass carrier and has a substantially radially inwardly directed guide surface are provided at the at least one deflection mass, wherein a guide body which is preferably formed as a rolling element is movable along the first guide track and second guide track during deflection of the at least one deflection mass from the basic position, wherein a first centering arrangement for the axial centering of at least one deflection mass is provided between the carrier disks and/or wherein a second centering arrangement for the axial centering of at least one guide body is provided between the two carrier disks.

By providing the first centering arrangement and/or the second centering arrangement, it is ensured that the various structural component parts are held in defined position in axial direction so that during the deflection of the at least one deflection mass defined movements can be generated on the one hand and movements which are as frictionless as possible can be generated on the other hand.

In an embodiment requiring no further additional structural component parts, it can be provided that in at least one pair comprising first guide track and guide body guided at the latter the first centering arrangement comprises between its axial end regions a concave shape either at the first guide track or at an outer circumferential surface of the guide body, which outer circumferential surface is in guiding contact with the guide surface of the first guide track, wherein the other respective surface, i.e., guide surface or outer circumferential surface, is convex between axial end regions thereof.

Alternatively, the first centering arrangement can comprise a magnet arrangement, and the magnet arrangement can comprise a first interaction region at at least one carrier disk and a second interaction region at at least one deflection mass.

In an alternate embodiment the first centering arrangement comprises at least one axial supporting element between at least one carrier disk and at least one deflection mass.

In an embodiment which can act in both axial directions in a particularly simple manner, the first centering arrangement comprises an axial centering projection at at least one guide body or a deflection mass cooperating therewith, wherein an axial centering cutout receiving the axial centering projection is provided at the other element, i.e., guide body or deflection mass.

An embodiment which only introduces very slight friction effects can be achieved in that the first centering arrangement comprises a rolling element bearing arrangement between at least one carrier disk and at least one deflection mass.

Also, through cooperation of at least one deflection mass with a deflection mass carrier, particularly the carrier disks thereof, an axial centering can be ensured in a simple manner in that the first centering arrangement comprises a convex centering region at at least one deflection mass or the carrier disks, wherein a concave centering region is provided at the other subassembly comprising deflection mass and carrier disks.

For the axial centering of at least one guide body without needing to use additional structural component parts for this purpose, it can be provided that the second centering arrangement in association with at least one carrier disk comprises a centering shoulder extending radially outwardly with respect to a longitudinal axis of the guide body.

To achieve the best possible fit, it is suggested that the centering shoulder is formed with an axial recess at a radially inner region.

Since a guide body generally cooperates with the various guide tracks in different axial regions, it can be provided by making use of the spatial separation of different outer circumferential surface regions of the guide body which are provided for this purpose that the centering shoulder is provided in a transitional area between an outer circumferential surface region contacting a second guide track and an outer circumferential surface region of an outer circumferential surface of the guide body contacting a first guide track.

In an alternative embodiment the second centering arrangement comprises at at least one carrier disk a centering region which overlaps an axial end face of the guide body.

According to a further aspect of the present invention which can also be realized with the various groups of features discussed above individually or in combination, there is provided a vibration damper device comprising a deflection mass carrier and at least one deflection mass which is supported at the deflection mass carrier such that it can be deflected out of a basic position at a maximum distance from the axis of rotation into a deflection position at a shorter distance from the axis of rotation, wherein the deflection mass carrier comprises two carrier disks which are arranged at a distance from one another in direction of the axis of rotation, are fixedly connected to one another and receive between themselves the at least one deflection mass, wherein at least one first guide track with a substantially radially outwardly directed guide surface and a second guide track which is associated with the at least one first guide track in the at least one deflection mass in the deflection mass carrier and has a substantially radially inwardly directed guide surface are provided at the at least one deflection mass, wherein a guide body which is preferably formed as a rolling element is movable along the first guide track and second guide track during deflection of the at least one deflection mass from the basic position, wherein the deflection mass carrier comprises an outer circumferential wall in a radially outer region.

By providing an outer circumferential wall, an improved enclosure of the volume area containing the at least one deflection mass is also achieved radially outwardly.

To achieve a connection of the outer circumferential wall to other subassemblies of the deflection mass carrier in a simple manner, at least one cutout is provided in at least one carrier disk for receiving at least one coupling segment of the outer circumferential wall. In this connection, at least one coupling segment can be held in a coupling cutout by clamping force.

A further improved cohesion between the outer circumferential wall and at least one carrier disk can be ensured in that at least one coupling segment penetrates a cutout and the carrier disk engages behind an outer side remote of the other carrier disk.

According to a further aspect of the present invention which can also be provided with the above-mentioned groups of features individually or in combination, there is provided a vibration damper device comprising a deflection mass carrier and at least one deflection mass which is supported at the deflection mass carrier such that it can be deflected out of a basic position at a maximum distance from the axis of rotation into a deflection position at a shorter distance from the axis of rotation, wherein the deflection mass carrier comprises two carrier disks which are arranged at a distance from one another in direction of the axis of rotation, are fixedly connected to one another and receive between themselves the at least one deflection mass, wherein at least one first guide track with a substantially radially outwardly directed guide surface and a second guide track which is associated with the at least one first guide track in the at least one deflection mass in the deflection mass carrier and has a substantially radially inwardly directed guide surface are provided at the at least one deflection mass, wherein a guide body which is preferably formed as a rolling element is movable along the first guide track and second guide track during deflection of the at least one deflection mass from the basic position, wherein a movement limiting arrangement is provided for limiting the movement of at least one deflection mass during deflection out of the basic position.

By providing a movement limiting arrangement of at least one deflection mass, it is ensured that the latter can be deflected only to a defined extent and excessive deflection conditions or stop interactions which occur in so doing are prevented.

For example, it can be provided that the movement limiting arrangement comprises at least one movement stop which is arranged radially inside of the at least one deflection mass. Accordingly, efficient use is made of the installation space that is generally available radially inside of the at least one deflection mass. For example, it can be provided that the movement stop comprises a preferably annular stop element arranged at the primary side.

In an alternative embodiment which can, however, also be combined with the variants described above, it is suggested that the movement limiting arrangement comprises at least one movement stop which is arranged adjacent to the deflection mass in circumferential direction. In this connection the movement stop may comprise at least one stop element arranged at the secondary side.

In particular, a merging of functions and, therefore, a simpler and more compact construction can be provided in that at least one circumferential supporting element provides a stop element of the movement stop.

To prevent damage and noise when a deflection mass impinges on the movement stop, it is suggested that resilient stop damping material is provided at the movement stop and/or at the deflection mass.

For a defined limiting of movement of at least one deflection mass in another embodiment which is distinguished particularly by efficient use of installation space, it can be provided that, at at least a first guide track and/or at at least a second guide track which is preferably associated with the at least one first guide track, the movement limiting arrangement comprises a resilient movement stop for a guide body contacting this guide track.

In another embodiment, it is suggested that the movement limiting arrangement comprises at least one first guide track and/or at least one second guide track which is preferably associated with the at least one first guide track, this at least one first guide track being curved in such a way that the guide track extends substantially or approximately parallel to a radial line in at least one end region of guide track legs which are provided on both sides of a guide track vertex in circumferential direction. That is, purely through the geometry of the correspondingly shaped guide track, it is ensured in this case that even when comparatively large circumferential accelerations occur they cannot lead to an excessive movement away from the guide track vertex due to the positioning of the guide track approximately parallel to a radial line in the end regions thereof.

preferably, an angle formed between the guide track and the radial line is less than 30°, preferably less than 20°, in the at least one end region.

According to a further aspect of the present invention which can also be applied with the above-described groups of features individually or in combination, there is provided a vibration damper device comprising a deflection mass carrier and at least one deflection mass which is supported at the deflection mass carrier such that it can be deflected out of a basic position at a maximum distance from the axis of rotation into a deflection position at a shorter distance from the axis of rotation, wherein the deflection mass carrier comprises two carrier disks which are arranged at a distance from one another in direction of the axis of rotation, are fixedly connected to one another and receive between themselves the at least one deflection mass, wherein at least one first guide track with a substantially radially outwardly directed guide surface and a second guide track which is associated with the at least one first guide track in the at least one deflection mass in the deflection mass carrier and has a substantially radially inwardly directed guide surface are provided at the at least one deflection mass, wherein a guide body which is preferably formed as a rolling element is movable along the first guide track and second guide track during deflection of the at least one deflection mass from the basic position, wherein at least one deflection mass is formed with a plurality of deflection mass parts and/or at least one deflection mass is formed with an asymmetrical shape with respect to a mass centroid thereof in circumferential direction and/or in axial direction. Further, the asymmetrical shape in circumferential direction or in axial direction makes it possible to take into account other structural factors in the immediate environment of a deflection mass.

For example, the at least one deflection mass can comprise a plurality of deflection mass parts disposed successively in radial direction. Alternatively or in addition, it is possible that the at least one deflection mass comprises a plurality of deflection mass parts disposed successively in axial direction. In this connection, a region of at least one first guide track can be formed at at least two of the deflection mass parts, respectively, to distribute the load acting on a deflection mass.

According to a further aspect of the present invention which can also be utilized with the above-described features individually or in combination, the present invention is directed to a vibration damper device comprising a deflection mass carrier and at least one deflection mass which is supported at the deflection mass carrier such that it can be deflected out of a basic position at a maximum distance from the axis of rotation into a deflection position at a shorter distance from the axis of rotation, wherein the deflection mass carrier comprises two carrier disks which are arranged at a distance from one another in direction of the axis of rotation. The disks are fixedly connected to one another and receive between themselves the at least one deflection mass, wherein at least one first guide track with a substantially radially outwardly directed guide surface and a second guide track which is associated with the at least one first guide track in the at least one deflection mass in the deflection mass carrier and has a substantially radially inwardly directed guide surface are provided at the at least one deflection mass, wherein a guide body which is preferably formed as a rolling element is movable along the first guide track and second guide track during deflection of the at least one deflection mass from the basic position, wherein at least a first guide track is formed at at least one deflection mass in the region of a first guide track element supported at the deflection mass and/or wherein at least a second guide track is formed at at least one carrier disk at least in some areas in the region of an axial protuberance of the carrier disk and/or at least in some areas in the region of a second guide track element supported at the carrier disk.

By providing guide tracks at elements which are furnished specifically for this purpose and which are arranged at the deflection mass carrier or deflection mass, it is possible on the one hand that the geometry of the individual guide tracks or of the surfaces providing these individual guide tracks can be manufactured with high precision in a simple manner. On the other hand, it is possible to use construction material for these guide track elements which can be specially selected with a view to the occurring loads.

For example, at least one first guide track can be formed in an aperture of the at least one deflection mass and that at least one first guide track element is provided at a radial inner side and/or a radial outer side of the aperture.

Alternatively or in addition, at least one second guide track element is supported at an inner side of the at least one carrier disk, which inner side faces the other carrier disk. In this embodiment, the carrier disks themselves need not have any apertures providing the guide tracks. Nevertheless, it can also be provided in the region of the deflection mass carrier that at least a portion of at least one second guide track is formed in an aperture of the at least one carrier disk and that at least a second guide track element is provided at a radial outer side and/or at a radial inner side of the aperture.

According to a further aspect of the present invention which can also be practiced with the above-described features individually or in combination, there is provided a vibration damper device comprising a deflection mass carrier and at least one deflection mass which is supported at the deflection mass carrier such that it can be deflected out of a basic position at a maximum distance from the axis of rotation into a deflection position at a shorter distance from the axis of rotation, wherein the deflection mass carrier comprises two carrier disks which are arranged at a distance from one another in direction of the axis of rotation, are fixedly connected to one another and receive between themselves the at least one deflection mass, wherein at least one first guide track with a substantially radially outwardly directed guide surface and a second guide track which is associated with the at least one first guide track in the at least one deflection mass in the deflection mass carrier and has a substantially radially inwardly directed guide surface are provided at the at least one deflection mass, wherein a guide body which is preferably formed as a rolling element is movable along the first guide track and second guide track during deflection of the at least one deflection mass from the basic position, wherein an inner surface of the deflection mass carrier and a radially outer surface of at least one deflection mass are located opposite one another radially, wherein at least one first guide track is formed at a radially inwardly extending first radial depression of the radially outer surface of the at least one deflection mass, and at least one second guide track is formed at a radially outwardly extending second radial depression of the inner surface of the deflection mass carrier, and wherein a guide body is received in each pair comprising first radial depression and second radial depression.

Accordingly, in this embodiment a pair of radially opposed depressions is formed, and these depressions form a receiving space for a guide body and therefore receive this guide body between themselves in a defined position.

BRIEF DESCRIPTION OF THE DRAWINGS

The present invention will be described in more detail in the following with reference to the accompanying drawings. The drawings show:

FIG. 2 the vibration damper device of FIG. 1 with open deflection mass carrier;

FIG. 3 an axial view of the vibration damper device of FIG. 1 viewed from the left-hand side;

FIG. 4 an axial view of the vibration damper device of FIG. 1 with the left-hand carrier disk omitted;

FIG. 22 an alternative embodiment of a vibration damper device in an axial view;

FIG. 23 a partial sectional view sectioned along line XXIII-XXIII in FIG. 22;

FIG. 24 an alternative embodiment of a vibration damper device in an axial view;

FIG. 25 a sectional view of the vibration damper device of FIG. 24, sectioned along a line XXV-XXV;

FIG. 26 an axial view of a deflection mass;

FIG. 27 the deflection mass of FIG. 26 sectioned along a line XXVII-XXVII;

FIG. 28 an axial view of a deflection mass;

FIG. 29 a sectional view of the deflection mass of FIG. 28 sectioned along a line XXIX-XXIX;

FIG. 30 an axial view of a deflection mass;

FIG. 31 A sectional view of the deflection mass of FIG. 30 sectioned along a line XXXI-XXXI;

FIG. 36 a perspective partial view of a deflection mass carrier;

FIG. 37 a partial view of an outer circumferential wall of the deflection mass carrier of FIG. 36;

FIG. 38 a partial axial sectional view of the deflection mass carrier of FIG. 36;

FIG. 39 a perspective partial view of a deflection mass carrier;

FIG. 40 a partial view of an outer circumferential wall of the deflection mass carrier of FIG. 39;

FIG. 41 a partial axial sectional view of the deflection mass carrier of FIG. 39;

FIG. 45 a perspective partial view of a deflection mass carrier;

FIG. 46 a partial view of an outer circumferential wall of the deflection mass carrier of FIG. 45;

FIG. 47 a partial axial sectional view of the deflection mass carrier of FIG. 45;

FIG. 68 an axial view of a deflection mass;

FIG. 69 an axial view of a deflection mass;

FIG. 70 an axial view of a carrier disk of a deflection mass carrier;

FIG. 76 a perspective view of a carrier disk;

FIG. 77 a perspective view of a carrier disk;

FIG. 78 a perspective view of a deflection mass;

FIG. 79 the deflection mass of FIG. 78 in an axial view;

FIG. 80 a sectional view of the deflection mass of FIG. 79 sectioned along a line LXXX-LXXX;

FIG. 85 an axial view of a deflection mass carrier with two circumferential supporting elements;

FIG. 86 a perspective view of the deflection mass carrier shown in FIG. 85;

FIG. 87 a sectional view of the deflection mass carrier shown in FIG. 85;

FIG. 95 a perspective view of a carrier disk of a deflection mass carrier;

FIG. 96 an axial sectional view of a vibration damper device;

FIG. 97 an axial sectional view of a vibration damper device;

FIG. 98 an axial view of a deflection mass;

FIG. 99 a perspective view of the deflection mass of FIG. 98;

FIG. 100 a sectional view of the deflection mass of FIG. 98 sectioned along a line C-C in FIG. 98;

FIG. 101 an axial view of a deflection mass;

FIG. 102 a perspective view of the deflection mass of FIG. 101;

FIG. 103 a sectional view of the deflection mass of FIG. 101 sectioned along a line CIII-CIII;

FIG. 109 a partial axial sectional view of a torsional vibration damper arrangement with a vibration damper device;

FIG. 110 a circumferential supporting element with two circumferential supporting regions for the torsional vibration damper arrangement of FIG. 109;

FIG. 111 the radially inner region of a primary side of a torsional vibration damper arrangement;

DETAILED DESCRIPTION OF THE PRESENTLY PREFERRED EMBODIMENTS

Referring to FIGS. 1 to 19, an embodiment of the present invention of a torsional vibration damper arrangement and a vibration damper device for a torsional vibration damper arrangement which is constructed, for example, according to the principle of a two-mass flywheel will be described in the following.

Figure 1:
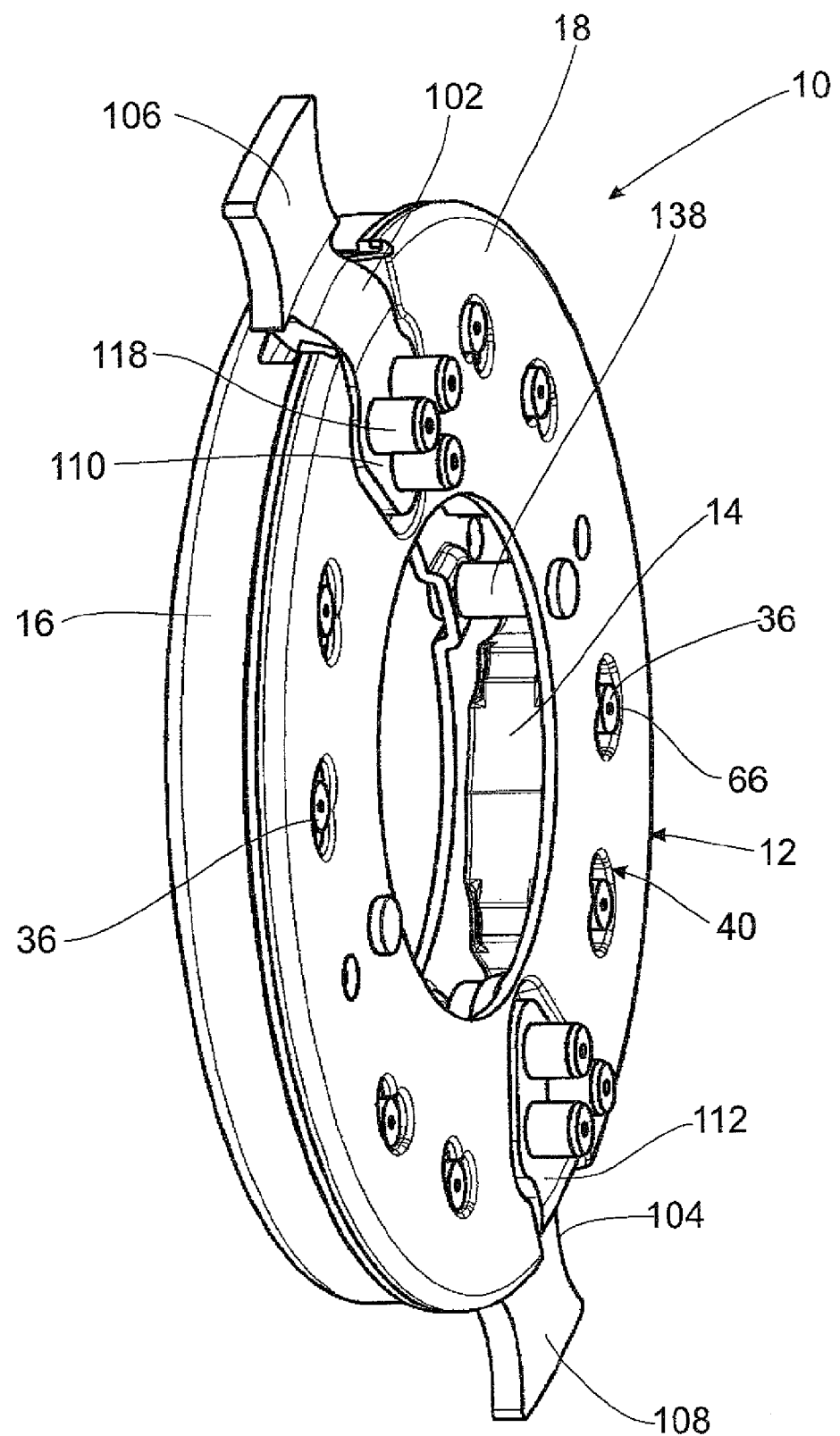
FIG. 1 a vibration damper device for integrating in a torsional vibration damper arrangement.
Figure 5:
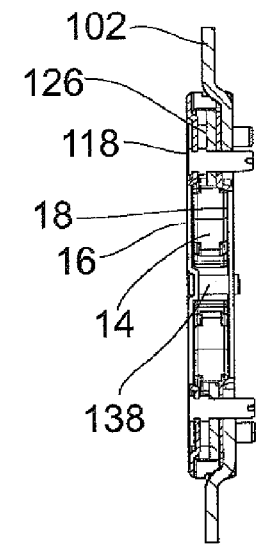
FIG. 5 a longitudinal sectional view through the vibration damper device of FIG. 1.
Figure 7:
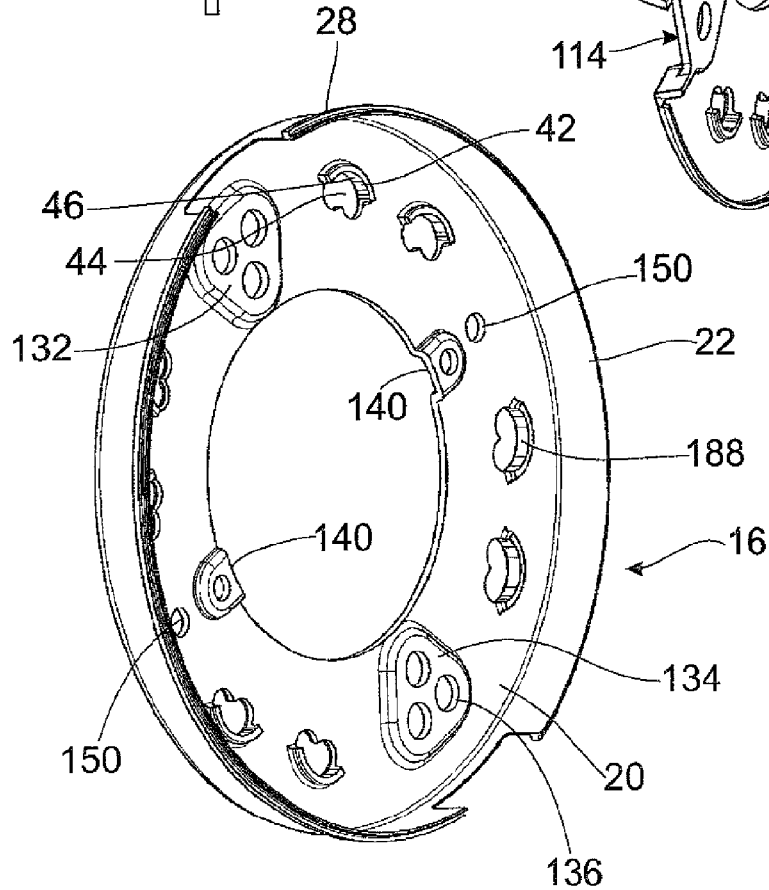
FIG. 7 a perspective view of the left-hand carrier disk of the vibration damper device of FIG. 1.
Figure 8:
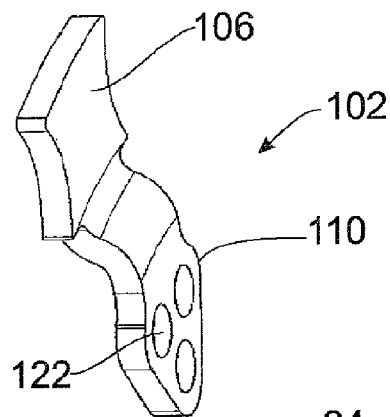
FIG. 8 a circumferential supporting element.

FIG. 1 shows a perspective view of a vibration damper device 10 which is constructed with a deflection mass carrier 12 and a plurality of deflection masses 14 which are arranged therein and which can be deflected with respect to the deflection mass carrier 12. The deflection mass carrier 12 comprises two carrier disks 16, 18 which are constructed from sheet metal material, for example. The carrier disk 16, shown on the left-hand side in FIG. 1, which is positioned closer to a drive unit, for example, and which is also shown in FIG. 7 has an approximately radially extending region 20 and an outer circumferential wall region 22 radially outwardly adjoining the latter. In a corresponding manner, the carrier disk 18, shown on the right-hand side in FIG. 1, which is positioned closer to a transmission arrangement, for example, also has a radially extending region 24 and a comparatively short collar-like outer circumferential wall region 26. In the assembled state, as is shown in FIG. 1, the collar-shaped outer circumferential wall region 26 of the carrier disk 18 overlaps the axial end region of the outer circumferential wall region 22 and in so doing is situated adjacent to a radial collar 28, for example. In this radially outer region in which the two outer circumferential wall regions 26, 22 overlap one another, the two carrier disks 16, 18 can be connected to one another, for example, by welding, in order to fixedly connect the two carrier disks 16, 18 of the deflection mass carrier to one another. However, alternatively or in addition, this connection can also be carried out in another manner as will be described in the following.

Figure 10:
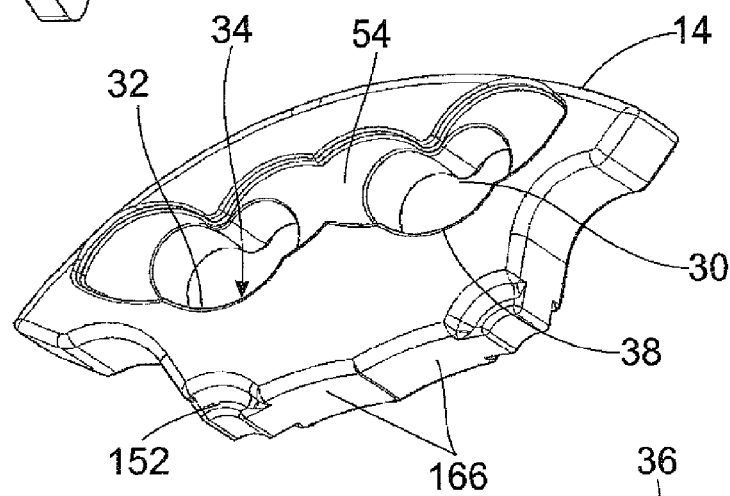
FIG. 10 a perspective view of a deflection mass.

In the volume area enclosed by the deflection mass carrier 12, four deflection masses 14 are arranged successively in circumferential direction as will also be seen, for example, in FIGS. 2 and 4. As is shown in FIG. 10, two approximately kidney-shaped apertures 30 located adjacent to one another are formed in each of these deflection masses 14. A surface 32 of each aperture 30 which limits these apertures toward the radially inner side and is curved substantially radially outwardly forms a first guide track 34 for a roller-like guide body 36 which is shown in a perspective view in FIG. 12, for example. Two first guide tracks 34 of this kind which are curved radially outwardly and have a guide track vertex 38 in their circumferential center region are provided in each deflection mass 14.

A second guide track 40 associated with every first guide track 34 is provided at the deflection mass carrier 12. Each second guide track 40 comprises two guide track portions. One guide track portion 42 is formed at a guide surface 46 which radially outwardly limits a respective aperture 44 in the carrier disk 16 and which is curved radially inwardly. A second portion 48 of each second guide track 40 is formed at a guide surface 52 of carrier disk 18 which radially outwardly limits a respective aperture 50 and which is curved radially inwardly. The two guide track portions 42, 48 of a respective second guide track 40 are located axially opposite one another and are aligned with one another in circumferential direction.

Figure 6:
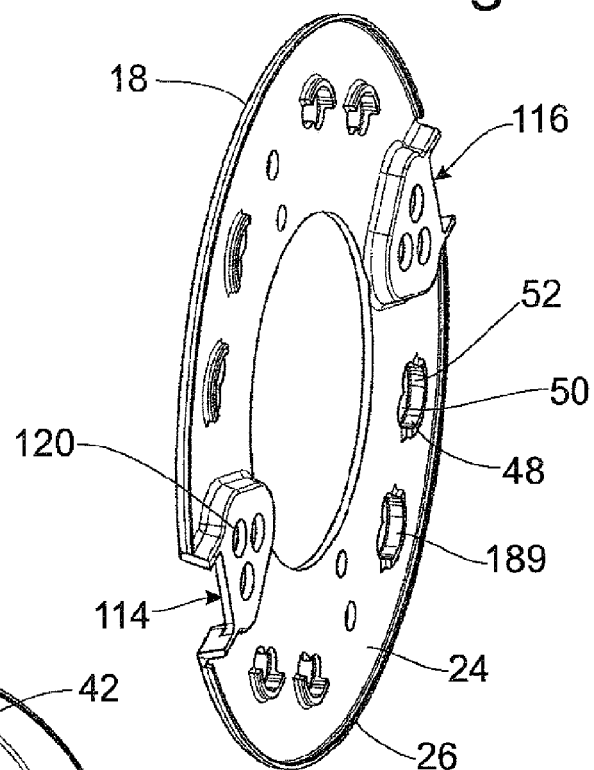
FIG. 6 a perspective view of the right-hand carrier disk of the vibration damper device of FIG. 1.

It will be seen in FIGS. 6 and 7 that the guide track portions 42, 44 are formed substantially at protuberances 188, 189 of the respective radially extending regions 20, 24 of the carrier disks 16, 18, these protuberances 188, 189 extending toward the interior of the deflection mass carrier. Compared to the thinner construction material of the carrier disks 16, 18, this results in an axially comparably wide guide surface 46 and 52, respectively.

In order that mutual interference of the deflection masses 14 and the axial protuberances 188, 189 of the carrier disks 16, 18 at which the guide surfaces 46, 52 are provided can be prevented in the assembled state, the deflection masses 14 have indentations 54 in the region adjoining the apertures 30. These indentations 54 are shaped in such a way that the axial protuberances 188, 189 can be received in these indentations 54 and during the movement of the deflection masses 14 with respect to the carrier disks 16, 18 substantially do not enter into contact with them.

Figure 12:
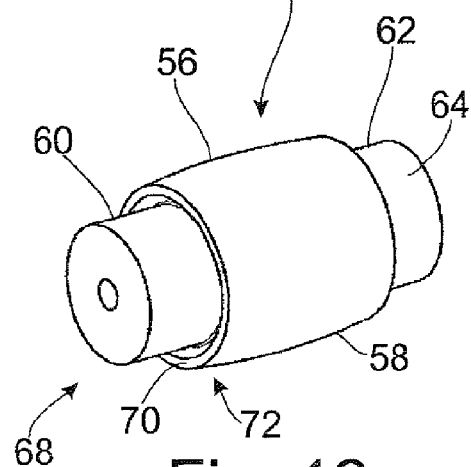
FIG. 12 a perspective view of a guide body for a deflection mass.

The roller-like guide body shown in FIG. 12 has an outer circumferential surface 58 with a central outer circumferential surface region 56 which enters into contact with the guide surface 32 and with a first guide track 34 of a deflection mass 14, respectively. Portions 60, 62 of another outer circumferential surface region 64, each of which contacts the guide surfaces 46, 52 and the portions 42, 48 of a second guide track 40, respectively, are provided at the axial end regions of the guide body 36. By means of a rolling movement the guide bodies 36 can accordingly move along the respective first guide track 34 and second guide track 40 which cooperate with them.

In rotational operation the deflection masses 14 are in a state of minimum potential energy in centrifugal potential due to centrifugal force, i.e., are arranged in the farthest possible radially outward position. This means that the guide bodies 36 are positioned with their outer circumferential surface region 56 in the region of the guide track vertex 38 of a respective first guide track 34. The portions 62, 60 of the outer circumferential surface region 64 cooperating with a respective first guide track 40 are similarly positioned in a vertex region 66 of the associated second guide track 40, i.e., at the radially outermost region of the second guide track 40. When rotational irregularities occur resulting in circumferential accelerations of the deflection masses 14, the deflection masses 14 move in circumferential direction with respect to the deflection mass carrier 12 accompanied by the rolling movement of the guide bodies 36 which radially support them. Due to the curvature of the first guide tracks 34 and of the second guide tracks 40, this compulsorily leads to a displacement toward the radially inner side, and the deflection masses 14 absorb potential energy and in so doing contribute to the decrease in vibration energy, i.e., kinetic energy. In the event of substantially periodic excitation, the deflection masses 14 carry out an oscillating movement in the centrifugal potential and accordingly execute a countermovement opposing the vibration excitation.

Figure 11:
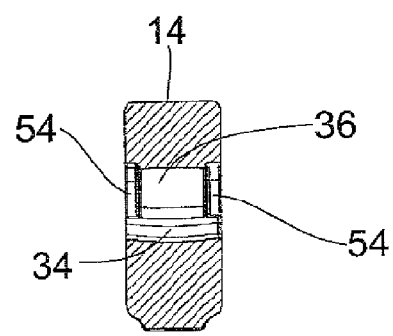
FIG. 11 a sectional view of the deflection mass of FIG. 10.

FIGS. 11 and 12 show that the outer circumferential surface 58 of the guide bodies 36, particularly in the outer circumferential surface region 56, is convex, i.e., spherically outwardly curved, in axial direction, i.e., between the axial end regions of a respective guide body 36. In a corresponding manner, the guide surface 32 which provides the associated first guide track 34 is constructed so as to be concave, i.e., spherically inwardly curved, between the axial end regions of the deflection mass 14. Through cooperation of these two curved surfaces, a first axial centering arrangement 68 is formed which ensures that the deflection masses 14 occupy a defined axial position with respect to the guide bodies 36 and, therefore, with respect to the deflection mass carrier 12.

As will further be seen from FIG. 12, respective radial steps 70 are formed in the transitional area between the outer circumferential surface region 56 and the portions 60, 62 of the outer circumferential surface region 64 at the guide bodies 36. These radial steps 70 cooperate with these axially opposed surface regions of the carrier disks 16, 18 to form a second radial centering arrangement 72 which ensures that the guide bodies 36 are held in a defined axial position with respect to the deflection mass carrier 12. That is, in combination the two axial centering arrangements 68, 72 cause the deflection masses 14 to be held in a defined manner between the two carrier disks 16, 18 so that, as far as possible, they do not enter into frictional contact during their deflecting movement.

In the radial shoulder 70 shown in FIG. 12, an axial recess is formed in the radially inner region thereof, i.e., where it adjoins the portion 60 of the outer circumferential surface region 64. This axial recess prevents radii in the transition to portion 60 and accordingly allows a more exact, planar axial support of the guide body 36 at the associated surface region of the carrier disk 16 and 18, respectively.

It is to be noted that the guide bodies 36 and the carrier disks 16, 18 can be hardened at least in those regions in which they provide the guide tracks 36, 40 in order to prevent wear over the operating life of the vibration damper device 12.

Figures 17, 18, 19:
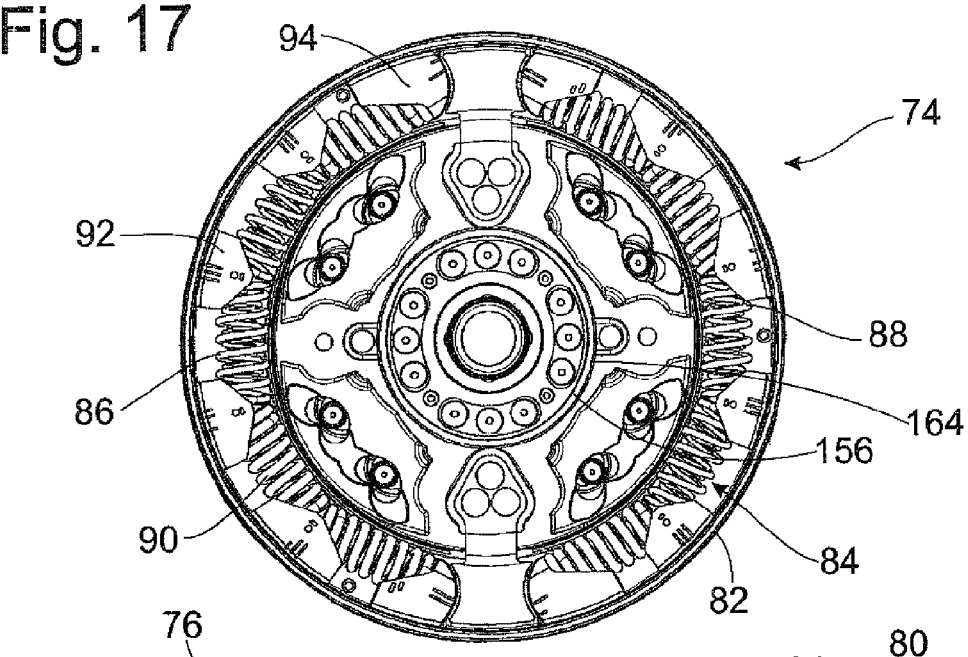
FIG. 17 an axial view of a torsional vibration damper arrangement with open deflection mass carrier.
FIG. 18 a partial axial sectional view of a torsional vibration damper arrangement with a vibration damper device.
FIG. 19 a view corresponding to FIG. 18 sectioned in a different radial plane.

FIGS. 17 to 19 show the vibration damper device 12 described above integrated into a torsional vibration damper arrangement 74 constructed as a two-mass flywheel. The torsional vibration damper arrangement 74 comprises a primary side 76 which is substantially formed with two cover disks 78, 80. The cover disk 78 to be positioned on the drive side has in its radially outer region an outer circumferential wall 82, the other cover disk 80 being connected, for example, by welding, to the axial end of this outer circumferential wall 82. The two cover disks 78, 80 limit a volume area, particularly also radially outwardly, in which a damper element arrangement 84 of the torsional vibration damper arrangement 74 is arranged. In the illustrated example, the damper element arrangement 84 comprises two damper element units 86, 88 which, respectively, extend approximately over an angular area of 180° and can comprise a plurality of damper springs 90 which are arranged successively in circumferential direction and also so as to be nested radially one inside the other. The damper springs 90 of a respective damper element unit 86 and 88, respectively, which are arranged successively in circumferential direction are supported at one another by so-called sliding shoes 92 which can be supported radially outwardly at the outer circumferential wall 82 contingent upon centrifugal force. The end regions of a damper element unit 86 and 88, respectively, are supported at associated circumferential supporting regions of the primary side 76 and a secondary side 96 of the torsional vibration damper arrangement 74, respectively, by means of so-called spring plates 94.

The secondary side 96 comprises the vibration damper device 10 and, fixedly connected thereto, a secondary-side mass part 98 which can provide a friction surface 100 for a friction clutch, for example. Circumferential supporting elements 102, 104 which are also shown in FIG. 1 are fixedly connected to the secondary-side mass part 98 and the vibration damper device 10. Each of these circumferential supporting elements 102, 104 which have an angular distance of about 180° relative to one another corresponding to the length of the damper element units 86, 88 comprises a radially outer circumferential supporting region 106 and 108, respectively, for the circumferential support of the spring plate 94 and, therefore, of the damper element units 86, 88. In their radially inner region, the circumferential supporting elements 102, 104 each have a connection region 110 and 112, respectively. In this connection region, the circumferential supporting elements 102, 104 are fixedly connected to the deflection mass carrier 12 of the vibration damper device 10 on one side and to the secondary-side mass part 98 on the other side in a manner that will be described in the following.

FIG. 6 shows two depressions 114, 116 at the carrier disk 18 which is positioned adjacent to the secondary-side mass part 98. These depressions 114, 116 are disposed at a circumferential distance of 180° and are substantially open radially outwardly, i.e., so as also to form a break in the outer circumferential surface region 26. The circumferential contour of these depressions 114, 116 is adapted to the circumferential contour of the connection region 110 and 112, respectively, of the circumferential supporting elements 102, 104 which is located on the radially inner side and which can be seen in FIG. 8. Accordingly, these connection regions 110, 112 are each located at the outer side, i.e., the side of the carrier disk 18 remote of carrier disk 16, in a respective depression 114, 116. As can be seen from FIG. 1, for example, the arrangement is preferably so configured that the outer surface of the connection regions 110 and 112, respectively, is substantially flush with an outer surface of carrier disk 16. Since the circumferential supporting elements 102, 104 are recessed axially in the transitional area between a respective connection region 110, 112 and the associated circumferential supporting region 106, 108, the respective circumferential supporting regions 106, 108, in spite of the positioning of the connection regions 110, 112 at the outer side of carrier disk 18, are disposed approximately axially, with respect to an axis of rotation A of the torsional vibration damper arrangement 74, centrally with respect to the deflection mass carrier 14. This contributes to an axially compact construction.

Figure 9:
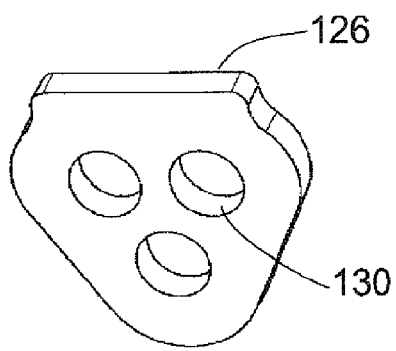
FIG. 9 a spacer disk.

The fixed connection of the circumferential supporting elements 102, 104 to the secondary-side mass part 98 on one hand and to the deflection mass carrier 14 on the other side is carried out by means of a plurality of first connection elements 118. It will be seen that three first connection elements 118 arranged in triangular configuration and formed as rivet bolts are associated with each circumferential supporting element 102, 104. These first connection elements 118 respectively penetrate an aperture 120 in the carrier disk 18, an aperture 122 in the connection region 110, 112 of the circumferential supporting elements 102, 104, and an aperture 124 in the radially central region of the secondary-side mass part 98. Accordingly, as is clearly shown in FIG. 18, the following are arranged in axial succession: secondary-side mass part 98, circumferential supporting element 102 and 104, respectively, with their respective connection regions 110 and 112, carrier disk 18, and a spacer element 126 which is arranged at the inner side of carrier disk 18 and whose circumferential contour is approximately adapted to the circumferential contour of connection region 110 and 112, respectively. This spacer element 126 which is also shown in FIG. 9 serves to ensure a defined distance of the two carrier disks 16, 18 with respect to one another. Further, the spacer element 126 can be heat-treated in order to provide a high tensile strength, since it must be ensured that it will not be plastically deformed during the rivet connection process. Further, the spacer element 126 brings about a reduction in the tensions which occur in the carrier disk 18 and are generated by the first connection elements 118. The outer circumferential contour ensures that a mutual interference between the spacer elements 126 provided in association with each circumferential supporting element 102, 104 and the deflection masses 14 does not occur.

It will be seen in FIG. 18 that the first connection elements 118 have a collar-like extension zone 128. This extension zone 128 engages behind the respective spacer elements 126 in a region surrounding the apertures 130 formed therein and ensures a defined axial distance between the spacer elements 126 and the carrier disk 16.

Carrier disk 16 has depressions 132, 134 which are directed to carrier disk 18 so as to be associated with the depressions 114, 116 of carrier disk 18. These depressions 132, 134 have apertures 136 for the first connection elements 118. By providing depressions 132, 134 it is ensured that the rivet heads of the connection elements 118 formed at the outer side of the carrier disk 16 basically do not project beyond the surface formed in the radially extending region 20 of the carrier disk 16.

Apart from the above-described fixed connection of the circumferential supporting elements 102 to the secondary-side mass part 98, the first connection elements 118 also fixedly connect the two carrier disks 16, 18 to one another. To further improve this holding together, second connection elements 138 which are also preferably furnished by rivet bolts are provided at positions disposed at an angular distance of 90° relative to the circumferential supporting elements 102, 104. This ensures that a fixed connection of the two carrier disks 16, 18 is achieved so as to be distributed over four circumferential positions at a respective circumferential distance of approximately 90°, which is especially advantageous particularly when these carrier disks 16, 18 are not connected to one another by welding in the region of their outer circumferential wall regions 22, 26. The second connection elements 138 are formed as spacer elements in order to ensure a defined axial positioning of the carrier disks 16, 18.

While the carrier disk 18 has depressions 140 associated with the second connection elements so that the rivet heads thereof lie within these depressions 140, the rivet heads project out in axial direction in the region of the carrier disk 18. In order to prevent mutual interference with the secondary-side mass part 98, the latter has depressions 142, indicated in FIG. 15 and also shown in FIG. 19, for receiving the rivet heads of the second connection elements 138.

Figure 15:
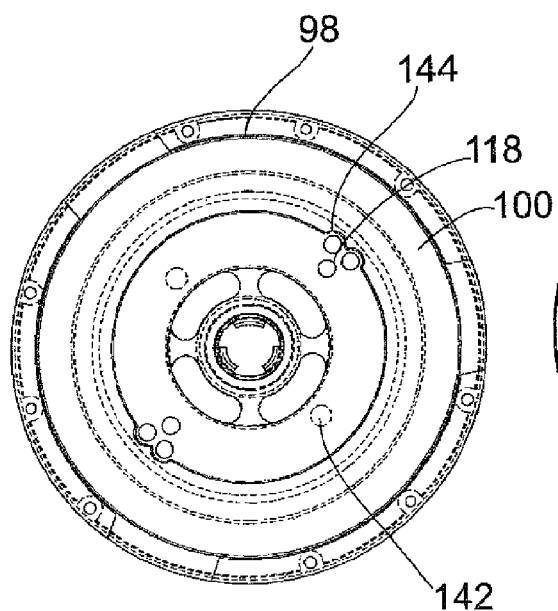
FIG. 15 an axial view of a deflection mass carrier with a secondary-side mass part supported thereon.
Figure 16:
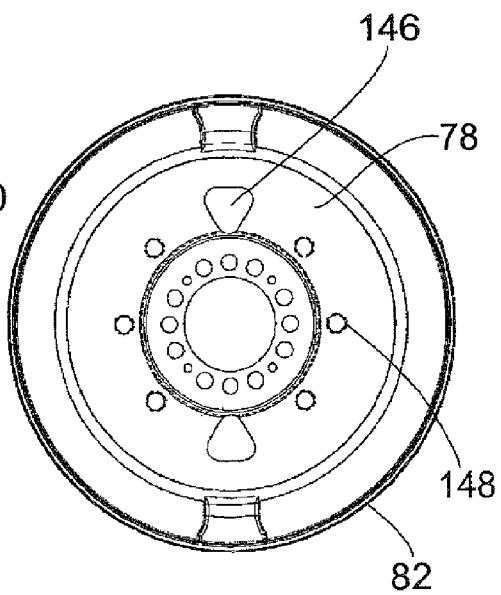
FIG. 16 an axial view of a deflection mass carrier viewed from the other axial side.

As is further shown in FIG. 15, the rivet heads of the first connection elements 118 which are arranged in groups of three, respectively, are arranged in such a way with respect to the friction surface 100 of the secondary-side mass part 98 that they penetrate slightly therein radially. In this region, the secondary-side mass part 98 has protuberances 144 which extend into the friction surface 100 to provide space for accommodating the rivet heads of the first connection elements 118.

Cutouts 146 associated with the first connection elements 118 are formed in the cover disk 78 of the primary side 76 of the torsional vibration damper arrangement 74. The cutouts 146 allow access to the axial end regions of the first connection elements 118 when carrying out the rivet connection process. The cover disk 78 has additional cutouts or orifices 148 at a plurality of circumferential positions. The carrier disk 16 positioned next to the cover disk 78 also has openings 150 at two circumferential positions, namely, where the depressions 140 for the second connection elements 138 are also formed. These openings are provided for assisting assembly and as measurement openings.

In order to prevent mutual interference between the deflection masses 14 and depressions 140, the deflection masses 14 have at their radial inner region depressions or cutouts 152 into which the depressions 140 can penetrate during circumferential deflection of the deflection masses 14.

Figure 13:
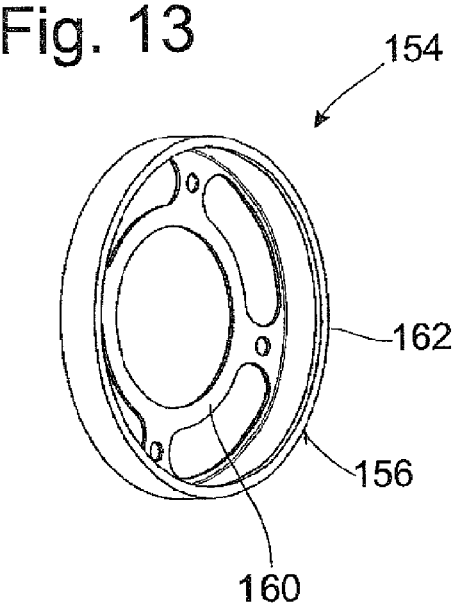
FIG. 13 an annular movement stop.
Figure 14:
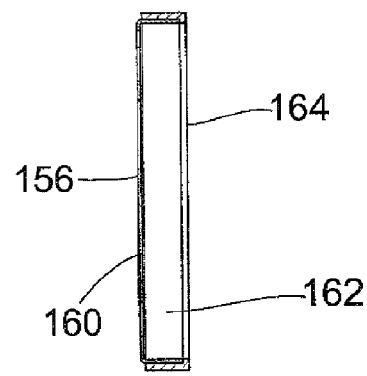
FIG. 14 the annular movement stop of FIG. 13 in combination with a resilient element.

A movement limiting arrangement 154 shown separately in FIGS. 13 and 14 is provided at the primary side 76 of the torsional vibration damper arrangement 74 in association with the deflection masses 14. This movement limiting arrangement 154 comprises an annular movement stop or stop element 156 with a region 160 which extends substantially radially and which is fixedly connected to the cover disk 78 by rivet bolts. Adjoining the latter radially outwardly, the movement stop 156 has a substantially cylindrical, ring-shaped region 162 on which a correspondingly ring-shaped resilient element 164 formed, for example, of rubber or rubber-like material is disposed. This resilient element 164 supported at the movement stop 156 is disposed radially inside the deflection masses 14 as is clearly shown in FIG. 17.

In association with this movement stop 156, the deflection masses 14 have at their radially inner region stop surfaces 166 which are curved corresponding to the curvature of the outer circumferential surface of the resilient element 164. In case of an excessive movement of the deflection masses 14 radially inward, the latter come into contact by stop surfaces 166 thereof with the outer circumferential surface of the movement stop 156 so as to damp impact through the intermediary of the resilient element 164. Apart from this damping effect, the resilient element 164 serves to accelerate the springing back of the deflection masses 14 after impact so as to lessen the impairment of the oscillating movement of the deflection masses 14 after impacting on the movement limiting arrangement 154. Further, the resilient element 164 protects the movement stop 156, which is generally formed as a shaped sheet metal part, against repeated, excessively strong impact of the deflection masses 14. Of course, the resilient element 164 can also be omitted when the movement stop 156 is designed to be correspondingly hard, particularly in its cylindrical region 162.

Further, a bearing ring 168 and a coupling element 170 that is provided for connecting to a drive shaft or a flexplate or the like are also fixedly connected to the primary side 76 of the torsional vibration damper arrangement 74, particularly the cover disk 78, by rivet bolts 158. Further, FIGS. 18 and 19 show two different embodiments of the bearing ring 168, namely, a two-part embodiment in one instance and a one-part embodiment in the other. The radially inner region of the secondary-side mass part 98 is supported at least in radial direction at the bearing ring 168 by a plain bearing so that the primary side 76 and the secondary side 96 of the torsional vibration damper arrangement 74 are also supported radially with respect to one another. Further, a bearing 172 constructed, for example, as a rolling element bearing can be received in this radially inner region of the secondary-side mass part 98 to provide a bearing support with respect to the axial end of a driven shaft, i.e., a transmission input shaft, for example. On the radially outer side of this region receiving the bearing 172, the secondary-side mass part has apertures 174 through which access may be had to the rivet bolts 158 for producing the rivet connection. It is further possible by means of this bearing ring 168 to support the primary side 76 on a flange which is formed at a crankshaft or drive shaft or which is connected therewith.

Further, the above-mentioned orifice 148 in the cover disk element 78 can be used as a filling orifice for introducing viscous medium into the volume area in which the damper element arrangement 84 is provided. After introducing the viscous medium, the orifices 148 can be closed in order to prevent impurities from entering. In a corresponding manner, the cutouts 146 can also be closed by means of the first connection elements 118 after producing the rivet connection. In order to achieve a tight closure at the other axial side also, a sealing element 176 (FIG. 18) which is made of sheet metal material, for example, can be provided. This sealing element 176 is supported in its radially outer region at the cover disk element 80 and accordingly generates a tight contact closure at that location. On the radially inner side, it contacts the secondary-side mass part 98 and accordingly lies between the latter and the circumferential supporting elements 102, 104. The closure element 176 is accordingly fixedly connected to the secondary side 96 by the first connection elements 118.

Damping can be carried out during rotational operation by relative rotation of the primary side 76 with respect to the secondary side 96 of the torsional vibration damper arrangement 74 in the event of rotational irregularities such as, e.g., strong torque fluctuations, vibrations due to changing loads, or excitations generated by the periodic ignitions in an internal combustion engine. Residual rotational irregularities are further mitigated by the vibration damper device 10 which is provided at the secondary side of the torsional vibration damper arrangement 74. In this connection, the vibration damper device 10 is speed-adaptive, which means that its resonant frequency shifts in a corresponding manner when the rotational speed increases or decreases. This makes it possible to tune the vibration damper device 10 to an excitation order, for example, the ignition frequency of an internal combustion engine, and to decouple this over the entire speed range. In this connection, tuning should preferably be carried out to a main oscillation order which can correspond to the second order of the ignition frequency in case of a four-cylinder four-cycle internal combustion engine. Tuning to the first order of an excitation frequency of this kind would lead to a very good reduction in the occurring rotational irregularities, but this would result in a comparatively large deflection of the deflection masses 14, which is often impossible because of the limited installation space. For this reason, tuning can be carried out in such a way that, for example, the resonant frequency of the deflection masses and vibration damper device 10 lies just above the second excitation order of the internal combustion engine so that a sufficient mass damping potential for the occurring vibrations is achieved on one hand but an excessive deflection of the deflection masses 14 is prevented on the other hand.

The second and first guide tracks 40, 34 at the deflection mass carrier 12 on the one hand and at the deflection masses 14 on the other hand can be curved in a circular manner, for example. Alternatively, it is also possible in this instance to provide an epicycloidal geometry for the guide tracks, which can contribute to an improved protection of the deflection masses against excessive deflection particularly at lower rotational speeds.

By providing two guide bodies 36 in every deflection mass 14 it is ensured that these deflection masses 14 carrying out a pendulous motion undergo a virtually parallelogram-like displacement, which makes very efficient use of available installation space. In spite of the limited installation space, even stronger vibration excitations such as take place when starting an engine, for example, do not lead to an excessive impact of the deflection masses 14, particularly because the movement limiting arrangement 154 is provided with the resilient element 164 for this purpose.

Various variations which can be provided individually or in combination in the vibration damper device and torsional vibration damper arrangement described above or also with one another are described in the following. With reference to these variations, only those for these specific aspects will be described.

Figure 20:
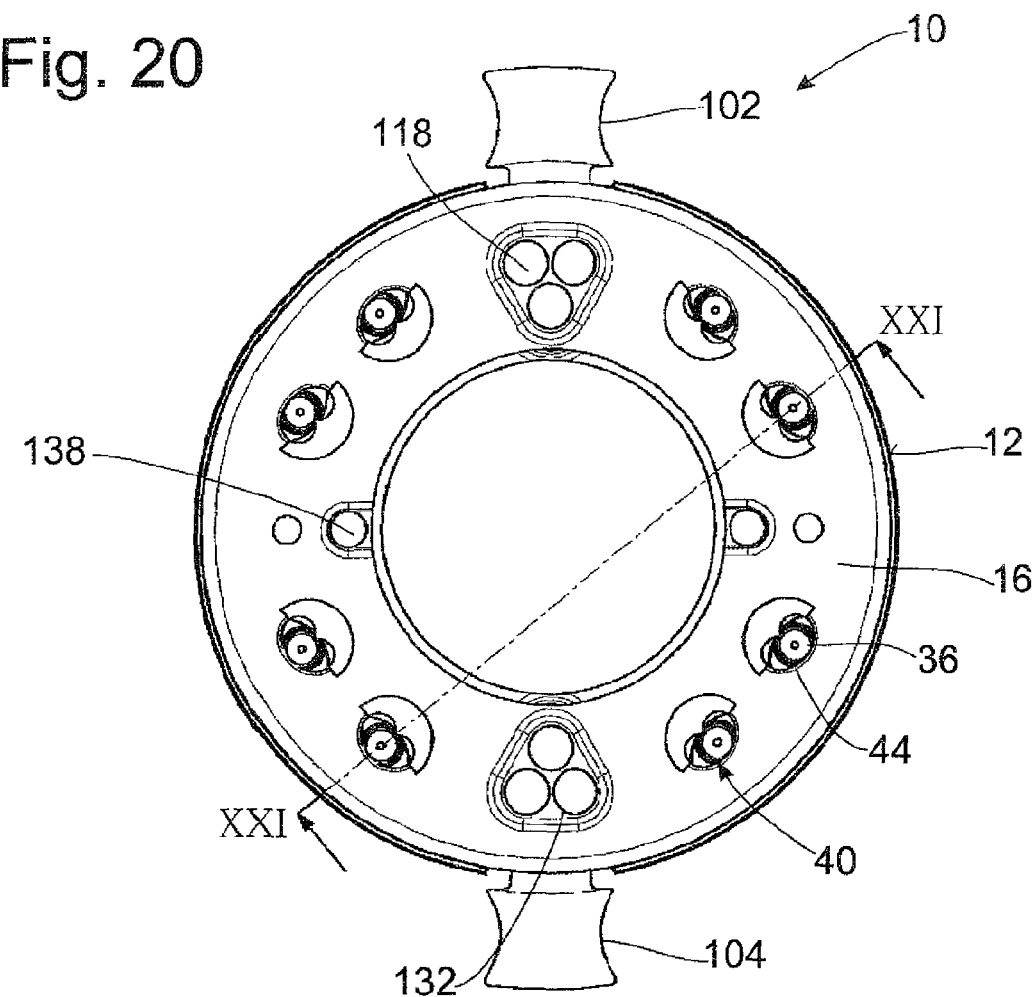
FIG. 20 an alternative embodiment of a vibration damper device in an axial view.
Figure 21:
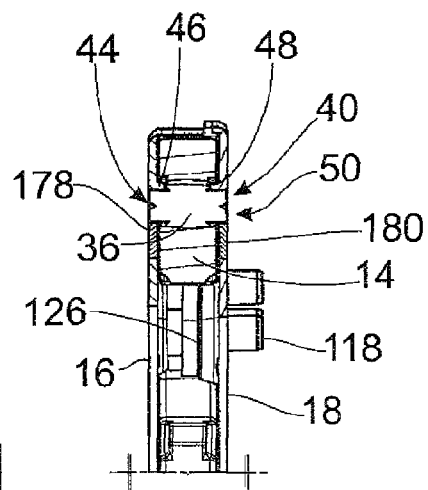
FIG. 21 a partial sectional view of the vibration damper device of FIG. 20 section along a line XXI-XXI.

FIGS. 20 and 21 show the vibration damper device 10 with the two circumferential supporting elements 102, 104 fastened thereto. In the region of the second guide tracks 40, second guide track elements 178 in the carrier disk 16 and 180, respectively, which are associated with the second guide tracks 40 are arranged in the carrier disk 18 in the apertures 44 and 50, respectively, of the carrier disks 16, 18, which apertures 44 and 50 provide the first guide tracks 40. The open region of the apertures 44 and 50, respectively, which is available for the guide bodies 36 is limited toward the radially inner side by these second guide track elements 178, 180. The second guide tracks 40 or portions 46, 48 thereof are still provided directly at the carrier disks 16, 18 or at the inwardly extending axial protuberances formed at the latter. Therefore, in rotational operation and when the guide bodies 36 are loaded radially outwardly by centrifugal force, the second guide track elements 178, 180 basically do not come into contact with these guide bodies 36. However, at a standstill or at very low rotational speed, the guide bodies 36 can contact these second guide track elements 178, 180 by force of gravity. These second guide track elements 178, 180 can be constructed, for example, from noise-mitigating material such as plastic, rubber, ceramic material, fibrous material or sintered material. For reasons of stability, steel material can also be provided. It is further possible by using the second guide track elements 178, 180 to make the apertures 44, 50 larger, which facilitates construction of the punching tools required for this purpose or protects the punching tools themselves. This also facilitates the forming of the axial protuberances at which the radially inwardly directed guide surfaces 46, 52 are formed and provides sufficient material to be deformed for these protuberances.

FIGS. 22 and 23 show the insertion of second guide track elements 178, 180 of this kind into the apertures 44 and 50, respectively, at the respective radially outer region thereof. This means that the portions 42, 48 of the second guide tracks 40 are now provided at the second guide track elements 178, 180. This makes it possible to construct the second guide track elements 178, 180 from material that is optimal for the requirements imposed on them, for example, hardened metal or steel material or material provided with anti-corrosion protection, irrespective of the material used for constructing the carrier disks 16, 18.

As in the embodiment in FIGS. 20 and 21, the second guide track elements 178, 180 can be fixed to the carrier disks 16, 18 in this case by riveting, snapping in, rolling in, gluing, shrinking, clamping, welding, soldering or by other joining techniques.

FIGS. 24 and 25 show second guide track elements 178, 180 which are substantially closed annularly and inserted as such into the apertures 44 and 50, respectively, of the carrier disks 16, 18. In this case, the advantages described with reference to FIGS. 20 to 23 are achieved in combination. Further, the second guide track elements 178, 180 can themselves be constructed more stably because of the annularly closed shape.

FIGS. 26 and 27 show a deflection mass 14 which has in association with the apertures 30 formed therein its first guide track element 182 in the region of the respective first guide track 34, this first guide track 34 also being provided by it. Each first guide track element 182 accordingly limits the associated aperture 30 radially inwardly and, with the radially outwardly directed guide track surface 32, provides a respective first guide track 34. Again, this provides the advantage that material which optimally meets the requirements imposed on the first guide tracks 34 can be used locally for providing the first guide tracks 34. In particular, a very hard material, e.g., hardened steel, can be used in this case regardless of the construction material of the deflection masses 14 per se.

FIGS. 28 and 29 show an embodiment in which the first guide track elements 182 define these receiving apertures 30 radially outwardly. Accordingly, these first guide track elements are also provided in the region of the respective first guide tracks 34, namely, facing the latter on the radially outer side, but do not themselves substantially provide any portion of the surface for the first guide tracks 34. This can also contribute to facilitating production of the deflection masses 14. Further, the first guide track elements 182 can be constructed in this case with a noise-mitigating material, for example, so that no noises produced by relative movement can occur during phases in which the deflection masses 14 rest on or are carried by the associated guide bodies 36 by these first guide track elements 182, e.g., by force of gravity.

FIGS. 30 and 31 show an embodiment in which the apertures 30 in the region whereof the first guide tracks 34 are provided are dimensioned in such a way that annularly closed first guide track elements 182 can be received therein. In this way they provide the guide tracks 34 by their radially inner region. With their radially outer region, they can contribute, if necessary, to noise damping when the deflection masses 14 impact against the guide bodies 36.

Figure 32:
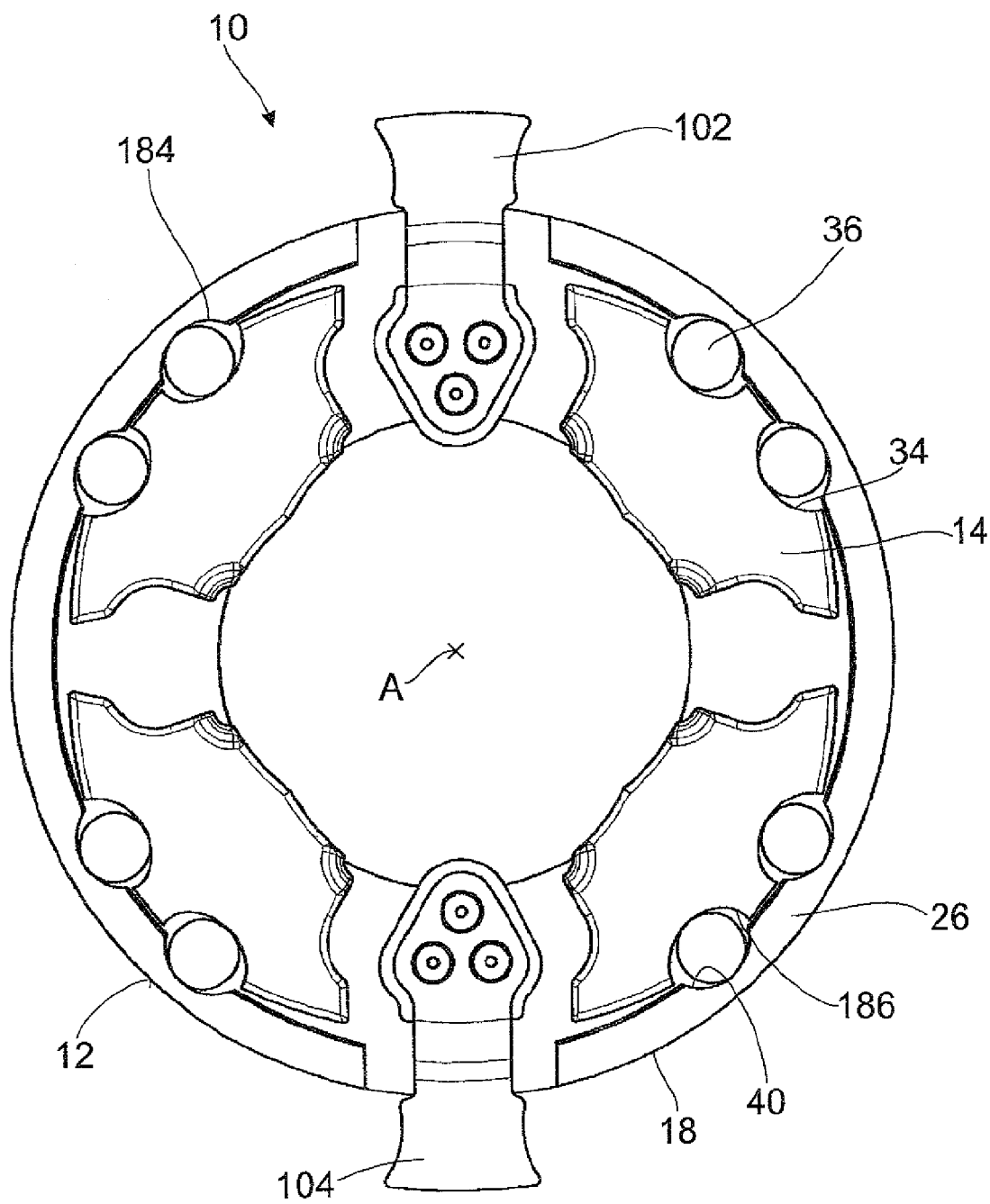
FIG. 32 an axial view of a vibration damper device with open deflection mass carrier.

FIG. 32 shows an embodiment of the vibration damper device 10 with a somewhat different configuration of the first guide tracks 34 at the deflection masses 14 and of the second guide tracks 40 at the deflection mass carrier 12. In this case, the deflection mass carrier 12 can again be constructed with two carrier disks arranged at a distance axially. The carrier disk 18 is shown in FIG. 32, for example. In this instance, its axially extending collar-like region 26 has a greater axial length and, at its inner circumferential surface, forms a plurality of depressions 184 which open radially inwardly and extend radially outwardly. A depression 186 of a deflection mass 14 which opens radially outwardly and extends radially inwardly is located opposite each depression 184 at the deflection mass carrier 12. The depressions 186 at the deflection mass carrier 12 provide a second guide track 40 in each instance, while the depressions 186 at the deflection masses 14 provide a first guide track 34 in each instance.

A roll-shaped or roller-shaped guide body 36 is arranged in each volume area formed by a pair of depression 184 and depression 186. By means of the centrifugal force acting on the deflection masses 14, these deflection masses 14 are pressed radially outwardly against the guide bodies 36 by their first guide tracks 34 formed at the depressions 186, these guide bodies 36 being supported in turn at the second guide tracks 40 formed in the region of the depressions 184. Since the guide tracks 34 and 40 are also formed in this case so as to curve radially outwardly and radially inwardly, respectively, rotational irregularities and the circumferential accelerations occurring thereby result in that the deflection masses 14 move radially inwardly, i.e., in direction of the axis of rotation A, in centrifugal potential during relative circumferential movement with respect to the deflection mass carrier 12 owing to rolling movement carried out by the guide bodies 36 and in so doing absorb potential energy.

Of course, the depressions 184 provided at the deflection mass carrier 12 can also be provided alternatively at the other carrier disk 16 or at both carrier disks 16 and 18. Further, it is advantageous to ensure that the deflection masses 14 do not move too far radially inward away from the deflection mass carrier 12 and the depressions 184 thereof so as to guarantee that the guide bodies 36 remain in the associated depressions 186, 186. The movement limiting arrangement 154, described above with reference to FIGS. 1 to 19, with the movement stop 156 located radially inside the deflection masses 14 can be used for this purpose.

Another advantage of this embodiment consists in that the guide bodies 36 can be constructed more simply, per se, because the stepped construction shown, for example, in FIG. 12 can be avoided. Of course, the crowning which was also described with reference to FIGS. 11 and 12, i.e., the convex shape of the guide bodies 36, for example, can be retained for the axial centering of the deflection masses 14 with respect to the deflection mass carrier 12. In this case, the guide surfaces providing the second guide tracks 40 must also be convexly curved in a corresponding manner. Further, in this embodiment a more uniform area loading particularly of the second guide tracks 40 is achieved, which permits the guide bodies to be constructed somewhat smaller.

It should also be noted that the guide tracks can be formed at the deflection masses 14 as well as at the deflection mass carrier 12 at guide track elements to be provided at the latter with the advantages described above.

Figure 33:
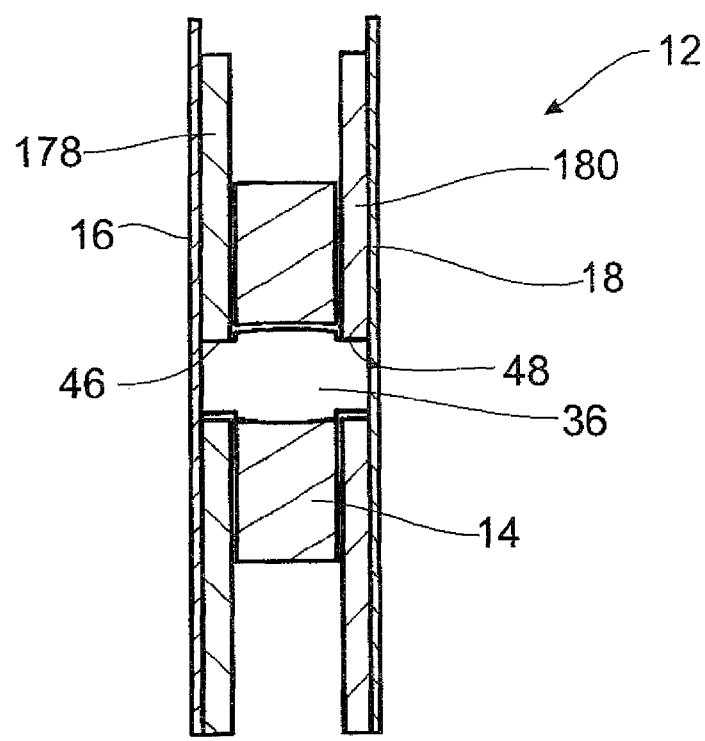
FIG. 33 a partial sectional view of a vibration damper device.

FIG. 33 shows an alternative embodiment of the deflection mass carrier 12 with second guide track elements 178, 180 provided at the carrier disks 16, 18. These second guide track elements 178, 180 are not inserted into apertures of the carrier disks 16, 18, but rather are arranged at the inner sides thereof and are fastened thereto, for example, by riveting, gluing, soldering, welding or in some other manner. The second guide track elements 178, 180 can be formed so as to extend annularly around the axis of rotation of the vibration damper device and therefore provide the associated guide track portions 42, 48 for a plurality of guide bodies 36. Of course, it is also possible to provide separate second guide track elements 178, 180 associated with individual guide bodies 36 or individual deflection masses 14.

By providing second guide track elements 178, 180 of this kind arranged at the inner side of the carrier disks 16, 18, the geometry of the carrier disks 16, 18 and also the geometry of the guide track elements 178, 180 themselves can be simplified. The connection of the latter to the carrier disks 16, 18 is also easier to carry out.

Figure 34:
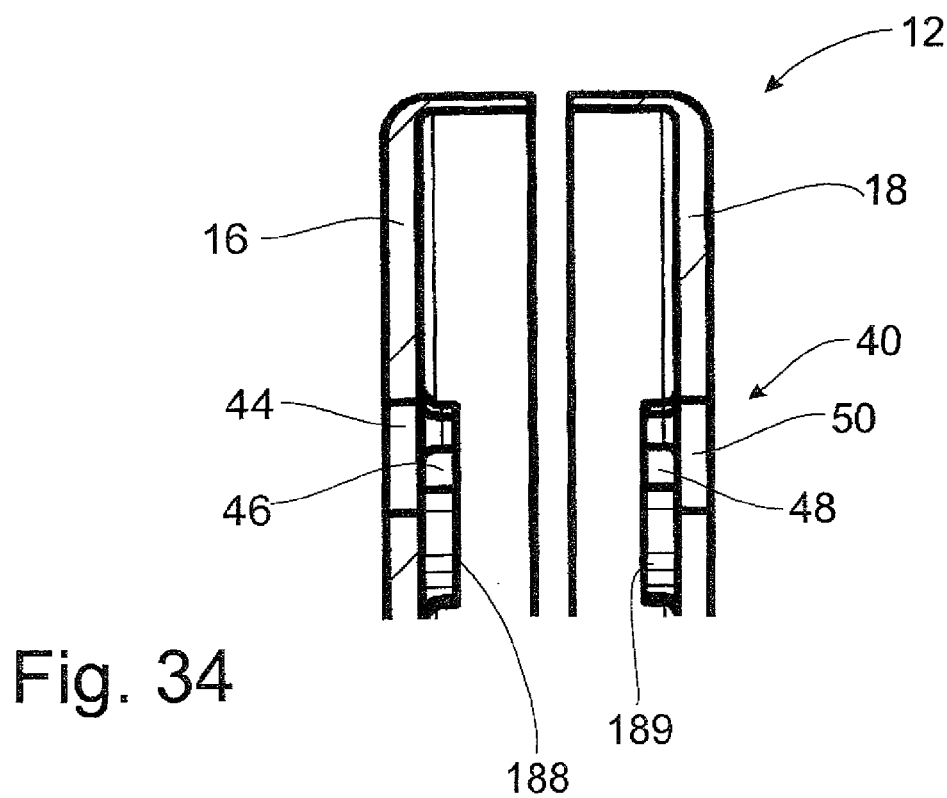
FIG. 34 two carrier disks of a deflection mass carrier.

FIG. 34 shows two carrier disks 16, 18 of the deflection mass carrier 12 with the apertures 44, 50 formed therein and the axial protuberances 188, 190 which at least partially provide the portions 42, 48 of a respective second guide track 40 and which are directed to the other respective carrier disk. The two carrier disks 16, 18 are formed substantially symmetrical to one another and in their radially outer region can leave the intermediate space shown in FIG. 34, particularly when they are fixedly connected to one another by the first connection elements 118 and second connection elements 138, respectively. This embodiment of the deflection mass carrier 12 in which it is open in the outer region makes it possible for viscous material, i.e., oil or grease, for example, which is present in the torsional vibration damper arrangement 74 for further damping of vibrations and for lubrication can also arrive in the deflection mass carrier 12. Further, the cup shape of the carrier disks 16, 18 leads to increased stability thereof.

Of course, with this geometry of the carrier disks 16, 18 the guide track portions 42 and/or 48 of the respective second guide tracks 40 can also be implemented at or in the region of second guide track elements that were already mentioned above.

Figure 35:
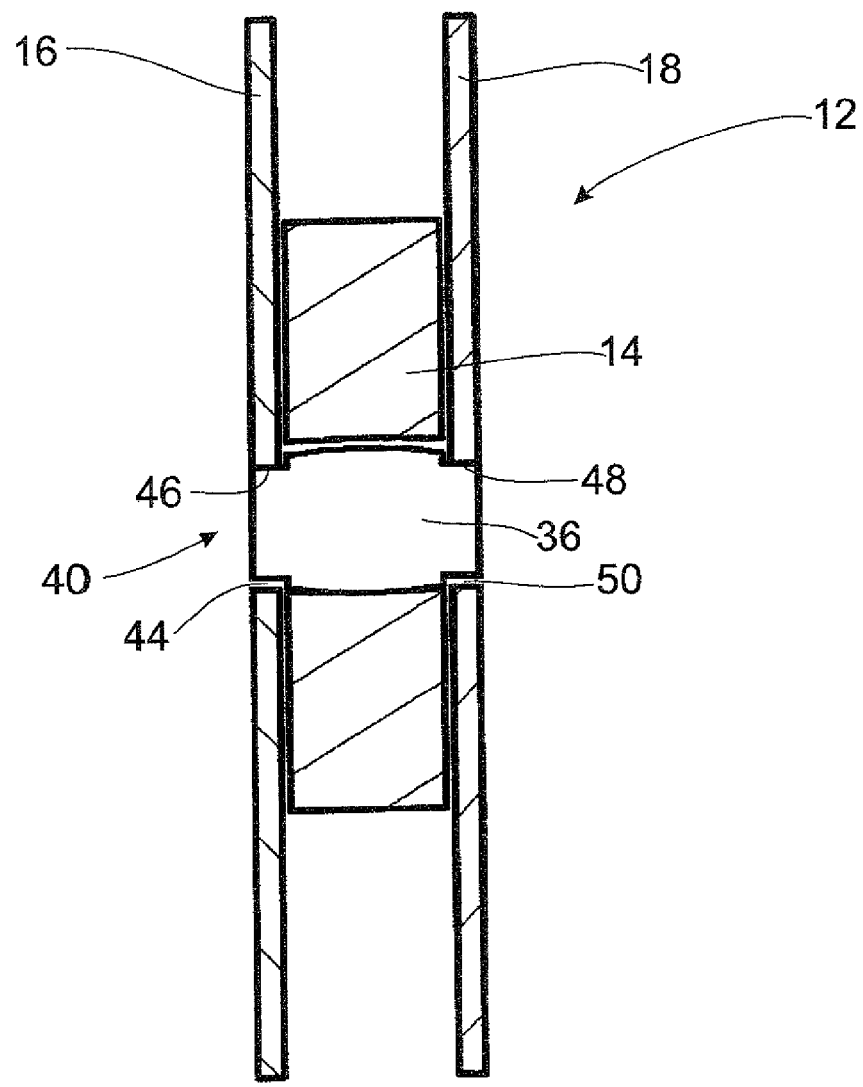
FIG. 35 a partial sectional view of a vibration damper device.
Figure 43:
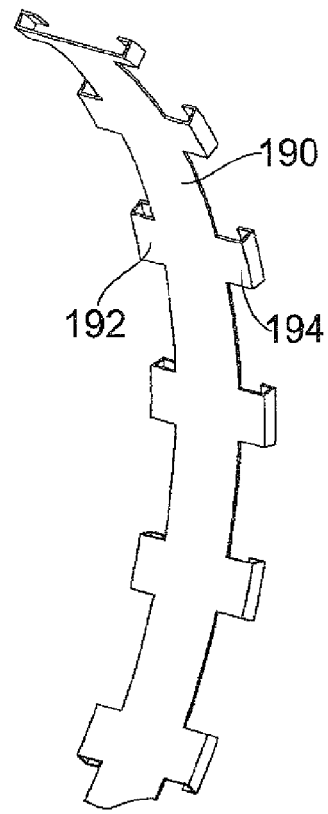
FIG. 43 a partial view of an outer circumferential wall of the deflection mass carrier of FIG. 42.
Figure 42:
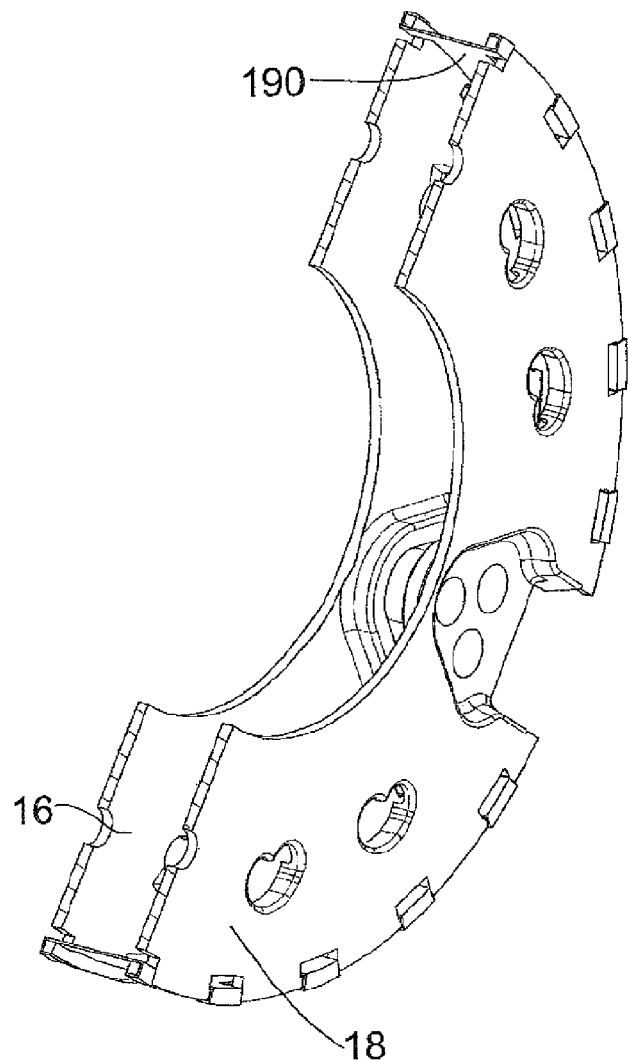
FIG. 42 a perspective partial view of a deflection mass carrier.
Figure 44:
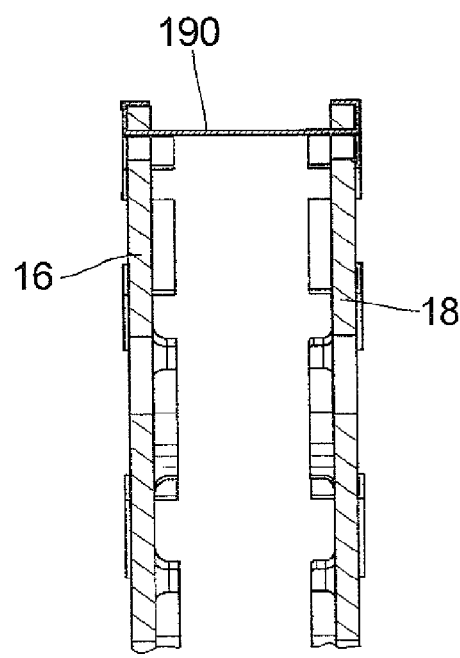
FIG. 44 a partial axial sectional view of the deflection mass carrier of FIG. 42.

FIG. 35 shows an embodiment of the deflection mass carrier 12 in which the two carrier disks 16, 18 are substantially planar, i.e., are not axially recessed in their radially outer region. Owing to this open construction in the radially outer region, the above-mentioned entrance of viscous material into the inner volume area of the deflection mass carrier 12 is further facilitated. Further, this construction of the carrier disks 16, 18 in which axial protuberances need not be implemented at least in the radially outer region and in which also, for example, no axial protuberances need be formed in the region of the apertures 44, 50 for providing portions 42, 48 of a respective second guide track 40, is very easy to produce.

FIGS. 36 to 38 show an embodiment of the deflection mass carrier 12 in which the volume area bounded by the two carrier disks 16, 18 is limited radially outwardly by an outer circumferential wall 190. This outer circumferential wall 190 which is formed of sheet metal material, for example, has connection projections 192, 194 at a plurality of successive positions in circumferential direction on both axial sides, these connection projections 192, 194 being formed in each instance by the bending of lugs. The connection projections 192, 194 can be received in associated cutouts 196, 198 of the carrier disks 16, 18 accompanied by clamping action. Accordingly, a substantially complete closure of the volume area bounded by the two carrier disks 116, 118, also radially outwardly, can be produced in a simple manner.

FIGS. 39 to 41 show an embodiment in which the lug-shaped connection projections 192, 194 provided at the outer circumferential wall 190 penetrate the associated cutouts 196, 198 at the carrier disks 16, 18 and, by bending them radially outward, engage behind the latter radially outwardly at their axial outer side. In this way an axial positive engagement is produced so that the two carrier disks 16, 18 are held together in a stable manner particularly in the radially outer region.

Based on the embodiment in FIGS. 39 to 41, FIGS. 42 to 44 show an embodiment in which the connection projections 192, 194 formed at the outer circumferential wall 190 are not only bent radially, particularly radially outward, at the axial outer side of the carrier disks 16, 18 but undergo a further axial bending and accordingly axially overlap the carrier disks 16, 18 also at the radial outer side thereof.

FIGS. 45 to 47 show an embodiment in which the outer circumferential wall 190 is formed with block-shaped ends in the region of their connection projections 192, 194. These block-shaped ends are shaped and dimensioned in such a way that they are held in the associated cutouts 196, 198 of the carrier disks 16, 18 by clamping action and also substantially completely close the latter. The outer circumferential wall 190 can be made of plastic, for example. If made of a weldable material, e.g., plastic or metal, it can be connected to the carrier disks 16, 18 in the region of its connection projections 192, 194 by welding, i.e., by extrinsic bonding. Of course, gluing or soldering or another joining technique is also possible.

Figure 48:
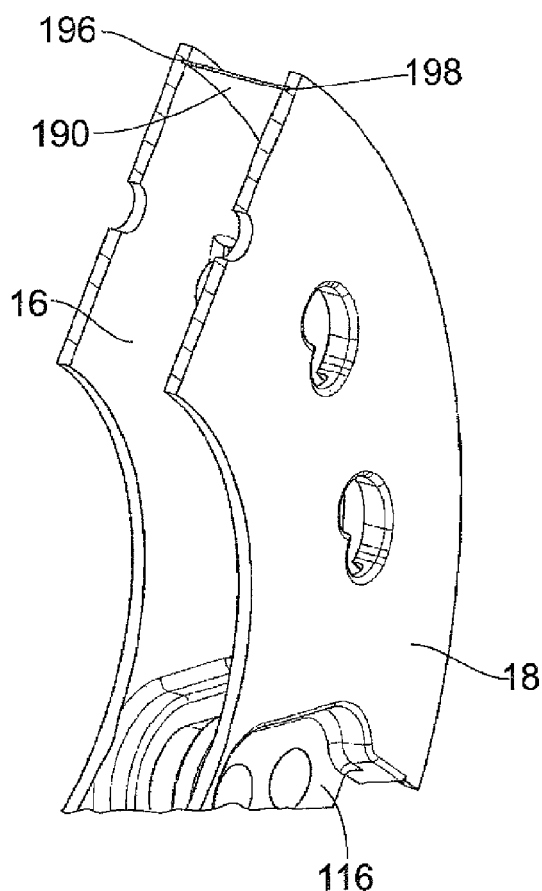
FIG. 48 a perspective partial view of a deflection mass carrier.
Figure 49:
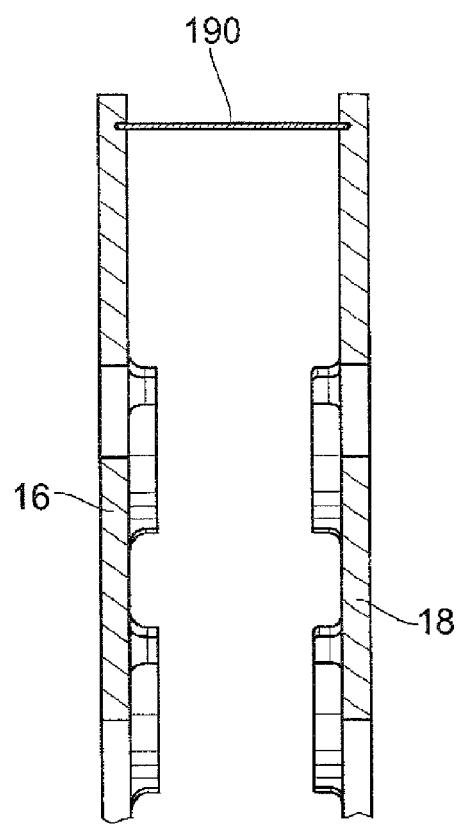
FIG. 49 a partial axial sectional view of the deflection mass carrier of FIG. 48.

FIGS. 48 and 49 show another embodiment of an outer circumferential wall 190. This outer circumferential wall 190 is shaped as a structural component part constructed, e.g., from sheet metal material, so as to be substantially planar and without axially projecting connection projections. Slot-like cutouts 196, 198 which preferably extend continuously in circumferential direction are formed in the two carrier disks 16, 18 at the inner sides thereof. The axial end regions of the circumferential wall 190 are inserted into these cutouts 196, 198 and held therein, for example, by clamping action or secured by welding, gluing, soldering or the like. At the location where the depressions 116 are formed in the carrier disk 18, the circumferential wall 190 can also have corresponding depressions or cutouts which are open in axial direction and through which the circumferential supporting elements 102, 104 can extend.

Figure 50:
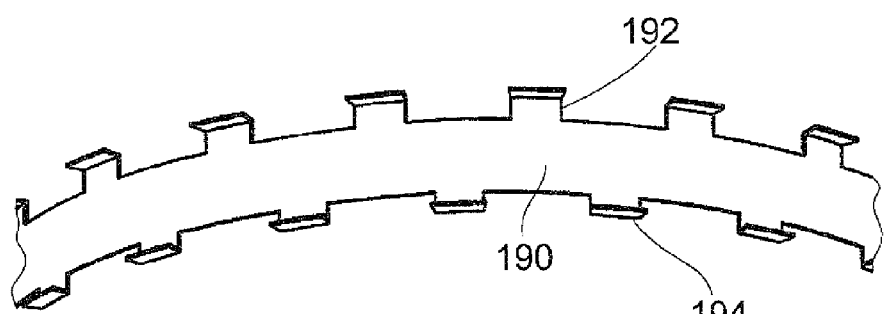
FIG. 50 a partial view of an outer circumferential wall.

FIG. 50 shows a circumferential wall 190 whose connection projections 192 and 194 which are formed at both axial sides are arranged so as to be offset with respect to one another in circumferential direction. Of course, this can be the case in every circumferential wall 190 described above and provided with circumferential projections 192, 194 of this kind.

Figure 51:
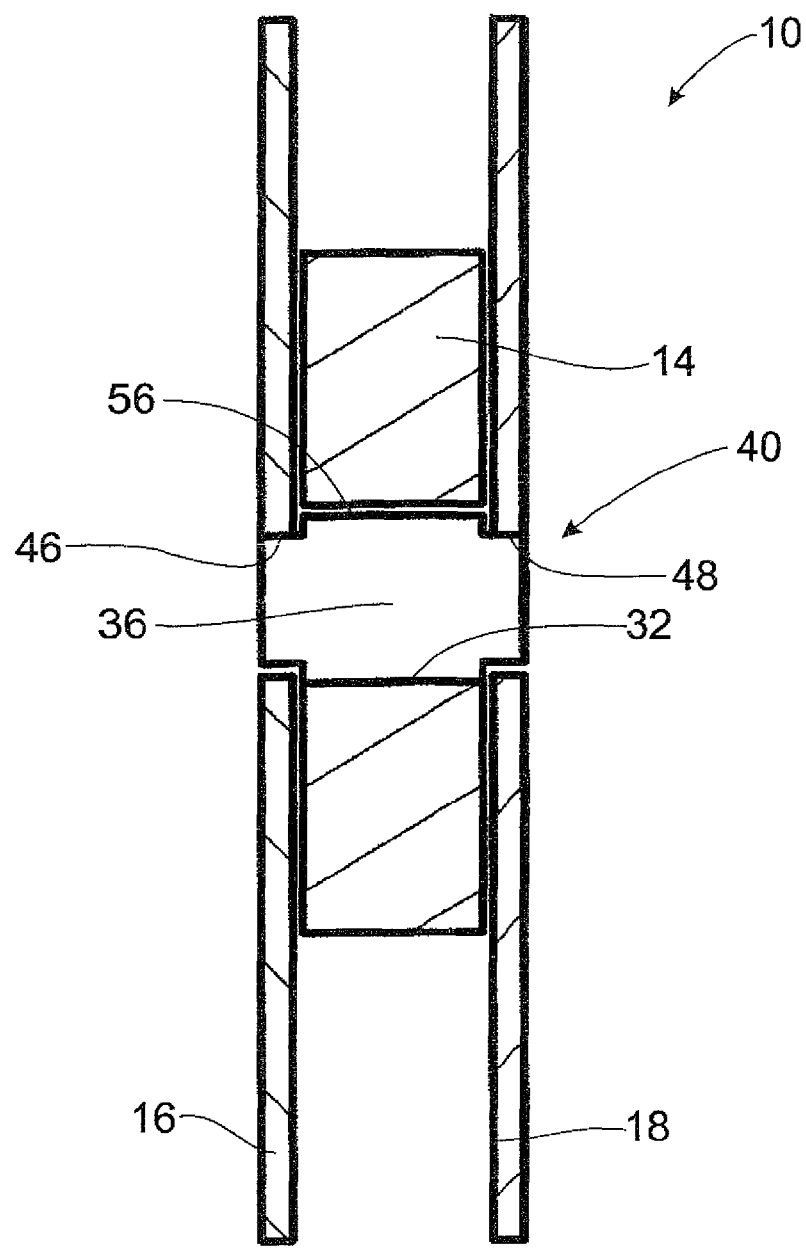
FIG. 51 a partial sectional view of a vibration damper device.

FIG. 51 shows an embodiment of a vibration damper device 10 which can be constructed in a very simple manner. It will be seen that the two carrier disks 16, 18 are constructed so as to be planar, i.e., without axial protuberance, in their radially outer region and accordingly substantially leave open radially outwardly the volume area defined between these carrier disks 16, 18. The deflection masses 14 and the guide bodies 36 associated therewith are formed without a crowned contour, i.e., substantially cylindrically, in the region of their surface pistons which enter into mutual interaction with one another, i.e., guide surfaces 32 on the one hand and surface regions 56 on the other hand. No guide track elements are provided; rather the portions 46, 48 of the respective second guide tracks 40 are formed by end faces which are the result of a stamping process, for example.

It is to be noted that, of course, in this embodiment all of the above-described modifications and specific constructions of the various structural component parts, for example, the crowning of various surfaces, the forming of axial protuberances, the provision of guide track elements at all, or at individual, apertures formed in the carrier disks 16, 18 or deflection masses 14 can be realized in combination or individually. As is in the other embodiments already described above, it is also advantageous in this instance to form the guide bodies 36 with a cylindrical, i.e., not crowned, contour in their end regions cooperating with the respective second guide track 40 or in guide track portions thereof.

Figure 52:
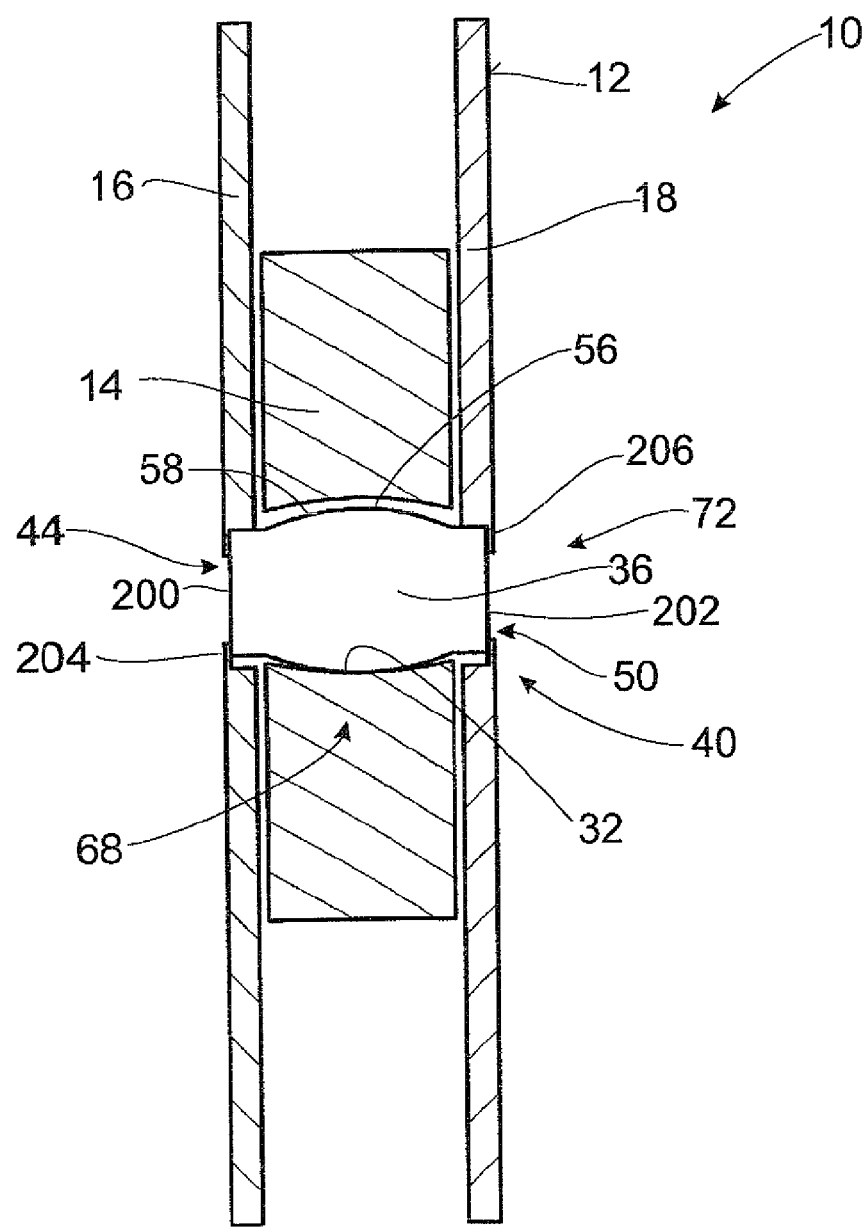
FIG. 52 a partial sectional view of a vibration damper device.

FIG. 52 shows an embodiment of a second axial centering arrangement 72 through which the guide bodies 36, or at least individual guide bodies 36, can be centered axially with respect to the deflection mass carrier 12, i.e., in this case, carrier disks 16, 18. It will be seen that the axial end faces 200, 202 at the axial ends of the guide body 36 are radially overlapped by axial supporting portions 204 and 206, respectively, formed in the region of the apertures 44, 50 in the carrier disks 16, 18. The end faces 200, 202 contact these axial supporting portions axially so that the guide body 36 is held in a defined axial position.

The axial centering of the deflection mass 14, or of each deflection mass 14, is again carried out by means of the first axial centering arrangement 68, provided in this case by the guide surface 32 which is shaped so as to be concave between its axial ends and which substantially provides the first guide track or the correspondingly convexly shaped outer circumferential surface 58 in the outer circumferential surface region 56 of the guide body 36.

Since the entire surface available in the region of a respective second guide track 40 for the radial support of the guide bodies 36 is comparatively small in this embodiment variant due to the radial overlapping of the end faces 200, 202 by portions of the carrier disks 16, 18, the guide bodies 36 should have no less than a minimum diameter in its region cooperating with the second guide track 40. In this respect, it is further advantageous to dispense with the stepped transition to the outer circumferential surface region 56.

In order to reduce the area loading occurring in the region of the carrier disks 16, 18 or portions of the second guide tracks 40 formed at the latter, the axial centering portions 204, 206 overlapping the end faces 200, 202 can be provided in this embodiment variant by separate structural component parts provided at the outer sides of the carrier disks 116, 118. The second guide track elements which were already described above can also be employed and in this case can be optimally adapted to the occurring loads by choice of material on one hand and shaping on the other hand.

It is also to be noted that, of course, all of the above-described aspects with respect to the construction of the various structural component parts illustrated herein can also be realized individually or in combination in this case also. This also applies to the following statements regarding different embodiments of the vibration damper device.

Figure 53:
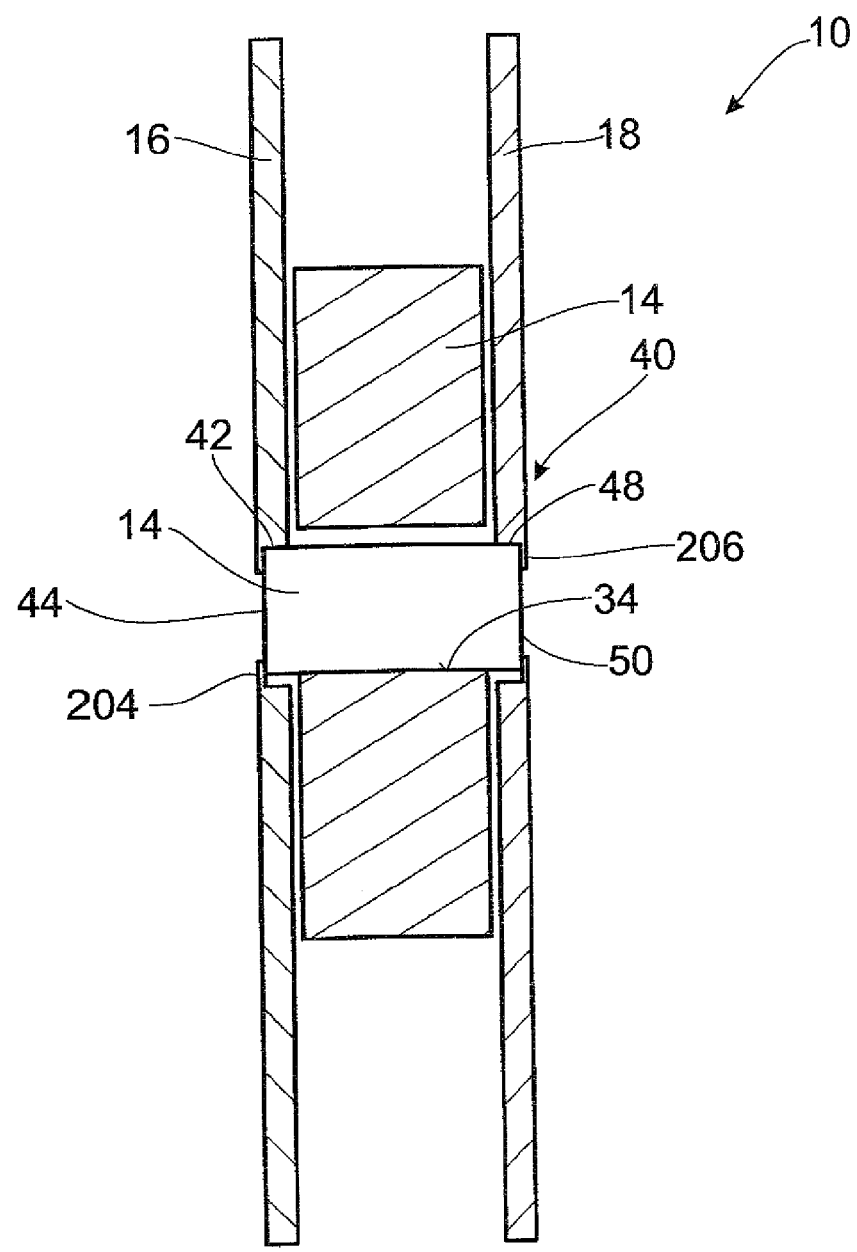
FIG. 53 a partial sectional view of a vibration damper device.

FIG. 53 shows an embodiment which combines the aspects addressed above with reference to FIGS. 51 and 52. In this instance, for example, in a case in which an axial centering of the deflection masses 14 of the vibration damper device 10 need not be provided, the crowned shape of the guide bodies 14 and of the respective associated first guide track 34 is omitted so that substantially cylindrical contours are provided in this case. The axial centering portions 204, 206 provided at carrier disks 16, 18 in the region of the apertures 44, 50 provides for an axial centering or holding of the guide bodies 14 between the two carrier disks 16, 18. In this case also, the portions 42, 48 of the second guide tracks 40 and the axial centering portions 206, 206 can, of course, be formed at second guide track elements provided in the apertures 44, 50.

Figure 54:
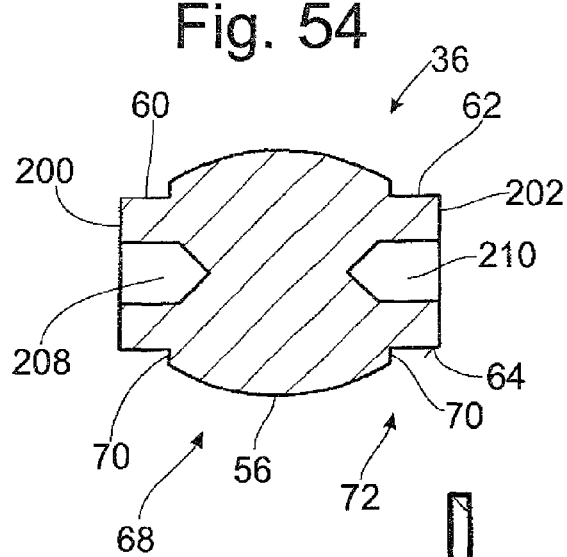
FIG. 54 a longitudinal sectional view of a guide body.
Figure 55:
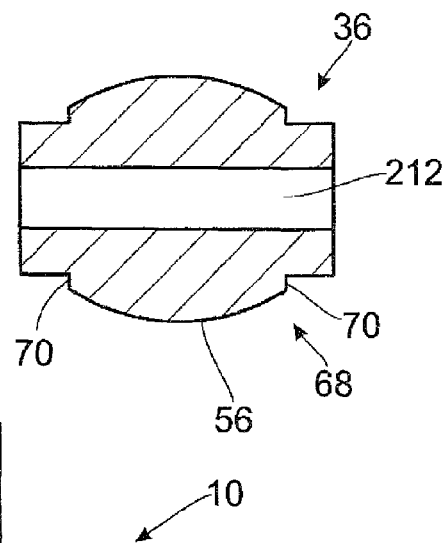
FIG. 55 a longitudinal sectional view of a guide body.

FIGS. 54 and 55 each show a guide body 36 in which a region of a first axial centering arrangement 68 is provided in each instance by the convex shape of the outer circumferential surface region 56, while a subregion of a second axial centering arrangement 72 is provided by a respective radial shoulder at the transition between the outer circumferential surface region 56 cooperating with a first guide track and the portions 60, 62 of the outer circumferential surface region 64 cooperating with a portion of a second guide track.

It will be seen that recesses 208, 210 are formed in the guide body 36 shown in FIG. 54 at both axial end regions thereof, which recesses 208, 210 are centric with respect to the center axis of rotation and center longitudinal axis, respectively, of the guide body 36 and which are open at the axial end regions or front sides 200, 202. In the guide body 36 shown in FIG. 55, a recess 212 penetrating this axial relief can be seen. In this way, the guide bodies 36 can have a lower weight even when they are constructed, e.g., from metal material; this can advantageously influence the vibration behavior of the deflection masses 14.

Figure 56:
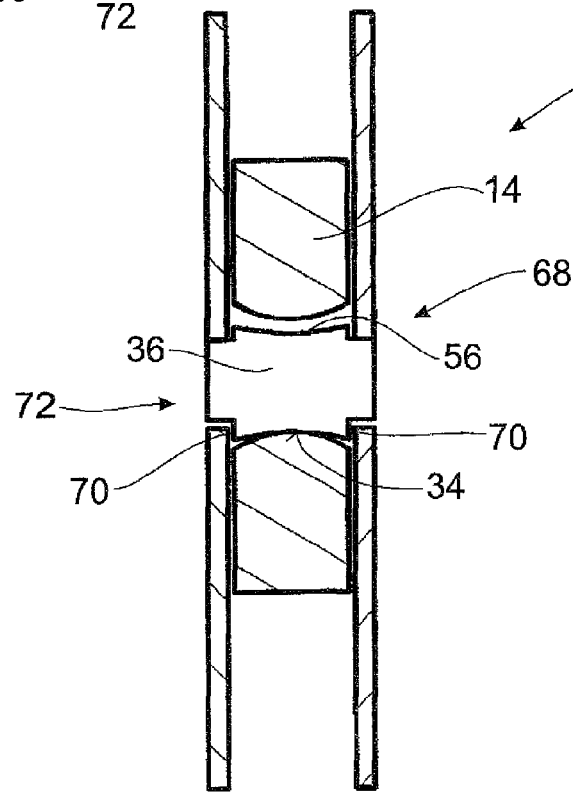
FIG. 56 a partial sectional view of a vibration damper device.

FIG. 56 shows an embodiment of a vibration damper device 10 in which the first axial centering arrangement 68 is again formed by cooperation of the deflection mass 14 in the area of its outer circumferential surface region or in the area of the outer circumferential surface region 56 of the guide body 36. In this configuration, the outer circumferential surface region 56, i.e., substantially the outer circumferential surface region arranged between two radial shoulders 70 of the axial centering arrangement 72, is formed with a concave shape, while the deflection mass 14 is formed with a convex shape in axial direction, particularly in the region of its first guide track 34.

Figure 57:
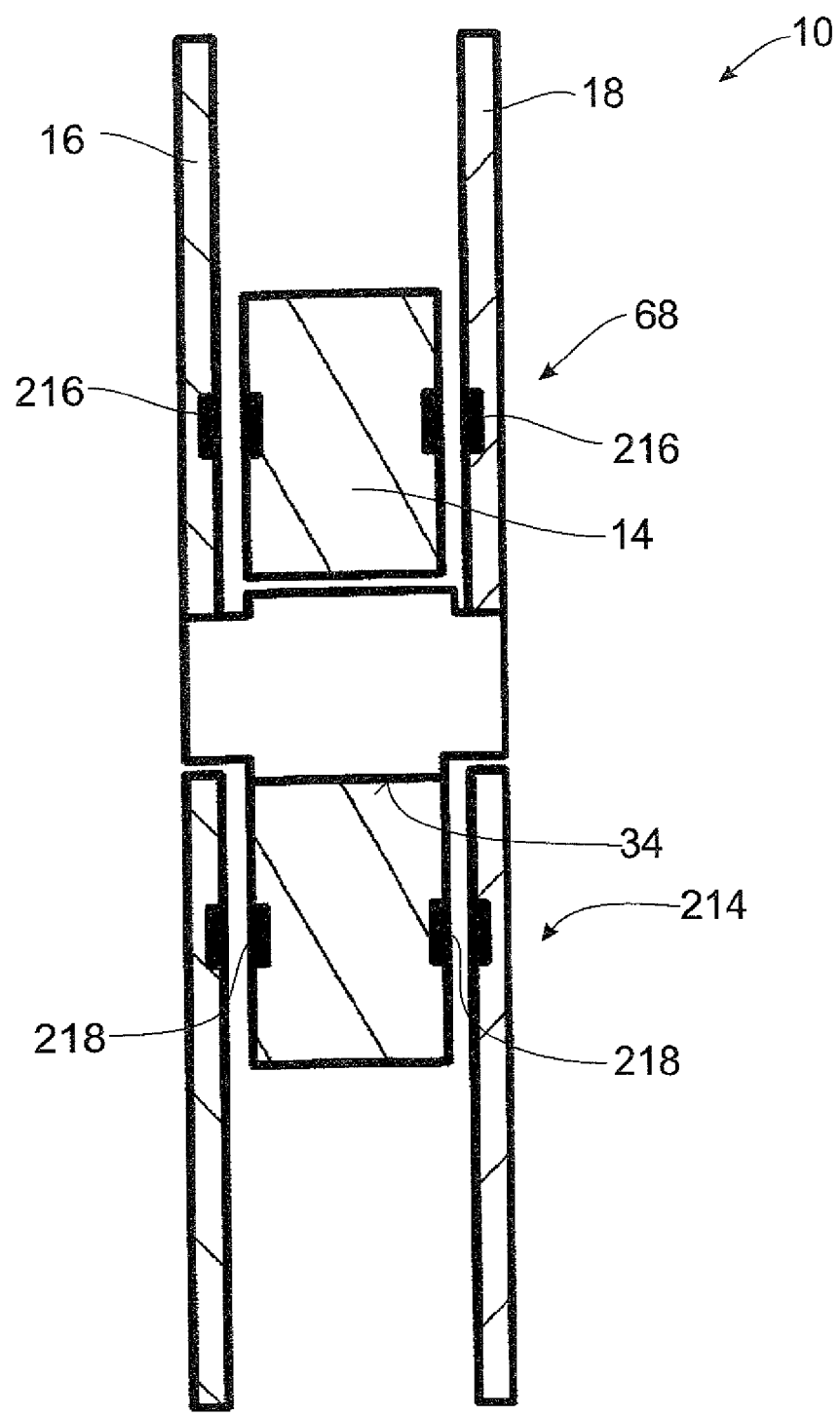
FIG. 57 a partial sectional view of a vibration damper device.

FIG. 57 shows an embodiment of a vibration damper device 10 in which the first axial centering arrangement 68 comprises a magnet arrangement 214. This magnet arrangement 214 comprises a magnet interaction region 216 preferably at each of the carrier disks 18 and, in association with each magnet interaction region 216 provided at a carrier disk 16 or 18, a magnet interaction region 218 at the illustrated deflection mass 14. The magnet interaction regions 216, 218 can be permanent magnets which are positioned so as to face each other by the same pole so that a centered positioning of the deflection mass 14 is achieved by the magnetic repulsion brought about in this way at both axial sides. Further steps, for example, a crowned shape in the region of a first guide track 34, can be provided. In an alternative variant, it is possible that at least one of the interaction regions 216, 218 acts electromagnetically, i.e., is constructed with a coil arrangement. This coil arrangement can be powered externally, but can also operate by self-induction during movement of the deflection masses or during rotation around the axis of rotation.

The interaction regions 216 and/or 218 can be positioned in recesses or indentations provided for this purpose in the carrier disks 16, 18 and respective deflection mass 14, respectively. It is also possible to magnetize one or both carrier disks on one hand or a respective deflection mass 14 on the other hand so that this/these structural component part(s) itself/themselves provide a magnet interaction region.

Figure 58:
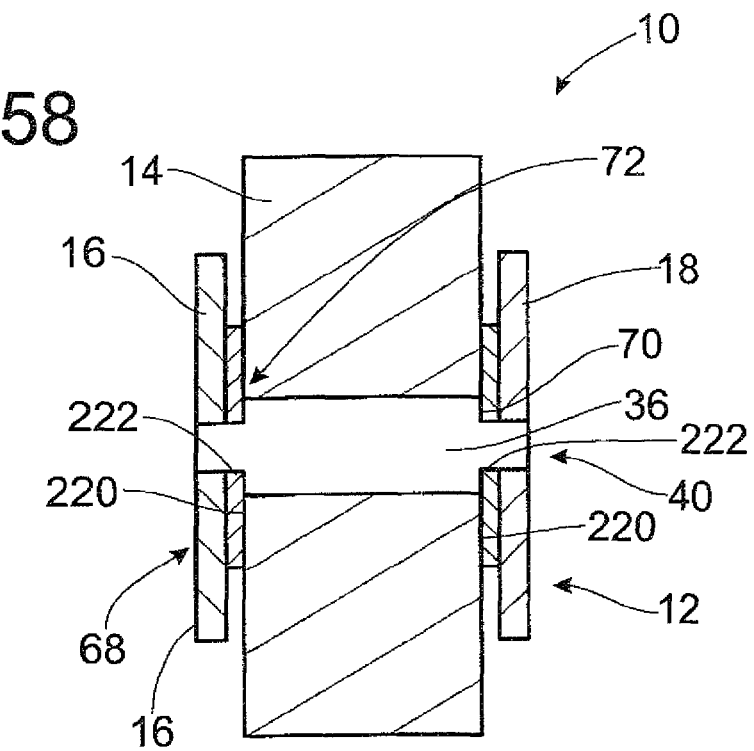
FIG. 58 a partial sectional view of a vibration damper device.

FIG. 58 shows an embodiment in which at least one disk-shaped supporting element 220 is arranged at both axial sides of a deflection mass 14 for axial support at the carrier disks 16 and 18, respectively. These supporting elements 220 have through-openings 222 associated with the portions of the second guide track 40. These through-openings can provide a surface region of the portions of the second guide track 40 especially when the disk-shaped supporting elements 220 are secured to the carrier disks 16, 18.

The deflection masses 14 are supported at the supporting elements 220 in axial direction with respect to the carrier disks 16, 18 and, therefore, with respect to the deflection mass carrier 12. The guide body 36 is also supported at these supporting elements 220 in axial direction by its radial shoulders 70 so that these supporting elements 220 can be associated with the first axial centering arrangement 68 as well as with the second axial centering arrangement 72.

Let it also be noted here that supporting elements of the kind mentioned above can be constructed so as to extend annularly around the axis of rotation of the vibration damper device 10. Also, individual supporting elements 220 which are discretely distributed by association with one or more second guide tracks 40 or one or more deflection masses 14 can be provided. The supporting elements 220 are preferably formed from a material which reduces a friction effect as far as possible, for example, a plastic material such as Teflon or the like.

Figure 59:
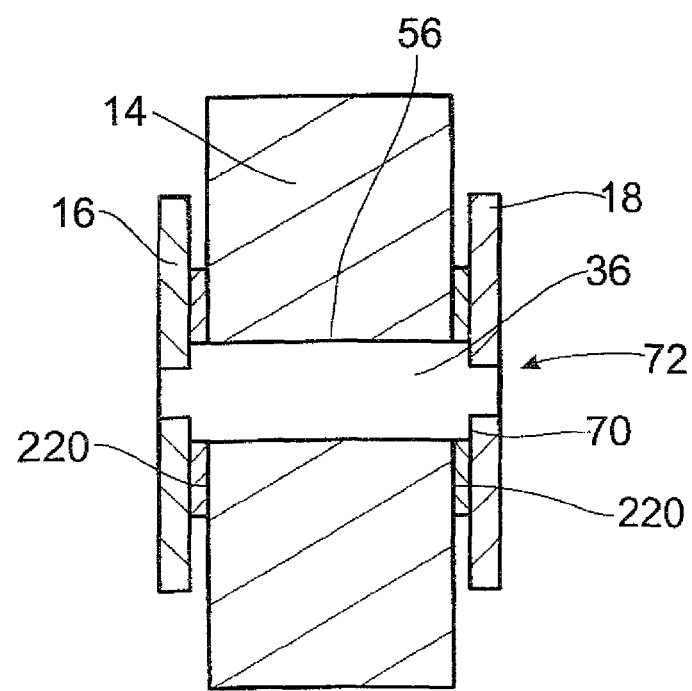
FIG. 59 a partial sectional view of a vibration damper device.

In the embodiment shown in FIG. 59, the supporting elements 220 do not make up a facet of the second axial centering arrangement 72. They surround the guide body 36 illustrated in FIG. 59 in the region thereof having a greater diameter, i.e., at outer circumferential surface region 56, and accordingly only provide for an axial support of the deflection mass 14 with respect to the carrier disks 16, 18. The second axial centering arrangement 72 again substantially comprises the radial shoulders 70 of the guide bodies 36, which radial shoulders 70 are directly supported at the carrier disks 16, 18. As in the variant shown in FIG. 58, a crowned shape of the guide bodies 36 in their outer circumferential surface region 56 or of the first guide tracks in the deflection masses 14 can also be omitted in this case.

Figure 60:
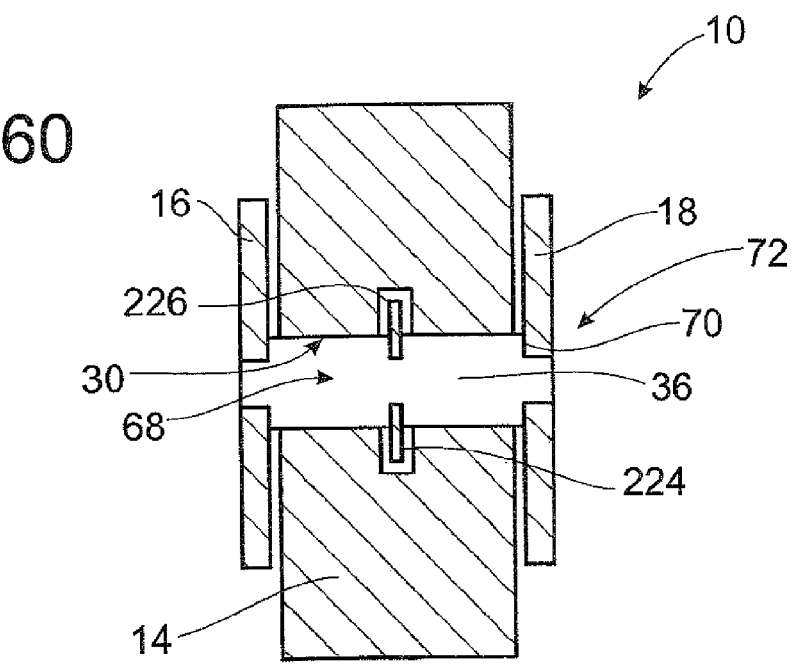
FIG. 60 a partial sectional view of a vibration damper device.

In FIG. 60, the first axial centering arrangement 68 which ensures that the deflection masses 14 are held axially in a defined manner comprises an axial centering projection 224 which is formed, for example, by a retaining ring or the like at the outer circumference of the guide body 36 and whose structure surrounds the guide body 36 annularly, for example. This projection extends into a corresponding axial centering cutout 226 provided at the aperture 30 of the deflection mass 14. In order to realize this construction, it is possible, for example, to form the deflection mass 14 so as to be divided in its central plane so that the cutout 226 is first formed when these two portions are joined together axially.

The second axial centering arrangement 72 comprises the radial shoulders 70 which can be supported axially at the inner surfaces of the carrier disks 16, 18. It should be noted that the various embodiment variants of the first axial centering arrangement 68 and of the second axial centering arrangement 72 which were described above and also those described in the following can be combined with one another optionally. For example, in the variant shown in FIG. 60, the second axial supporting arrangement 72 could comprise the above-described supporting elements at the inner sides of the carrier disks 16, 18.

Figure 61:
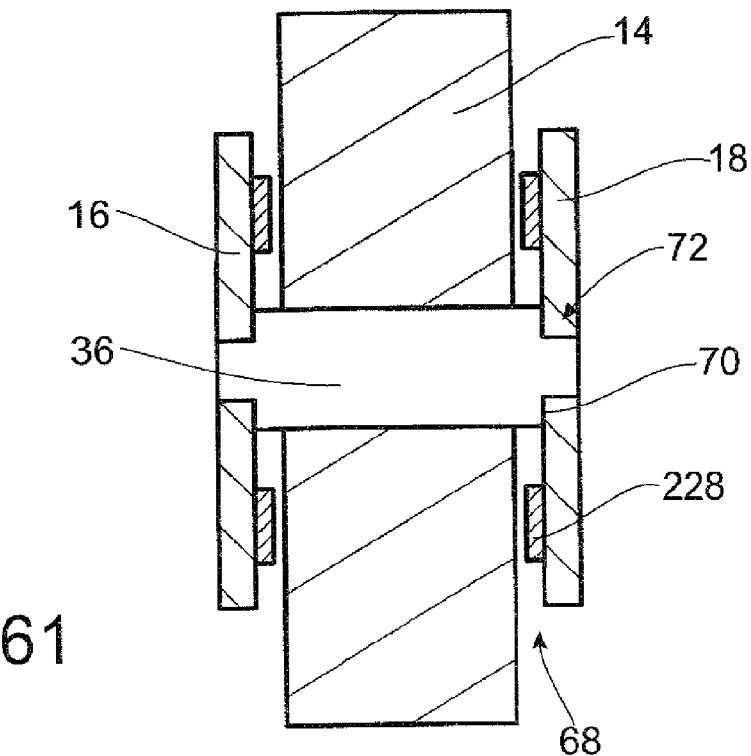
FIG. 61 a partial sectional view of a vibration damper device.

While the annular supporting elements in the embodiments shown above referring to FIGS. 58 and 59 can also be arranged, for example, as loose washers between the carrier disks 16, 18 on one side and the deflection masses 14 and guide bodies 36, respectively, so that they are supported, respectively, at the outer circumference of the associated guide body 36, FIG. 61 shows supporting elements 228 which are fastened to the inner sides of the carrier disks 16, 18 so as to be arranged at a distance from the outer circumference of the guide body 36, for example, by gluing or in some other fashion. These supporting elements 228 serve to axially support the deflection mass 14 and accordingly form a facet of the first axial supporting arrangement 68. The second axial supporting arrangement 72 comprises, for example, the radial shoulders 70 which are axially supported at the inner sides of the carrier disks 16, 18.

In an alternative embodiment, these supporting elements 228 could also be fastened to the axial side surfaces of the deflection mass 14 or provided at the latter additionally.

Figure 62:
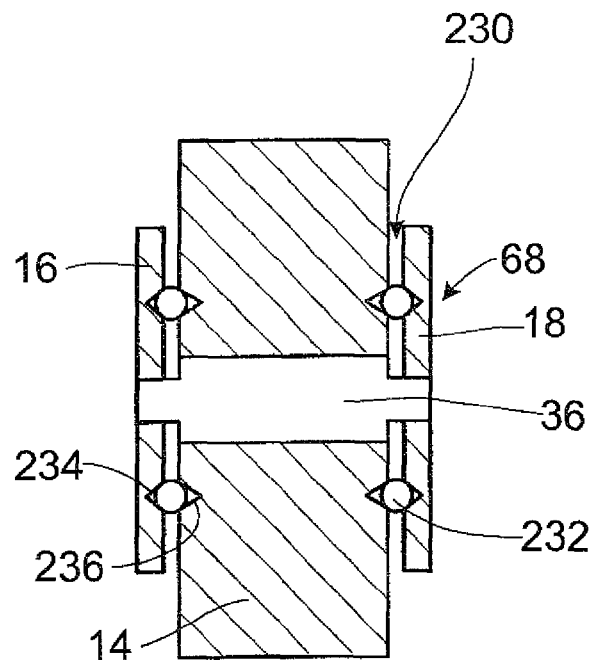
FIG. 62 a partial sectional view of a vibration damper device.

In the embodiment shown in FIG. 62, the first axial supporting arrangement 68 comprises a rolling element bearing arrangement 230 at the two axial sides of the deflection mass 14. The rolling elements 232 which are formed in this case as balls, for example, are guided in guide grooves 234 at the inner sides of the carrier disks 16, 18 on one hand and 236 at the axially opposite side surfaces of the deflection mass 14 on the other hand. The grooves 234, 236 extend in such a way that their path substantially corresponds to the path of the deflecting movement of the deflection mass 14 so that the balls 232 roll along the grooves 234, 236 substantially without constraints when the deflection mass 14 moves with respect to the carrier disks 16, 18.

Because friction effects are prevented, a particularly advantageous variant of the first axial centering arrangement 68 is provided in this case. The axial centering of the guide bodies 36 can then be carried out in one of the ways already described.

Figure 63:
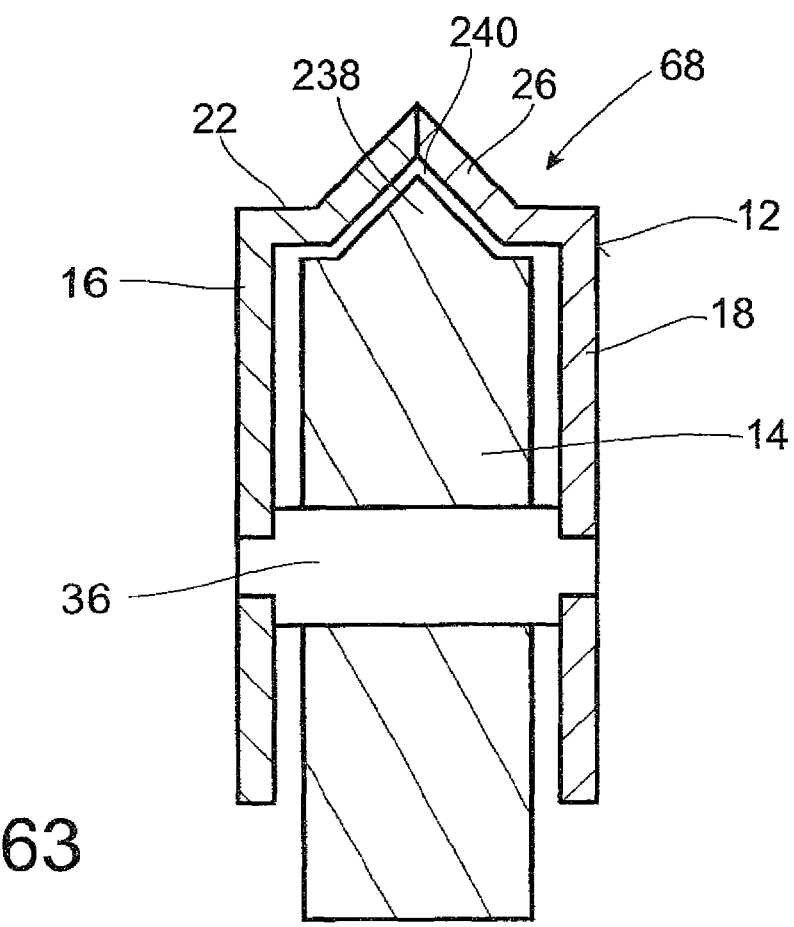
FIG. 63 a partial sectional view of a vibration damper device.

FIG. 63 shows an embodiment in which the first axial centering arrangement 68 is carried out by direct cooperation between the deflection mass 14 and the deflection mass carrier 12. To this end the deflection mass 14 has at its outer circumferential region a protuberance 238 which is convex, e.g., roof-shaped, between the axial ends thereof. This protuberance 238 engages in a correspondingly concave depression 240 at the outer circumferential region of the deflection mass carrier 12 and accordingly provides for a defined axial positioning of the deflection mass 14. The depression 240 can be achieved through a substantially symmetrical shape of the two deflection masses 16, 18 in the substantially axially extending portions 22 and 26 thereof. The two carrier disks 16, 18 can be fixedly connected to one another, e.g., by welding, at the location where these portions 22, 26 abut at one another.

The roof-like or angle-shaped protuberance 238 shown in FIG. 63 and corresponding configuration of the depression 240 are particularly advantageous because of the ease of fabrication.

Figure 64:
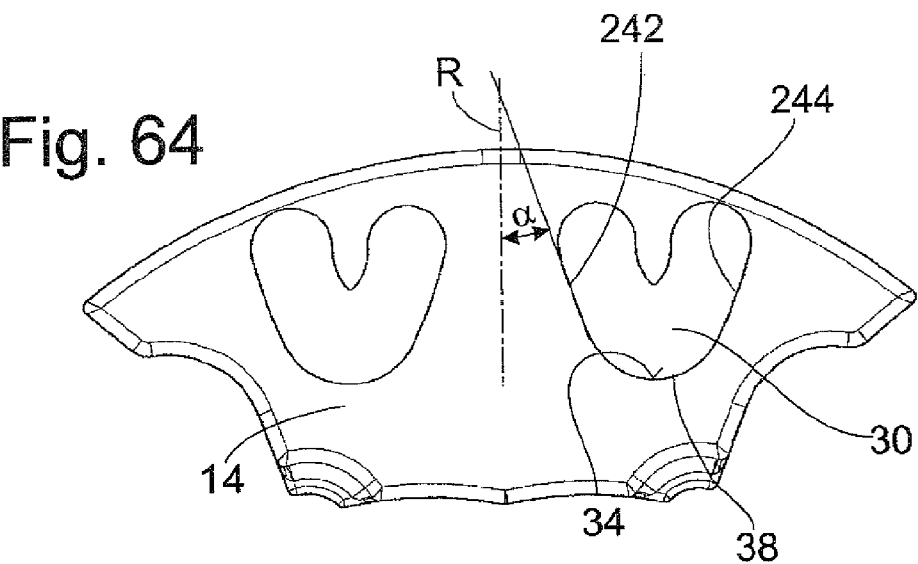
FIG. 64 an axial view of a deflection mass.
Figure 65:
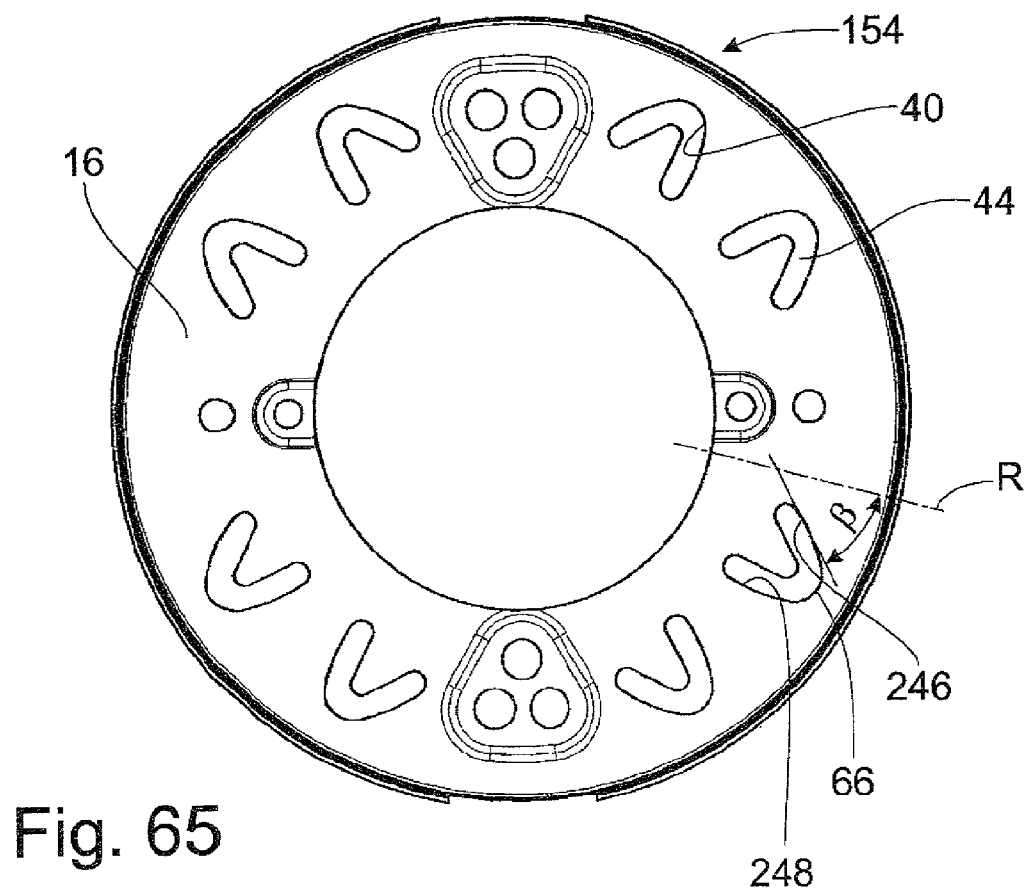
FIG. 65 an axial view of a carrier disk of a deflection mass carrier.

Different embodiments for limiting the deflection movement of the deflection masses 14 will be described in the following. Accordingly, FIGS. 64 and 65 show a movement limiting arrangement 154 provided by a special configuration of the first guide tracks 34 on one side and of the second guide tracks 40 or the two portions thereof on the other side. It will be seen by comparison with the embodiments shown above that the first guide tracks 34 have two guide track legs 242, 244 proceeding from their guide track vertex 38; in their end regions remote of the guide track vertex 38, these two guide track legs 242, 244 enclose only a comparatively small angle α, for example, in the range of up to 30°, with a radial line R, i.e., they extend substantially parallel. In a corresponding manner, the second guide tracks 40 are also formed with guide track legs 246, 248 starting from their respective guide track vertex 66; in their end regions remote of the guide track vertex, these two guide track legs 246, 248 also enclose a very small angle β, for example, in the range of up to 30°, with a radial line R. Because of these comparatively steeply extending guide track legs of the first guide track 34 and the associated second guide track 40, when a guide body which is guided at the latter arrives in the end region of the respective guide tracks, forces acting in circumferential direction substantially generate a compressive load between the guide bodies and the guide tracks but only small force components develop in the direction of the guide tracks.

Figure 66:
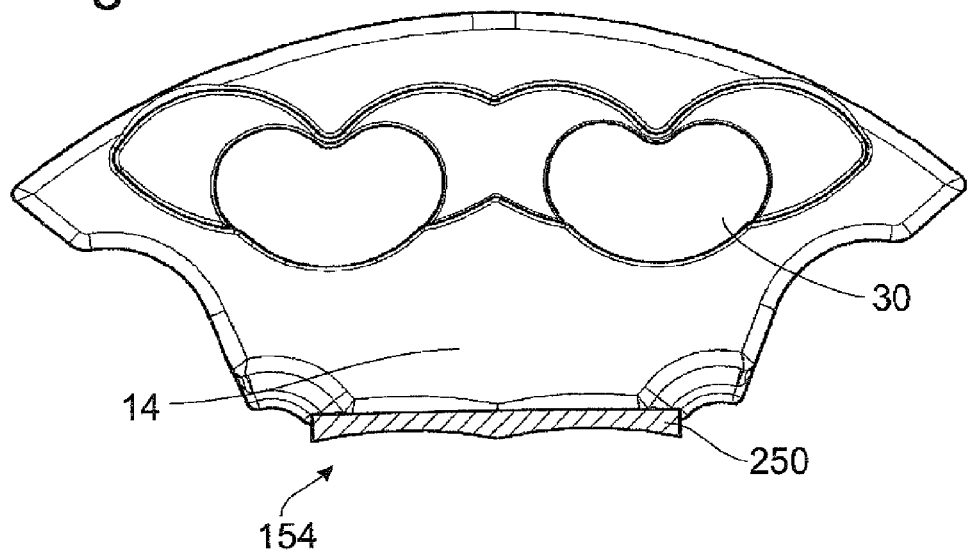
FIG. 66 an axial view of a deflection mass.

In FIG. 66, the movement limiting arrangement 154 is formed radially inside the deflection masses 14, for example, with the movement stop 156 shown in FIG. 13. A resilient stop element 250 which comes into contact with the movement stop 156 in the event of excessive deflection of the deflection masses 14 is provided at the side of the deflection masses 14 facing inward. In this way, the mass of the deflection masses 14 can be increased on the one hand, and the construction can be simplified in the region of the movement stop 156 itself on the other hand.

Figure 67:
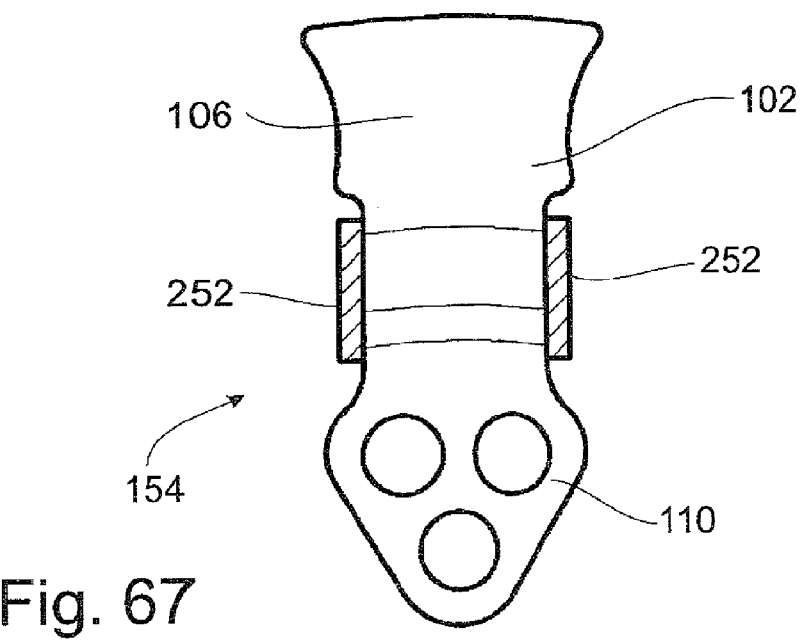
FIG. 67 a circumferential supporting element.

FIG. 67 shows an embodiment in which the movement limiting arrangement 154 comprises at least one circumferential supporting element 102. Resilient elements 252 are provided at the two axial sides of the latter, for example, in the transitional area between a circumferential supporting region 106 and a connection region 110, and the deflection masses which are deflected in circumferential direction and which are arranged on both sides of this circumferential supporting element 102 can stop against this resilient element 252.

In the embodiment shown in FIG. 68, the movement limiting arrangement 154 comprises resilient stop elements 254 at the two circumferential end regions of a deflection mass. In this case, also, a circumferential supporting element, or a region of a carrier disk receiving this circumferential supporting element, which is arranged adjacent to a deflection mass 14 of this kind in circumferential direction, can be used as movement stop.

FIG. 69 shows a deflection mass 14 in which a resilient stop element 256 is provided in each instance at the circumferential end of an aperture 30 and, therefore, also in the end region of a respective first guide track 34 or is inserted into the aperture 30. In this case, movement limiting is achieved by means of the movement limiting arrangement 154 in that a guide body moving along a first guide track 34 is prevented by the resilient stop element 56 from moving farther when reaching the end region of the guide track 34 and accordingly undergoes a damped stop.

Alternatively or in addition, corresponding resilient stop elements 258 can also be provided in association with the second guide tracks and the portions providing these second guide tracks in the carrier disks of the deflection mass carrier 12. At that location also, the guide bodies undergo a resilient stop when reaching an end region of the respective second guide track 40 so that the movement of the deflection masses 14 is braked or terminated without an impact of metal upon metal. Since there is no need in this case to provide measures for limiting movement at the deflection masses themselves or at the radially inner side thereof, more installation space is available for the deflection masses.

FIG. 70 shows an axial view of a carrier disk of a deflection mass carrier with resilient stop elements 258 and guide tracks 40.

Figure 71:
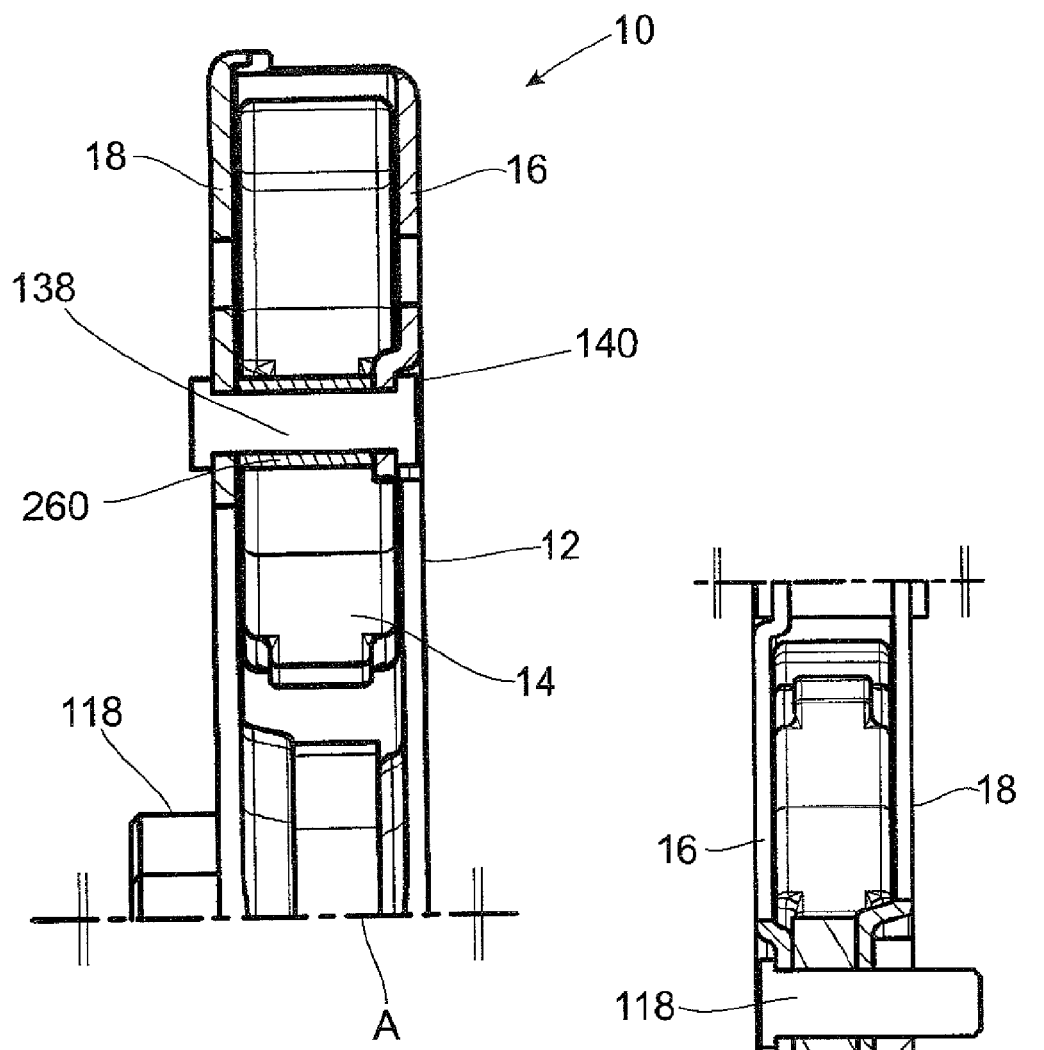
FIG. 71 a partial axial sectional view of a vibration damper device.

FIG. 71 shows a deflection mass carrier 12 in which the two carrier disks 16, 18 are connected to one another axially by, among others, the second connection elements 138 which penetrate the latter axially and which are also formed in this case as rivet bolts. In this case, the rivet bolts themselves are not formed as spacer elements but, rather, are surrounded by a sleeve-like spacer element 260 against which the two carrier disks 16, 18 can be held in position during riveting.

Figure 72:
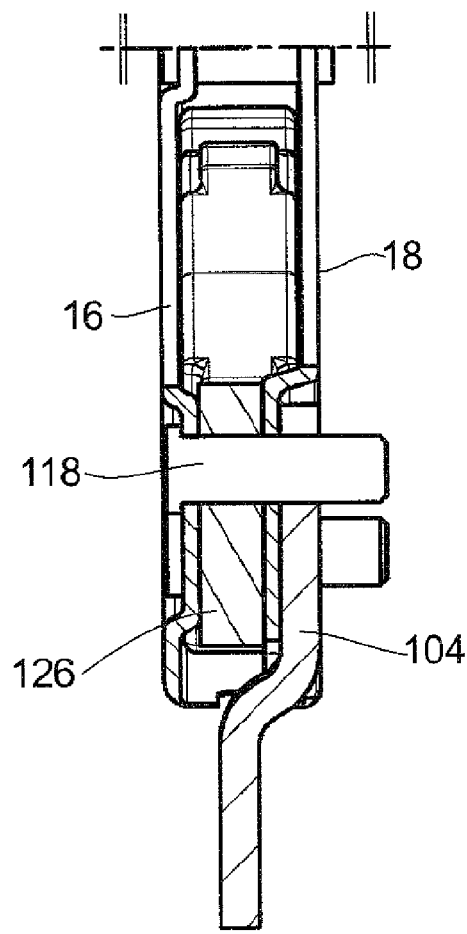
FIG. 72 a partial axial sectional view of a vibration damper device.

FIG. 72 shows an embodiment in which the axial spacing of the two carrier disks 16, 18 is realized in the region of the first connection elements 118 through which the connection of the circumferential supporting elements (in this instance, 104) and of the secondary-side mass part 98, respectively, is carried out. To this end, the spacer element 126 shown in FIG. 72 is constructed so as to be thicker than was previously stated so that it substantially completely fills the axial intermediate space between the two carrier disks 16, 18 in this case. This results in an improved stiffness and, therefore, increased stability in the region in which the torque to be transmitted into a drivetrain is also conveyed by means of the connection realized by the first connection elements 118 between the circumferential supporting elements 104 and the secondary-side mass part.

Figure 73:
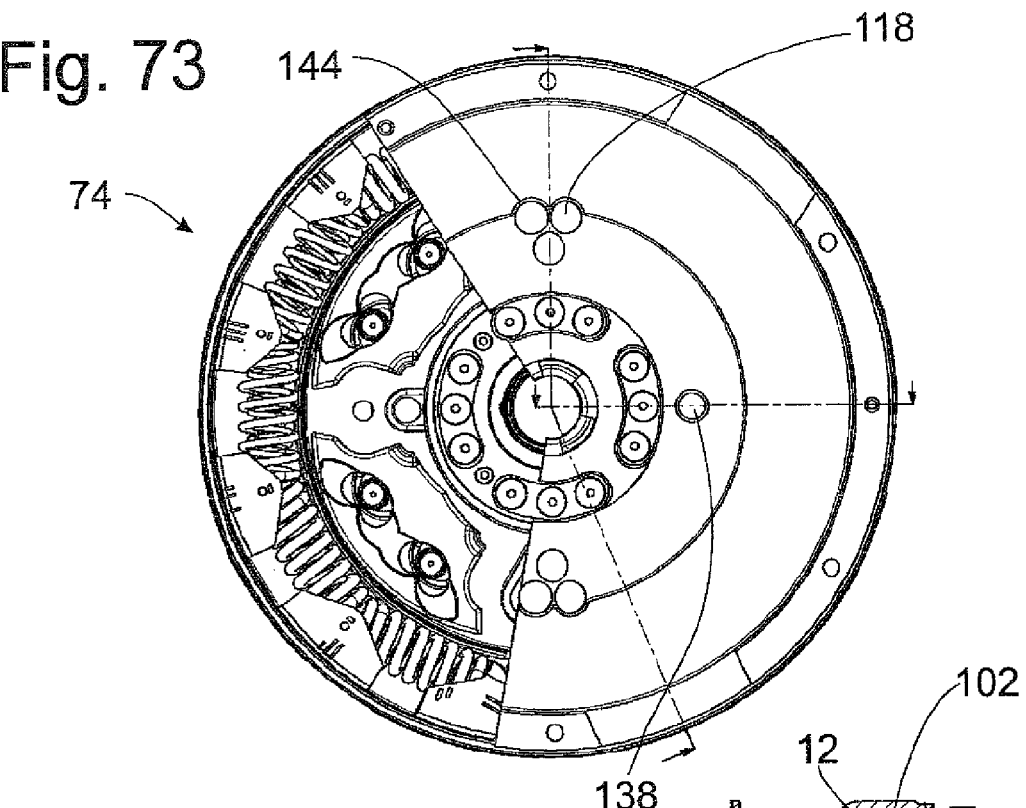
FIG. 73 an axial view of a torsional vibration damper arrangement with a vibration damper device.
Figure 74:
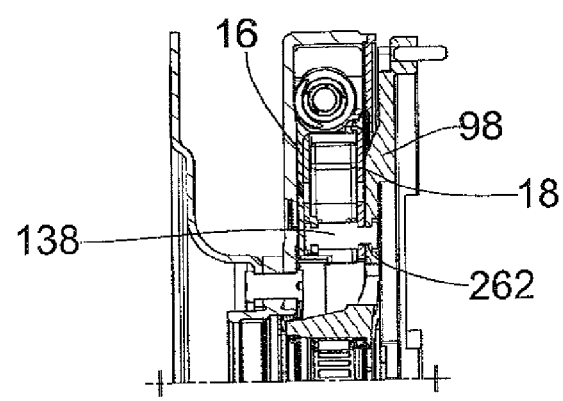
FIG. 74 a partial axial sectional view of a torsional vibration damper arrangement with a vibration damper device.
Figure 75:
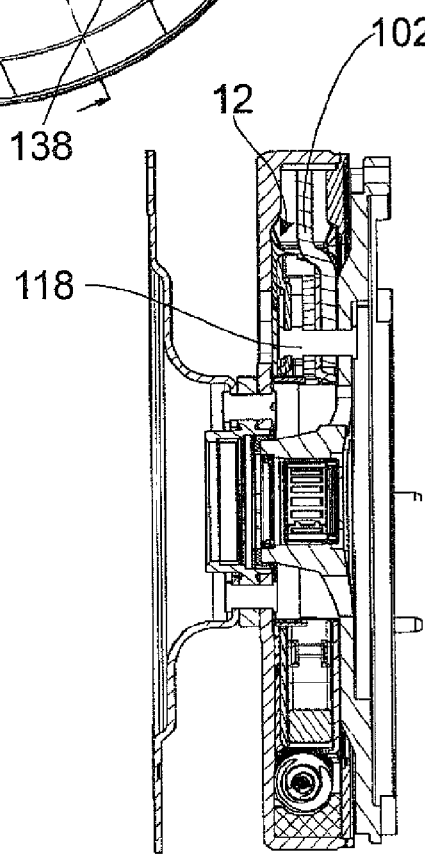
FIG. 75 an axial sectional view of a torsional vibration damper arrangement with a vibration damper device.

FIGS. 73 to 75 show an embodiment of a torsional vibration damper arrangement 74 in which the secondary-side mass part 98 is connected to the circumferential supporting elements 102 by the first connection elements 118, which are preferably arranged in groups of three, and by the second connection elements 138 which are arranged at an angular distance of 90° relative thereto. To this end, the secondary-side mass part 98 has a stepped aperture 262 in association with these second connection elements 138 so that the rivet head which is formed after riveting is also located in this aperture 262, namely the region of greater diameter. While the second connection elements 138 do not serve in this instance to transmit or introduce torque into the secondary-side mass part 98, they result in increased stiffness of the deflection mass carrier 12 which is substantially formed with the two carrier disks 16, 18.

FIGS. 76 and 77 show examples of a carrier disk 18 which is provided with a structure with fewer axial protuberances than in the variants described above. For example, the carrier disk 18 shown in FIG. 76 has no axial protuberances in the region of the respective first guide tracks 40. As a result, in the deflection masses 14 cooperating therewith, associated depressions need no longer be provided in the environment of the apertures 30 as is shown in FIGS. 78, 79 and 80.

While the carrier disk 18 shown in FIG. 77 has an axial protuberance associated with the respective first guide tracks 40 in order to enlarge the guide surface, it has no depressions in the location where a respective circumferential supporting element is to be connected, i.e., where the apertures 120 are formed in groups of three for receiving the first connection elements 118. Of course, in this example of a carrier disk 18 shown in FIG. 77 the axial protuberances can also be omitted in the region of the first guide tracks 40 as is shown in FIG. 76. A substantially planar structure is also provided in the region of those apertures in which a connection of the second connection elements is to be carried out. Of course, the other respective carrier disks can also be shaped in a corresponding manner.

Figure 81:
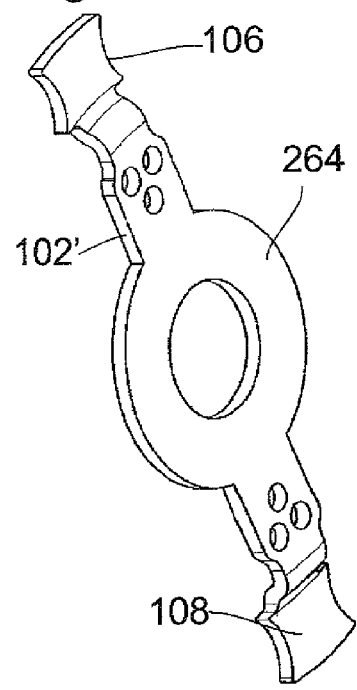
FIG. 81 a circumferential supporting element with two circumferential supporting regions.
Figure 82:
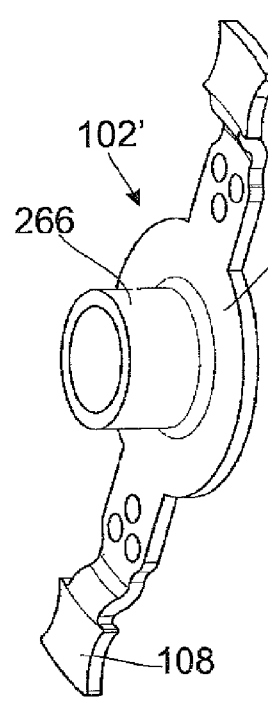
FIG. 82 an alternative embodiment of a circumferential supporting element with two circumferential supporting regions.
Figure 83:
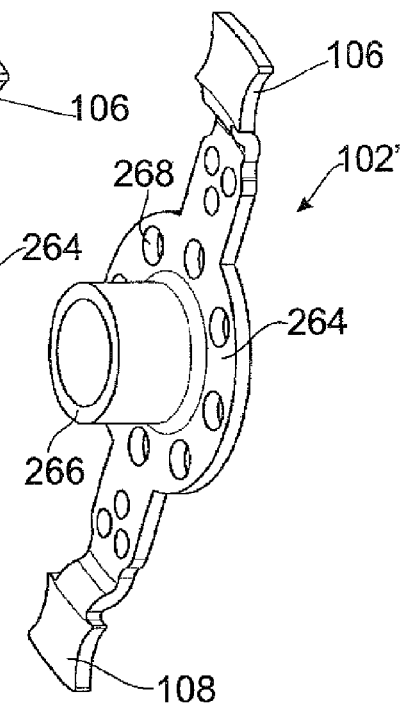
FIG. 83 an alternative embodiment of a circumferential supporting element with two circumferential supporting regions.

FIGS. 81 to 83 show bar-like circumferential supporting elements 102' having two circumferential supporting regions 106, 108 which are arranged at an angular distance of approximately 180° relative to one another. In a central region these circumferential supporting elements 102' have an annular portion 264 in each instance. This annular portion 264 serves to provide a through-space, for example, for the axial end of a driven shaft. A cylindrical projection 266 which can serve for the radial support of different subassemblies, for example, the secondary side 96 with respect to the primary side 76 or the secondary side 96 with respect to a driven shaft, can also be provided at this annular portion 264. Further, apertures 268 through which screw bolts or the like can pass for securing to a crankshaft, for example, can be formed in the annular portion 264.

Figure 84:
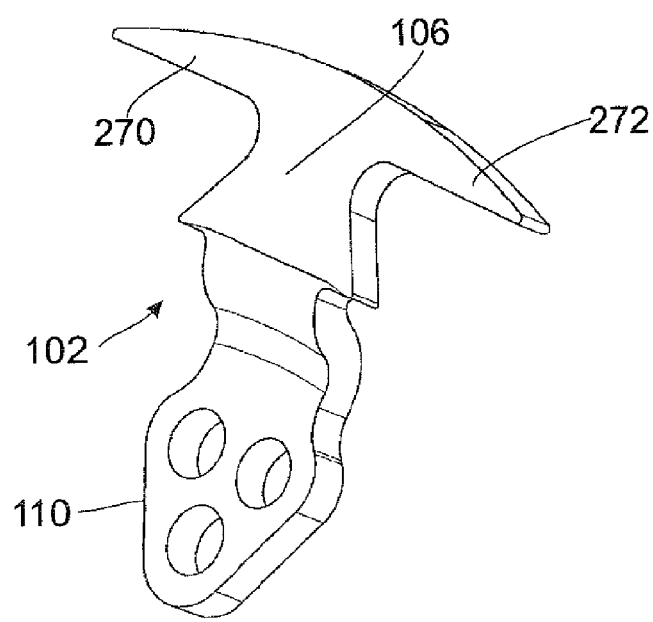
FIG. 84 a circumferential supporting element with a circumferential supporting region.

FIG. 84 shows a circumferential supporting element 102 which has only one individual circumferential supporting region 106 and one connection region 110. Two circumferential projections 270, 272 are provided in the circumferential supporting region 106. These circumferential projections 270, 272 serve to radially outwardly overlap the spring plates 94 serving for the circumferential support of the spring element units 86, 88 and to support them radially outwardly. This reduces the sliding frictional interaction thereof with respect to the primary side, which leads to an improved decoupling between the primary side 76 and the secondary side 96. Of course, projections 270, 272 of this kind which are used for radial support can also be provided in circumferential supporting elements with two circumferential supporting regions as is shown in FIGS. 81 to 83.

FIGS. 85 to 87 show an embodiment in which the two circumferential supporting elements 102, 104 arranged at a circumferential distance of 180° are received by their connection region 110 and 112, respectively, in cutouts 274, 276 rather than in depressions of the carrier disk 18. The circumferential extension of this cutout is dimensioned in such a way that the circumferential supporting elements 102, 104 with the connection region 110, 112 thereof are received therein substantially without circumferential movement play and are accordingly supported at approximately radially extending end faces formed at the carrier disk 18. Radially outward of the cutouts 274, 276, the carrier disk 18 has a coupling region 278 and 280, respectively, which is covered in each instance by the circumferential supporting region 106 and 108, respectively, of the circumferential supporting elements 104 and has a contour substantially identical to it. In these coupling regions 278, 280, the circumferential supporting elements 102, 104 are fixedly connected to the carrier disk 18 on one side and to the carrier disk 16 on the other side by additional connection elements 282 which are preferably formed as rivet bolts. To this end, the carrier disk 16 also has corresponding coupling regions 284, 286 extending radially outward. The connection of the circumferential supporting elements 102, 104 to the secondary-side mass part, not shown here, is carried out in the manner described above by the first connection elements, i.e., for example, also rivet bolts, which penetrate the apertures 122 provided in the connection regions 110, 112.

As will be seen particularly in FIG. 87, the circumferential supporting elements 102, 104 are axially recessed in the transitional region between their connection region 110 and 112, respectively, and the respective circumferential supporting region 106, 108 also in this embodiment. In a corresponding manner, the carrier disk 18 is also axially offset particularly in its radially outer region, i.e., where the coupling regions 278, 280 are formed, so that the circumferential supporting elements also contact the outer side of the carrier disk 16 at this location.

An advantage of this embodiment consists in that a larger installation space which is not limited by the depressions of the carrier disk 18 is available for the deflection masses arranged between the two carrier disks 16, 18. In particular, with appropriate shaping in circumferential direction, they can also be deflected in regions in which the circumferential supporting elements extend.

Figure 88:
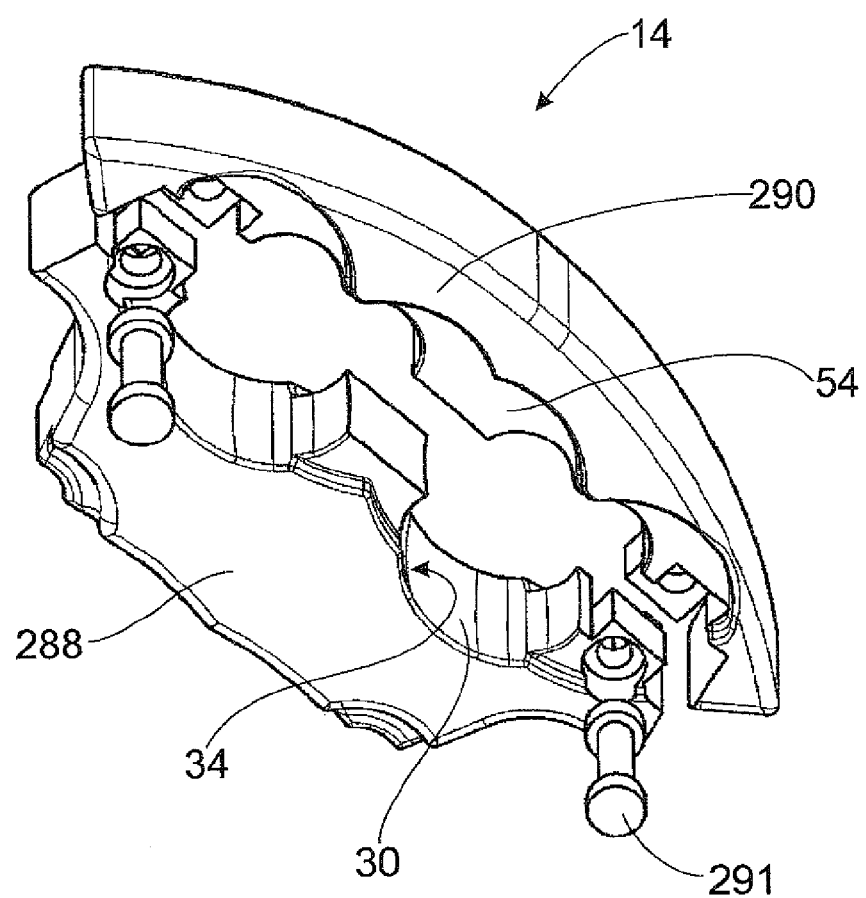
FIG. 88 a deflection mass with two deflection mass parts.

FIG. 88 shows an embodiment of a deflection mass 14 constructed with two deflection mass parts 288, 290. In its entirety, this deflection mass 14 corresponds to that shown in FIG. 10. Together, the two deflection mass parts 288, 290 accordingly limit the apertures 30 which provide a first guide track 34 at their radially inner region. The fixed connection of the two deflection mass parts 288, 290 is carried out by means of connection elements 291, for example, rivet bolts, provided in circumferential end regions thereof. Alternatively or additionally, the connection could be carried out by means of welding, gluing, soldering, clamping, screwing or the like.

The embodiment with two deflection mass parts 288, 290 which are divided particularly in the region of the apertures 30 but which then in their entirety define the apertures 30 also makes it possible to produce guide tracks of comparatively more complex geometry without cutting, for example, by forging metal parts, by extrusion, sintering, or the like. In an embodiment of the deflection masses 14 of this kind in which they comprise multiple parts, the insertion of first guide track elements which have already been described above can be easily implemented.

Figure 89:
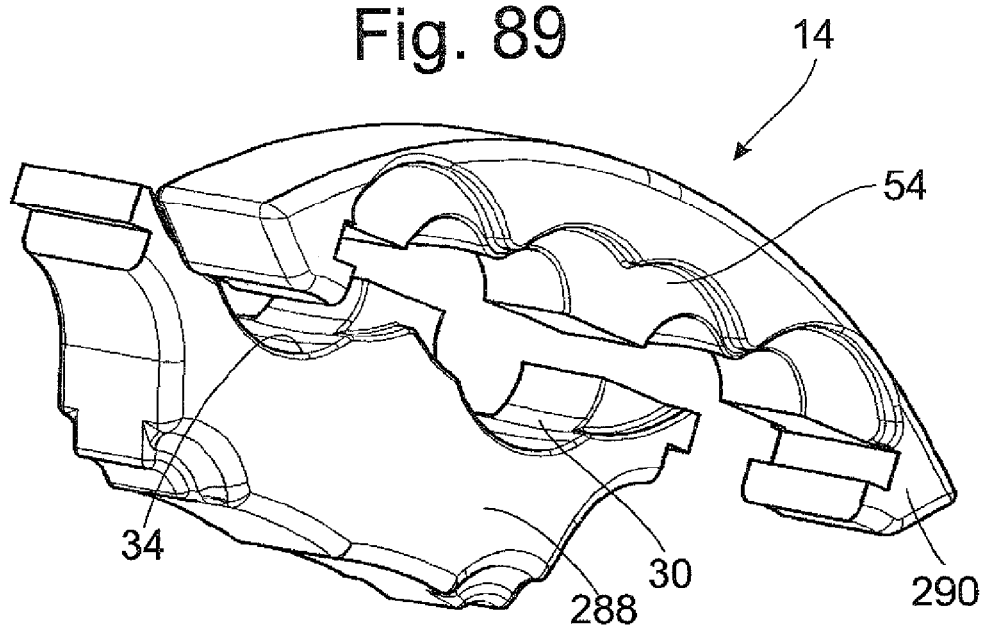
FIG. 89 a deflection mass with two deflection mass parts.

FIG. 89 shows an embodiment in which the two deflection mass parts 288, 290 which are again divided as is shown in FIG. 88, i.e., in a line or plane extending approximately in circumferential direction and in the region of the apertures 30, are to be connected to one another by inserting one inside the other axially in direction of the axis of rotation of the vibration damper device. This results in a connection with positive engagement in radial direction, which also ensures a stable connection under centrifugal forces. The two deflection mass parts 288, 290 can be fixedly connected to one another by gluing, clamping, soldering or welding.

Figure 90:
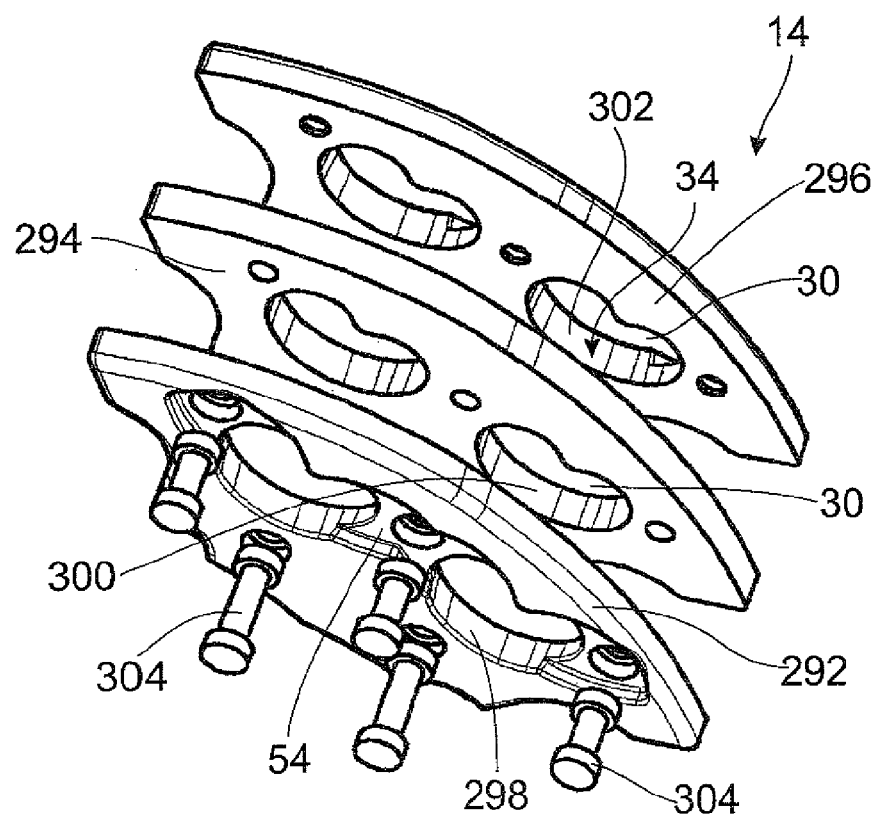
FIG. 90 a deflection mass with three deflection mass parts.

FIG. 90 shows a deflection mass 14 which is formed with three deflection mass parts 292, 294 arranged in axial succession. They have circumferential contours corresponding to one another and each have apertures 30, portions 298, 300, 302 of a respective first guide track 34 being provided at the radially inner sides of these apertures 30. A respective outer circumferential region of a guide body enters into contact with these axially successively arranged portions 298, 300, 302.

The fixed connection of the three deflection mass parts 292, 294, 296 can be carried out by means of connection elements 304, for example, rivet bolts, provided at a plurality of positions. Of course, other connection techniques such as welding, gluing, clamping, soldering, or screwing are also possible in this case.

The two deflection mass parts 292, 296 positioned at the axial end sides have at their sides facing away from one another depressions 54 which can receive the axial protuberances that are provided at the carrier disks and that provide portions of the second guide tracks.

Figures 91, 92:
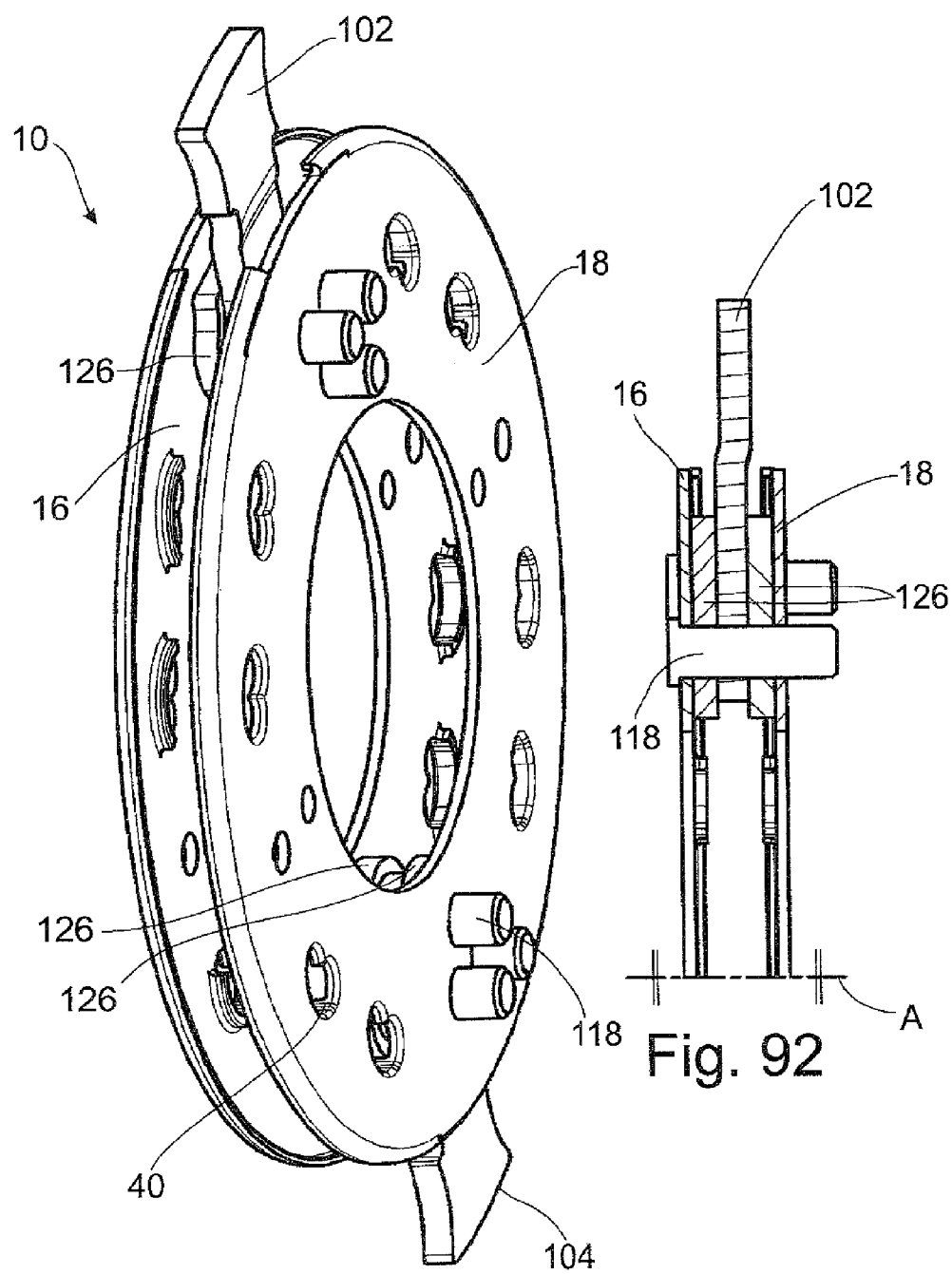
FIG. 91 a perspective view of a deflection mass carrier.
FIG. 92 the deflection mass carrier of FIG. 91 in partial axial section.
Figure 93:
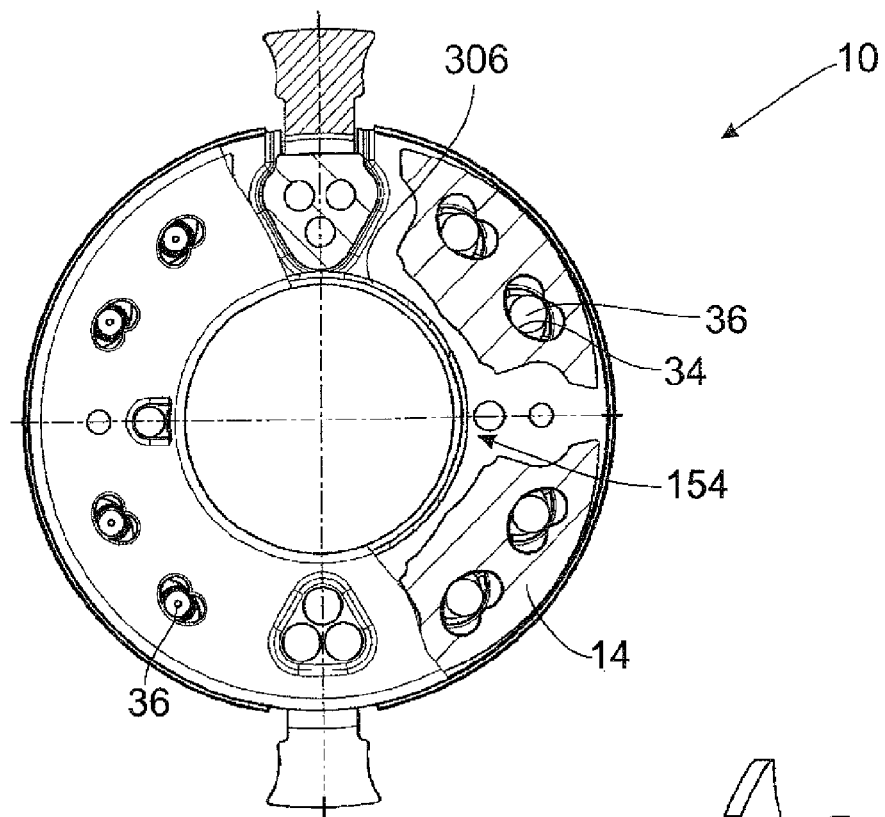
FIG. 93 an axial view of a vibration damper device with partially exposed carrier disk.
Figure 94:
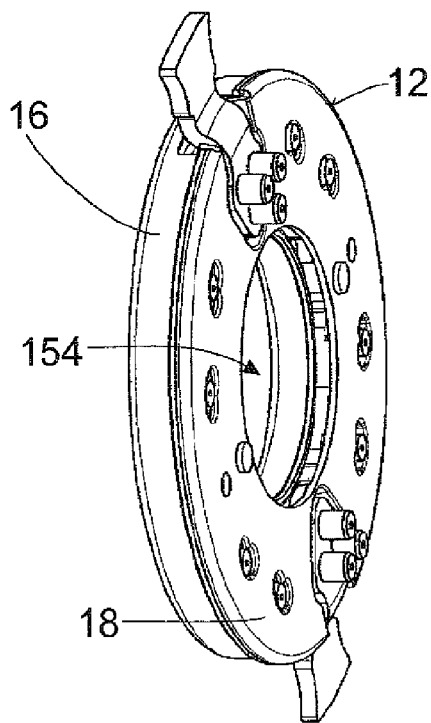
FIG. 94 a perspective view of the vibration damper device of FIG. 93.

FIGS. 91 and 92 show an embodiment in which the two circumferential supporting elements 102, 104 are positioned between the two carrier disks 16, 18 and not so as to contact the outer side of the carrier disk 18 remote of carrier disk 16. Since the circumferential supporting elements 102, 104 which are fabricated from sheet metal material, for example, will generally have a thickness that is less than the axial intermediate space between the two carrier disks 16, 18 in which the deflection masses 14 are also received, spacer elements 126 are provided on both sides of the circumferential supporting elements 102, 104. The two carrier disks 16, 18, the spacer elements 126 disposed therebetween, and the circumferential supporting elements 102, 104 positioned between the respective spacer elements 126 are combined to form a constructional group by means of the first connection elements 118 by which the fixed connection of the secondary-side mass part to the circumferential supporting elements 102, 104 is also carried out. Also, at least one of the spacer elements 126 can be dispensed with by constructing the circumferential supporting elements 102, 104 with greater thickness.

Since the circumferential supporting elements 102, 104 in this embodiment are already arranged axially approximately in the middle between the two carrier disks 16, 18, the circumferential supporting elements 102, 104 can be formed in a substantially planar manner or with only a slight axial offset. This facilitates production and leads to reduced material stresses in the circumferential supporting elements.

As in the embodiments described in the preceding, one of the two spacer elements, particularly the spacer element 126 positioned adjacent to the carrier disk 16, could be omitted and replaced by a spacer collar at the connection elements 118.

Whereas in the embodiments described above the circumferential supporting elements to be connected to the secondary-side mass part can be positioned so as to substantially directly adjoin the secondary-side mass part through the positioning at the axial outer side of the carrier disk 16 so that there is substantially no additional loading of the structural component parts of the rotational vibration damper device 10 during torque transmission, the carrier disk 18 and the spacer element 126 that is positioned adjoining the latter are arranged in the example shown in FIGS. 91 and 92 between the circumferential supporting elements 102, 104 and the secondary-side mass part, not shown in FIGS. 91 and 92. When a plurality of first connection elements 118 are provided in association with each circumferential supporting element, this can also result in stronger pressing during torque transmission, for which purpose the structural components parts arranged between the secondary-side mass part and the circumferential supporting elements are designed with corresponding strength.

FIGS. 93 to 97 show an embodiment of the vibration damper device 10 in which the movement limiting arrangement 154 is integrated in the deflection mass carrier 12. To this end, the carrier disk 16 has in its radially inner region a cylindrical movement stop 306 which extends axially from the disk-shaped region 20. This movement stop 306 extends radially inside the deflection masses 14 and, as is shown in FIGS. 96 and 97, can carry the annular resilient element 164 at its outer circumference.

To provide this movement stop 306, the other carrier disk 18 could, of course, also be formed axially in a corresponding manner or both carrier disks could have cylindrical portions which extend toward one another and which collectively provide the movement stop. Instead of an integrated design, it is also conceivable to fix the movement stop 306 to at least one of the carrier disks 16, 18, for example, by riveting, welding or the like. For the fixed connection of the resilient element, the latter can be shrunk on, glued on or vulcanized, for example. The extrinsically bonding connection can also be made by means of injection molding or spraying. In another alternative embodiment, this movement stop which lies radially inside the deflection masses 14 and is ring-shaped, for example, could be provided by the radially inner region of the secondary-side mass part. The resilient element 164 could also then be arranged on this region of the secondary-side mass part to dampen the impacts of the deflection masses.

An advantage in providing the movement stop 306 and the annular resilient element 164 provided at the outer circumference thereof directly at the deflection mass carrier 12 or secondary-side mass part 98 consists in that a connection to the secondary side 96 of the torsional vibration damper arrangement 74 is made in this way. Sliding relative movements between the impacting deflection masses 14 and the movement limiting arrangement 154 which can lead to wear are prevented in this way.

FIGS. 98 to 100 show a deflection mass 14 with two apertures 30 which are provided for cooperating with guide bodies and which provide first guide tracks 34. It will be seen that in this embodiment form the deflection masses 14 considered in axial direction are asymmetrical with respect to an axial center plane E. This means that the mass centroid of this deflection mass 14 does not lie in the axial center plane E but rather is shifted toward one axial side. In a corresponding manner, the apertures 30 are also not symmetrical with respect to the center plane E in axial direction. It will be seen in particular that the first guide tracks 34 which provide a first axial centering arrangement 68 and which are concave in this case are also arranged so as to be axially offset with respect to the axial center plane E. In this manner, the first guide tracks 34 or the region thereof for cooperating with a respective guide body can be substantially located where the mass centroid of a respective deflection mass 14 is also located so that no tilting moments are generated due to centrifugal force.

Due to this embodiment of the deflection masses 14 which is asymmetrical in axial direction, it is possible to better adapt the latter to the space conditions existing in the interior of the deflection mass carrier 12. In particular, it is possible, for example, that the deflection masses 14 penetrate in their radially outer region into circumferential areas in which the depressions 114 and 116, respectively, are arranged for the circumferential supporting elements 102, 104.

FIGS. 101 to 103 show a deflection mass 14 which is asymmetrical with respect to a circumferential center line M substantially corresponding to a radial line. In particular, a depression 308 is seen in a circumferential end region so that a more slender shape of the deflection mass 14 in axial direction is achieved in this region. This also allows penetration into areas in which the distance between the two carrier disks is smaller.

FIG. 103 shows that the apertures 30 and the first guide tracks 34 formed therein are arranged substantially symmetrically with respect to the axial center line E. However, in circumferential direction, the apertures 30 and the first guide tracks 34 formed therein can be positioned in such a way that substantially equal force is exerted on both of the guide bodies cooperating with the deflection mass 14, also taking into account the asymmetrical shape of the deflection mass 14 in circumferential direction. To this end, the mass centroid should advantageously lie on the circumferential center line M and also in the axial center plane E.

Figure 104:
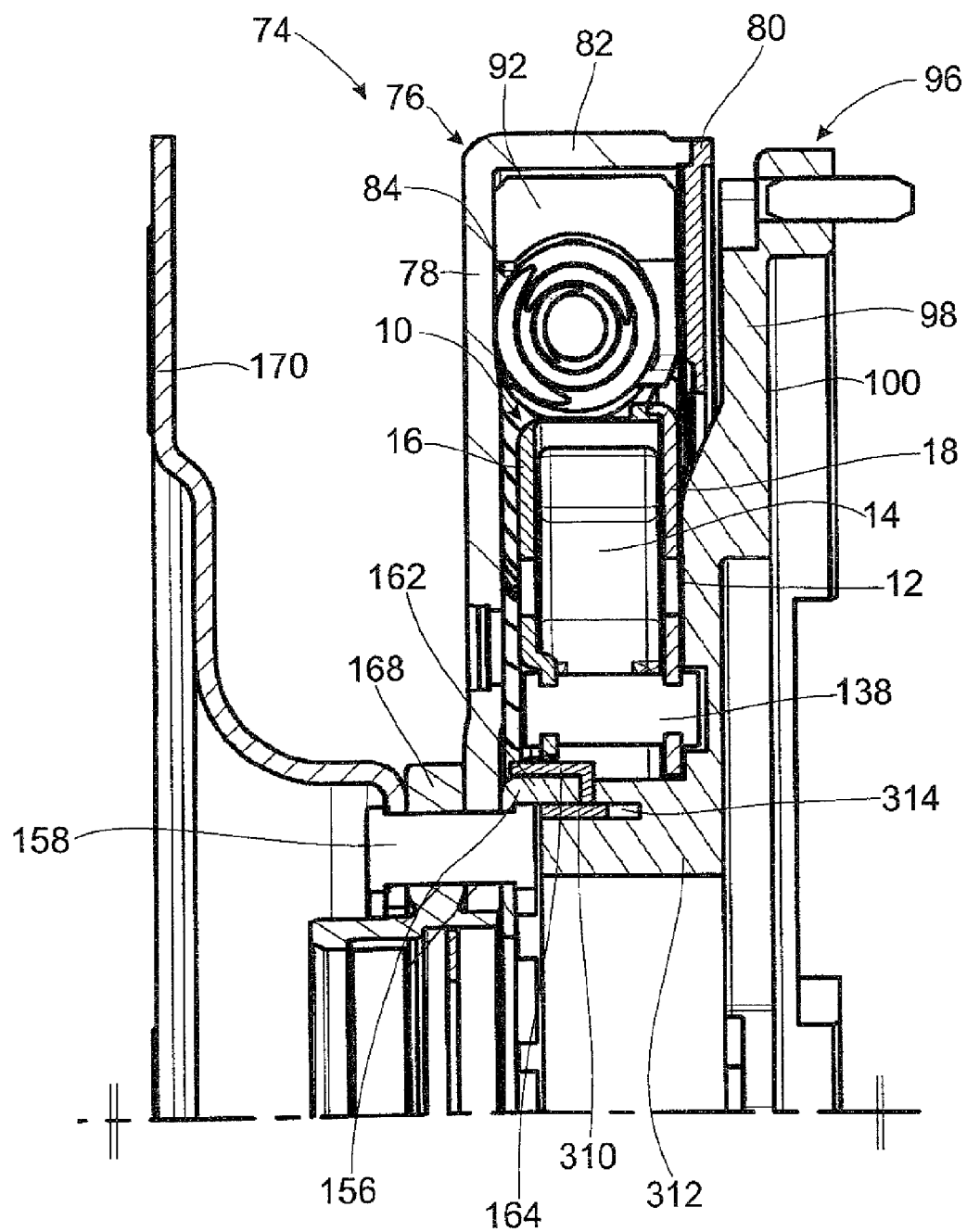
FIG. 104 a partial axial sectional view of a torsional vibration damper arrangement with a vibration damper device.

FIG. 104 shows a torsional vibration damper arrangement in which the annular movement stop 156 with its cylindrical radially extending region 162 which is also surrounded outwardly by the resilient element 164 forms radial centering means for a radial bearing 310. The secondary-side mass part 98 engages in the inner circumferential region of this radial bearing 310 by its radially inner bearing region 312. In this way, the primary side 76 and secondary side 96 of the torsional vibration damper arrangement 74 are centered radially with respect to one another. The axial bearing or support is carried out in that the bearing region 312 of the secondary-side mass part 98 axially contacts a radially inwardly extending leg of the resilient element 164. Formed radially inward of this contact region in the bearing region 312 is an axially extending annular groove 314 in which the annular radial bearing 310 engages axially.

Since the bearing region 312 of the secondary-side mass part 98 is located comparatively far radially outward in this case, particularly in that region in which the rivet bolts 158 are provided which connect the primary-side cover disk 78 to the bearing ring 168 and also to the coupling element 170, it is necessary to produce this rivet connection before the secondary-side mass part 98 is connected. When the bearing region 312 is shifted still farther radially outward, the rivet bolts 158 are made accessible again so that this rivet connection can also be carried out after the secondary-side mass part 98 is connected. It is also possible in principle to connect the primary side, i.e., for example, the cover disk 78 or bearing ring 168, directly to a crankshaft without using the coupling element 170 or a flexplate to be connected thereto, or the like, specifically in a region radially inside the bearing region 312 of the secondary-side mass part 98. Also, no apertures through which screw bolts or the like or tools can be guided need be provided in this case.

The bearing 172 which is shown, for example, in FIGS. 18 and 19 for the bearing support of a driven shaft could just as well be provided at the bearing support region 312 of the secondary-side mass part 98. This support can also be carried out at the bearing ring 168 so that the driven shaft is then supported with respect to the primary side 76. The primary side or cover disk 78 thereof could also be used for supporting the driven shaft.

Figure 105:
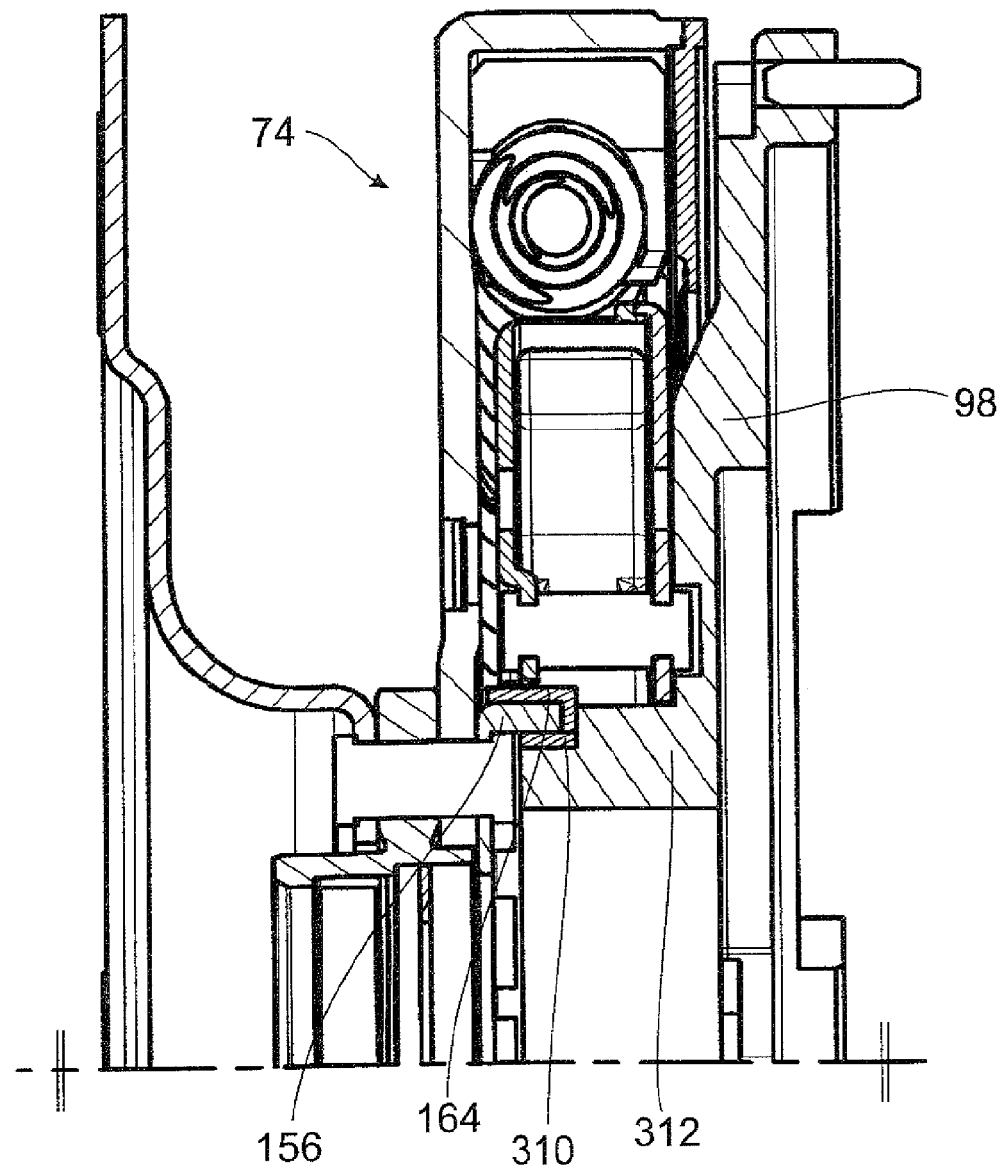
FIG. 105 a partial axial sectional view of a torsional vibration damper arrangement with a vibration damper device.

In the modification of the above-described embodiment shown in FIG. 105, it will be seen that no axially open groove extending substantially continuously in circumferential direction is provided where the annular radial bearing 310 is positioned in the bearing region 312 of the secondary-side mass part 98, which makes it necessary to construct the annular radial bearing 310 so as to be shorter axially.

Figures 106, 107:
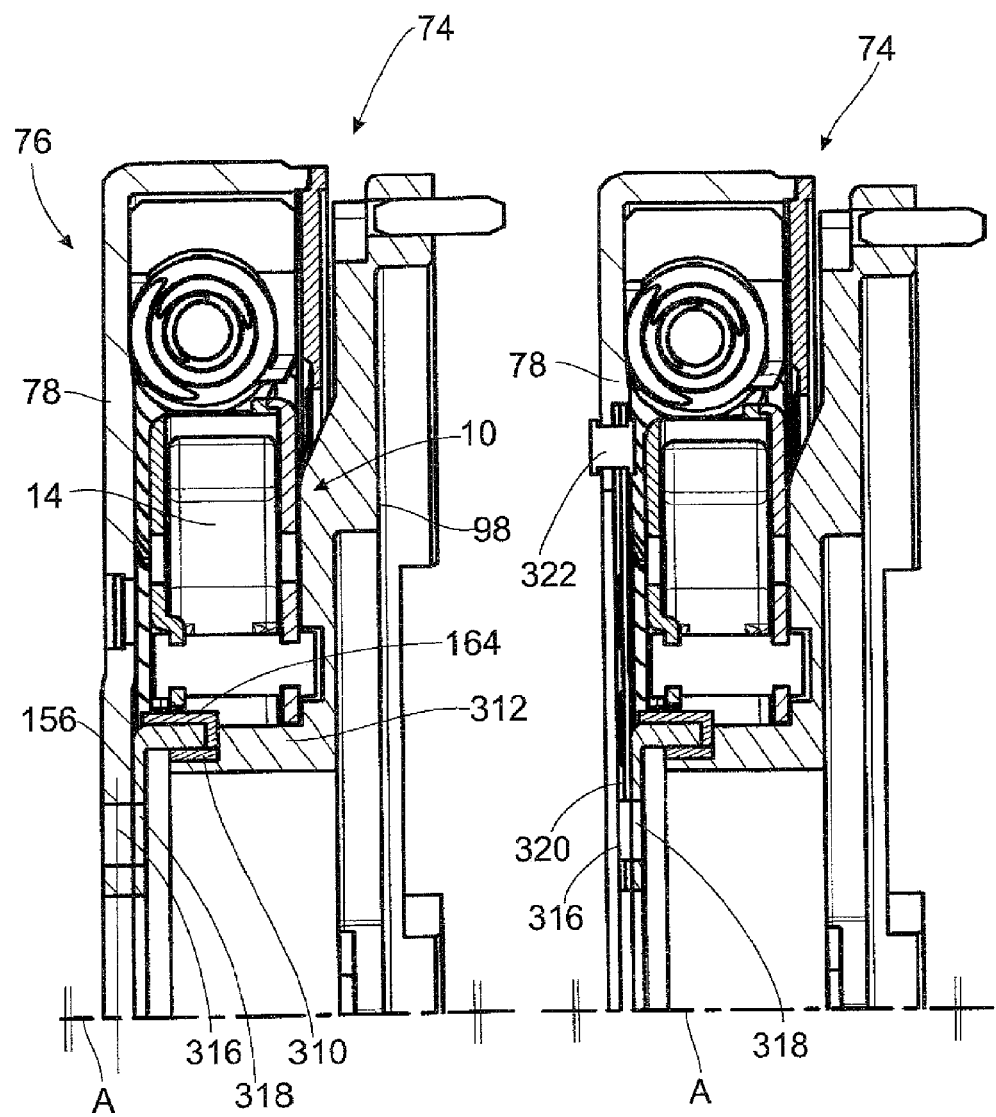
FIG. 106 a partial axial sectional view of a torsional vibration damper arrangement with a vibration damper device.
FIG. 107 a partial axial sectional view of a torsional vibration damper arrangement with a vibration damper device.

FIG. 106 shows a torsional vibration damper arrangement 74 which is connected directly to a drive shaft, i.e., a crankshaft, for example, in the region of its primary side 76. To this end, the primary-side cover disk 78 extends radially inward beyond the bearing region 312 of the secondary-side mass part 98, which bearing region 312 is located on the radially inner side. In this radially inner region, the cover disk 78 and, associated therewith, also the movement stop 156 for the deflection masses 14 have apertures 316 and 318, respectively, through which screw bolts used for fastening can be guided.

A corresponding type of connection is also shown in the embodiment illustrated in FIG. 107. In this case, the cover disk 78 is lengthened in its radially inner region by an axially flexible part 320. The latter can be fastened to the cover disk 78 by rivet bolts 322 or the like and has apertures 316 on the radially inner side for fastening to a crankshaft or some other drive shaft.

The flexible part 320 can have, for example, one or more sheet metal members with comparatively small thickness which permits a tilting of the cover disk 78 and, therefore, of the entire torsional vibration damper arrangement 74 with respect to the axis of rotation A. The flexible part 320 is preferably formed as an annular disk so that it can safely receive torque which is transmitted through it and can convey it further.

Figure 108:
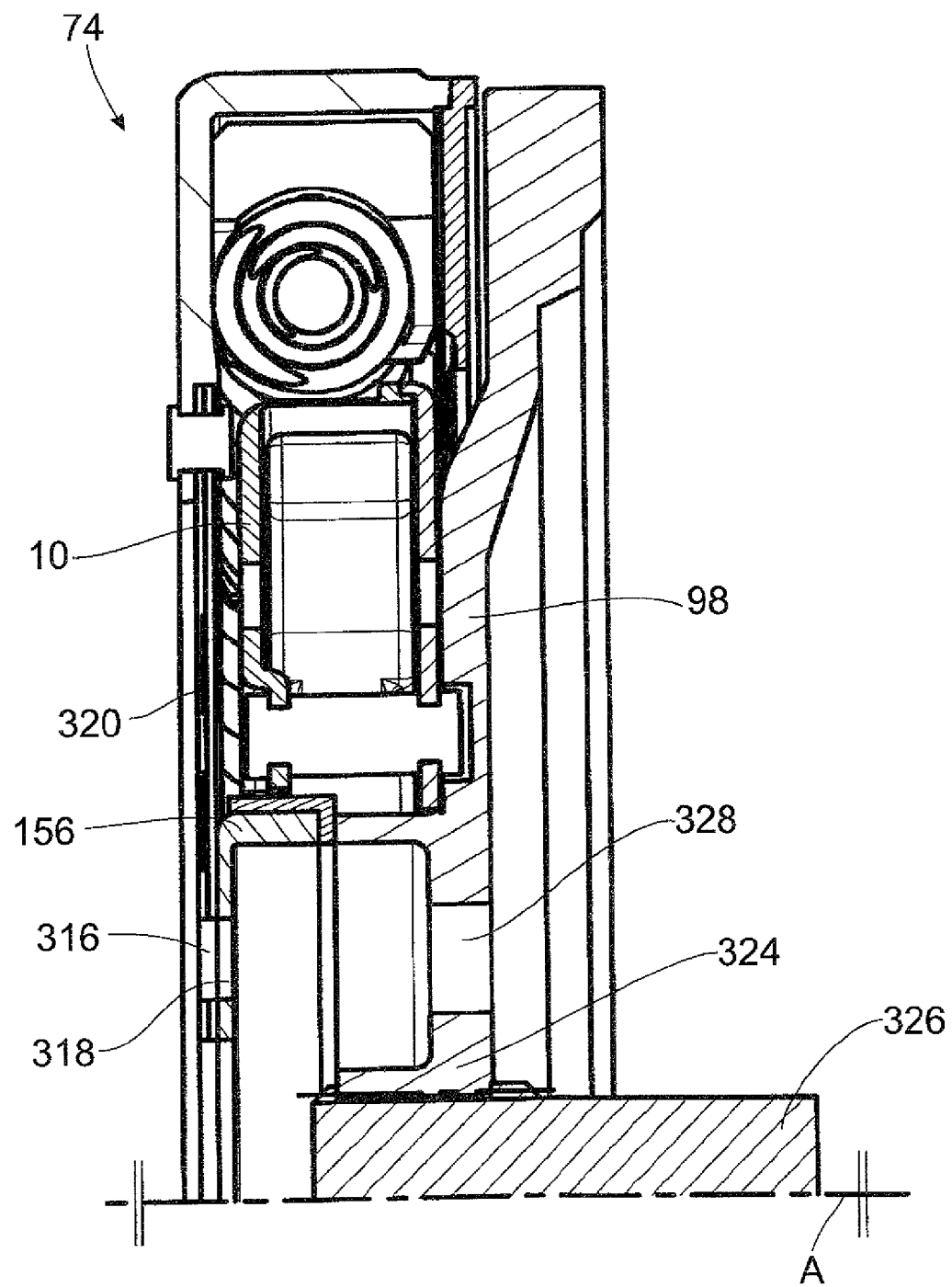
FIG. 108 a partial axial sectional view of a torsional vibration damper arrangement with a vibration damper device.

FIG. 108 shows a torsional vibration damper arrangement 74 such as can be used, for example, in hybrid drive systems or in connection with dual clutches. The overall construction of the torsional vibration damper arrangement 74 and of the vibration damper device 10 provided therein can be carried out in one of the ways described above. However, it will be seen that the secondary-side mass part 98 extends farther radially inward and forms a hub region 324 with internal teeth. A shaft extension 36 provided with external teeth can be coupled with the latter by inserting axially one inside the other for joint rotation around the axis of rotation A. This shaft extension 326 can lead to another region of a drivetrain, i.e., an electric machine or the input area of a dual clutch, for example. If this torsional vibration damper arrangement 74 is to be arranged in the torque flux only downstream of an electric machine or downstream of a dual clutch, the shaft extension 126 can be the axial end of a transmission input shaft.

It will be seen that the secondary-side mass part 98 in this embodiment also has apertures 328 associated with the apertures 316 in the flexible part 320 and 318, respectively, in the movement stop 156 so that screw bolts serving to secure to a drive shaft can be inserted and tightened.

FIGS. 109 and 110 show an embodiment of the torsional vibration damper arrangement 74 which is likewise suitable in particular for use in connection with hybrid drive systems or dual clutches. It will be seen that a substantially bar-shaped circumferential supporting element 102' having two circumferential supporting regions 106, 108 is used again in this instance and has in its radially inner region a hub region 330 provided with teeth. Further, the circumferential supporting element 102' carries an annular supporting region 332 which, for example, is formed integral therewith or fixed thereto separately. This supporting region 332 lies axially opposite the movement stop 156 and its axially extending cylindrical region 162 so that an inwardly extending leg of the resilient element 164 is arranged between these two parts. Accordingly, the circumferential supporting element 102' and, therefore, the entire secondary side 96 of the torsional vibration damper arrangement 74 is supported in axial direction with respect to the primary side 76 by means of this supporting portion 332 so that a frictional interaction can also be generated simultaneously during relative rotation between the primary side and secondary side.

The circumferential supporting element 102' also has apertures 334 corresponding to the apertures 316 in the resilient part 320 and 318, respectively, in the movement stop 156 to allow a connection to a drive shaft.

FIG. 111 shows the radially inner region of another embodiment of the primary side 76 of the torsional vibration damper arrangement 74. The radially inner region of the cover disk 78 which is axially recessed in this case and also the radially inner region of the coupling element 170 which is likewise recessed can be seen. The latter are fixedly connected to the bearing ring 168 by means of rivet bolts 158, and the cover disk 78 is arranged between the coupling element 170 and a radially extending leg of the bearing ring 168. A bearing element 336 which is annular, for example, and which serves to support the primary side 76 radially and/or axially with respect to a drive shaft is provided at the inner circumference of an axially extending leg of the bearing ring 168.

Figures 112, 113:
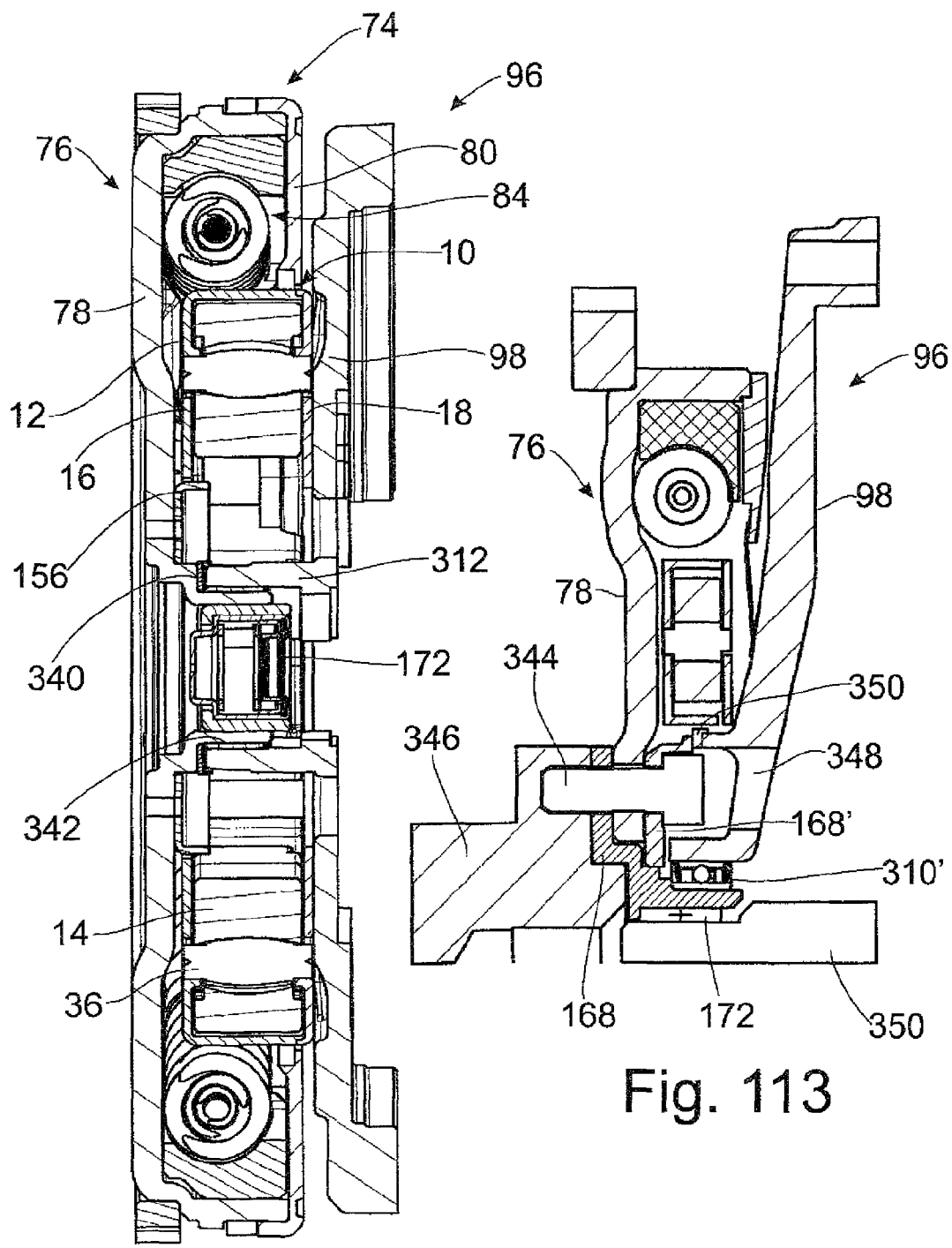
FIG. 112 an axial sectional view of a torsional vibration damper arrangement with a vibration damper device.
FIG. 113 a partial axial sectional view of a torsional vibration damper arrangement with a vibration damper device.

FIG. 112 shows another embodiment of a torsional vibration damper arrangement 74 which is combined with a vibration damper device 10. The torsional vibration damper arrangement 74 again has the two cover disks 78, 80 on the primary side and the damper element arrangement 84 received in the outer region between the two cover disks 78, 80. Radially inwardly, the primary-side cover disk 78 forms a bearing extension 340 at which the radially inner bearing region 312 of the secondary-side mass part 98 can be supported radially with the intermediary of a plain bearing sleeve 342. Axial support of the secondary side 96 with respect to the primary side 76 can be carried out in this region.

The vibration damper device 10 can be constructed as was described above with the two carrier disks 16, 18 and the deflection masses 14 received therebetween. These deflection masses 14 are each movably held by preferably a plurality of guide bodies 36 for circumferential and, in so doing, radial displacement at the deflection mass carrier 12.

The axial end region of a driven shaft, i.e., a transmission input shaft, for example, can be supported with respect to the bearing extension 340 of the cover disk element 78 by means of the rolling element bearing 172.

In the embodiment shown in FIG. 113, the cover disk 78 of the primary side 76 is fixed to a drive shaft 346, i.e., a crankshaft, for example, by screw bolts 344. For this purpose, the secondary-side mass part 98 has through-openings 348 in its radially inner region. Together with the cover disk 78, two bearing rings 168 and 168' are fixed to the drive shaft 346 by means of the screw bolts 344. The bearing ring 368 extends farther radially inward and serves to center an axial end of a driven shaft 350 with the intermediary of the bearing 172 which is again constructed with rolling elements, for example. Further, the secondary side 96 is radially supported with respect to the primary side 76 by intermediate arrangement of a radial bearing 310 which is constructed in this instance with rolling elements, for example.

Proceeding from the fastening by means of screw bolts 344, the bearing ring 168' extends in its radially outer region axially toward the secondary-side mass part 98 and supports the latter with the intermediary of an axial bearing 350 which is constructed, for example, as a plain bearing. This axial bearing 350 serves chiefly to prevent tilting of the secondary side 96 when an actuating force is exerted on a friction clutch connected thereto.

In conclusion, it should again be noted that the various aspects described above with respect to the design of the vibration damper device 10 on the one hand and the torsional vibration damper arrangement 74 on the other hand can be combined as desired. It is noted in particular that variations or constructions which were not mentioned in detail in the preceding can also be carried out in many different areas. For example, the deflection masses can be produced in a variety of ways. Production by sintering is particularly advantageous because it results in a very high density and, therefore, a very high mass, since heavier elements can be introduced in the sintered composite. For example, copper, tungsten or another high-density element can be introduced in a steel matrix serving as base material.

Of course, the various connection elements shown here, which are advantageously constructed as rivet elements, can also be provided in other forms and other quantities. Rivet elements in sets of three which are arranged in a triangular configuration and shown in association with the various circumferential supporting elements have proven especially advantageous because this brings about a particularly low-stress connection. In principle, however, sets of two, four, five, six or more are also possible, and the spacing between the individual connection elements in a set of this kind can also be varied. An arrangement of the connection elements on a pitch circle, i.e., with approximately equal radial distance from the axis of rotation, is also possible.

The regions which are especially loaded in rotating operation by the effective centrifugal force, especially in the vibration damper device, i.e., the structural component parts providing the different guide tracks and also the guide bodies, are preferably constructed of hardened metal, e.g., hardened steel. A hardening of the construction material that results in a high tensile strength is preferably realized in the location of apertures for the insertion of connection elements.

In order to make it possible for guide bodies formed with a crowned outer circumferential surface to be introduced in the deflection masses, the apertures provided for furnishing the guide tracks must have dimensions, at least in a circumferential region, allowing the crowned guide bodies to be introduced. This is preferably the region in which the respective guide track vertex is also formed.

Of course, the quantity of deflection masses used in the vibration damper device can also differ from the quantity of four deflection masses shown herein. For example, two, three, five, six or more deflection masses can also be provided, wherein a symmetrical arrangement around the axis of rotation is advantageous.

While the individual deflection masses are identical to one another in the embodiments illustrated and described above, it is also possible, of course, to use deflection masses of different shapes and different mass in a vibration damper device. The guide tracks associated with the various deflection masses can also have a different form allowing different deflection masses to be tuned to different excitation orders. In order to prevent an excessive impact of the deflection masses during excessively strong vibration excitation, it is also advantageous that the deflection masses are not provided exactly on an exciting order, for example, the second order in a four-cylinder engine. To introduce a "detuning" leading to a more limited deflection in this instance, tuning to 2.1 times or 1.9 times the exciting frequency could be carried out, for example.

Owing to the shaping, i.e., the curvature, of the guide tracks, it is further possible to influence the tuning to a determined exciting order on the one hand, but also to prevent an excessive deflection on the other hand. Accordingly, a comparatively sharp braking of the deflection masses can be achieved particularly by moving the guide tracks toward radial lines in the region of the ends of the guide tracks. Flatter guide tracks lead to less powerful braking effects during the deflection of the deflection masses.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damper arrangement for a drivetrain of a vehicle, comprising:
   a primary side (76) to be coupled to a driving member and a secondary side (96) rotatable with respect to said primary side (76) around an axis of rotation (A) against the action of a damper element arrangement (84), said primary side (76) and said secondary side (96) having circumferential supporting regions (106, 108) for damper element units (86) of the damper element arrangement (84);
   a vibration damper device (10) disposed at said secondary side (96), said vibration damper device (10) having a deflection mass carrier (12) and at least one deflection mass (14) supported at said deflection mass carrier (12) so as to be deflected out of an initial position at a maximum distance from the axis of rotation (A) into a deflection position at a shorter distance from the axis of rotation (A); said deflection mass carrier (12) comprising two carrier disks (16, 18) arranged at a distance from one another in a direction of the axis of rotation (A), said two carrier disks (16, 18) being fixedly connected to one another for receiving therebetween said at least one deflection mass (14); one of said two carrier disks (18) comprising at least one guide track (40) for supporting said at least one deflection mass (14); wherein
   said secondary side (96) comprising at least one circumferential supporting element (102, 104; 102') having two of said circumferential supporting regions (106, 108) and a secondary-side mass element (98);
   first connection elements (118) for connecting said secondary-side mass element (98) to said at least one circumferential supporting element (102, 104, 102') and to said deflection mass carrier (12); said two circumferential supporting regions (106, 108) being arranged at an angular distance of approximately 180° relative to one another; and said at least one circumferential supporting element (102') having apertures through which screw bolts pass for securing one of said at least one circumferential supporting element (102') to the driving member.

2. The torsional vibration damper arrangement according to claim 1, wherein said one of the at least one circumferential supporting element (102') has, in its radially inner region, a hub region (330) provided with teeth.

3. The torsional vibration damper arrangement according to claim 1, wherein said one of the at least one circumferential supporting element (102') has an annular portion (264) and a cylindrical projection (266) serving for the radial support of one of a secondary side (96) with respect to the primary side (76) and the secondary side (96) with respect to a driven shaft.

4. The torsional vibration damper arrangement according to claim 3, wherein said one of the at least one circumferential supporting element (102') carries an annular supporting region (332) formed integral therewith or separately fixed thereto.

5. The torsional vibration damper arrangement according to claim 1, wherein one of said carrier disks (18) has a depression (114, 116) directed to said other carrier disk (16) for receiving at least one of said circumferential supporting elements (102, 104).

6. The torsional vibration damper arrangement according to claim 1, wherein said at least one deflection mass (14) comprises at least one guide track (34) having a substantially radially outwardly directed guide surface (32) and said at least one guide track (40) of said one of said two carrier disks (18) associated with said at least one guide track (34) in said at least one deflection mass (14), said at least one guide track of said one of said two carrier disks (18) having a substantially radially inwardly directed guide surface; and further comprising a guide body (36) movable along said at least one guide track (34) of said at least one deflection mass and said at least one guide track (40) of said one of said two carrier disks (18) during deflection of said at least one deflection mass (14) from said initial position; and further comprising one of a first centering arrangement (68) for an axial centering of said at least one deflection mass (14) between said two carrier disks (16, 18) and a second centering arrangement (72) for the axial centering of said at least one guide body (36) between said two carrier disks (16, 18).

7. The vibration damper device according to claim 6, wherein said second centering arrangement (72) in association with said at least one carrier disk (16, 18) comprises a centering shoulder (70) extending radially outwardly with respect to a longitudinal axis of said guide body (36).

8. The vibration damper device according to claim 7, wherein said centering shoulder (70) is formed with an axial recess at a radially inner region.

9. The vibration damper device according to claim 7, wherein said centering shoulder (70) is provided in a transitional area between an outer circumferential surface region (64) contacting said second guide track (40) and an outer circumferential region (56) of an outer circumferential surface (58) of said guide body (36) contacting said first guide track (34).

* * * * *